US012760704B2

(12) United States Patent
Abrevaya et al.

(10) Patent No.: US 12,760,704 B2
(45) Date of Patent: Oct. 13, 2026

(54) EXTRUDED THERMOPLASTIC FOAMS AND USES IN APPLICATIONS REQUIRING STRENGTH AND LIGHTWEIGHT

(71) Applicant: HONEYWELL INTERNATIONAL INC., Charlotte, NC (US)

(72) Inventors: Hayim Abrevaya, Charlotte, NC (US); Keith Lehuta, Charlotte, NC (US); Susie Martins, Charlotte, NC (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/946,114

(22) Filed: Nov. 13, 2024

(65) Prior Publication Data

US 2025/0154929 A1 May 15, 2025

Related U.S. Application Data

(60) Provisional application No. 63/548,370, filed on Nov. 13, 2023.

(51) Int. Cl.
*F03D 1/06* (2006.01)

(52) U.S. Cl.
CPC ........ *F03D 1/0675* (2013.01); *F05B 2230/24* (2013.01); *F05B 2280/4007* (2013.01); *F05B 2280/4011* (2013.01); *F05B 2280/6012* (2013.01)

(58) Field of Classification Search
CPC ................ F03D 1/0675; F05B 2230/24; F05B 2280/4007; F05B 2280/4011; F05B 2280/6012; Y02E 10/72; Y02E 70/50
See application file for complete search history.

(56) References Cited

U.S. PATENT DOCUMENTS

| | | | |
|---|---|---|---|
| 2,551,731 | A | 5/1951 | Gordon |
| 6,384,095 | B1 | 5/2002 | Corr |
| 8,314,159 | B2 | 11/2012 | Chen |
| 8,765,829 | B2 | 7/2014 | Coppock |
| 9,688,831 | B2 | 6/2017 | Hamajima |

(Continued)

FOREIGN PATENT DOCUMENTS

| | | | |
|---|---|---|---|
| CN | 102536639 | A | 7/2012 |
| CN | 108410000 | | 8/2018 |

(Continued)

OTHER PUBLICATIONS

International Search Report and Written Opinion issued in International Patent Application No. PCT/US2024/055760 dated Feb. 19, 2025, 9 pages.

(Continued)

*Primary Examiner* — Aaron R Eastman
(74) *Attorney, Agent, or Firm* — FisherBroyles, LLP

(57) ABSTRACT

Disclosed are extruded foam comprising an extruded thermoplastic, closed-cell foam having at least a first surface and comprising: (i) thermoplastic polymer cell walls formed by an extrusion step, with the walls being comprised of at least about 0.5% by weight of ethylene furanoate moieties and optionally one or more co-monomer moieties; (ii) blowing agent contained in at least a portion of said closed cells; and a material different than said thermoplastic, closed-cell foam attached to and/or integral with at least a portion of said first foam surface.

10 Claims, 6 Drawing Sheets

(56) References Cited

U.S. PATENT DOCUMENTS

| | | | | |
|---|---|---|---|---|
| 9,790,342 | B2 | 10/2017 | Harmer | |
| 10,807,344 | B2 | 10/2020 | Hossieny | |
| 11,958,935 | B2 | 4/2024 | Cai | |
| 2008/0166241 | A1 | 7/2008 | Herr | |
| 2009/0305876 | A1 | 12/2009 | Singh | |
| 2010/0016457 | A1 | 1/2010 | Bowman | |
| 2010/0105788 | A1 | 4/2010 | Chen | |
| 2010/0266416 | A1 | 10/2010 | Marshall | |
| 2011/0031758 | A1* | 2/2011 | Mitsuoka | B32B 25/10 29/889.6 |
| 2015/0165658 | A1 | 6/2015 | Bowman | |
| 2016/0326331 | A1 | 11/2016 | Hamajima | |
| 2019/0126596 | A1 | 5/2019 | Hossieny | |
| 2019/0211962 | A1 | 7/2019 | Kress | |
| 2020/0172661 | A1 | 6/2020 | Al-Farhood | |
| 2020/0230454 | A1 | 7/2020 | Robin et al. | |
| 2020/0308363 | A1 | 10/2020 | Porter | |
| 2020/0308396 | A1 | 10/2020 | Barger | |
| 2022/0153947 | A1 | 5/2022 | Gimeno | |
| 2022/0250308 | A1* | 8/2022 | Dobosz | B29C 64/106 |
| 2022/0333573 | A1 | 10/2022 | Atutxa Briones | |
| 2023/0175476 | A1* | 6/2023 | Razeghi | B29C 70/443 |
| 2023/0265255 | A1* | 8/2023 | Abrevaya | C08J 9/144 521/76 |

FOREIGN PATENT DOCUMENTS

| | | | |
|---|---|---|---|
| CN | 108484959 | | 9/2018 |
| EP | 3231836 | | 10/2017 |
| EP | 3342840 | | 7/2018 |
| EP | 3450500 | A1 | 3/2019 |
| JP | 2006503961 | | 2/2006 |
| JP | 2006274990 | | 10/2006 |
| JP | 2009530489 | | 8/2009 |
| JP | 2010047022 | | 3/2010 |
| JP | 2012214708 | | 11/2012 |
| JP | 2014098124 | | 6/2014 |
| JP | 2018507126 | | 3/2018 |
| JP | 2019519641 | | 7/2019 |
| JP | 2021038313 | A | 3/2021 |
| KR | 20190032359 | | 3/2019 |
| WO | 2007118765 | A1 | 10/2007 |
| WO | 2017178500 | A1 | 10/2017 |
| WO | 2017192550 | A1 | 11/2017 |
| WO | 2018209072 | | 11/2018 |
| WO | 2018227358 | A1 | 12/2018 |
| WO | 2019088035 | | 5/2019 |
| WO | 2020205558 | | 10/2020 |
| WO | 2021151900 | | 8/2021 |
| WO | 2021158649 | | 8/2021 |
| WO | 2022009185 | A1 | 1/2022 |
| WO | 2023023085 | A1 | 2/2023 |

OTHER PUBLICATIONS

International Search Report and Written Opinion issued in International Patent Application No. PCT/US2024/055754 dated Feb. 20, 2025, 9 pages.

International Search Report and Written Opinion issued in International Patent Application No. PCT/US2024/055757, dated Feb. 21, 2025, 8 pages.

International Search Report in corresponding International Patent Application No. PCT/US2022/040504, mailing date Nov. 30, 2022, 2 pages.

Supplementary European Search Report, dated May 16, 2025, EPO application No. 22859061, 6 pages.

Supplementary European Search Report, dated May 16, 2025, EPO application No. 22859062, 7 pages.

Supplementary European Search Report, dated May 16, 2025, EPO application No. 22859063, 6 pages.

Supplementary European Search Report, dated May 23, 2025, EPO application No. 22859060, 9 pages.

Office Action (Non-Final Rejection) dated Dec. 22, 2025 for U.S. Appl. No. 18/030,080 (pp. 1-11).

* cited by examiner

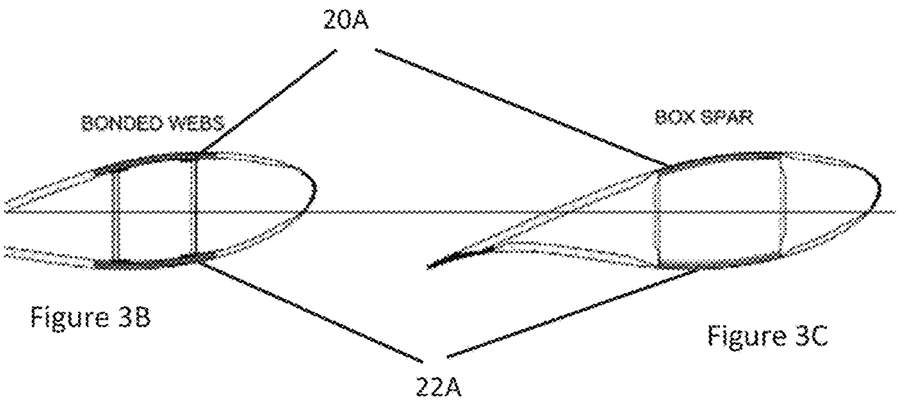
Figure 3B
Figure 3C
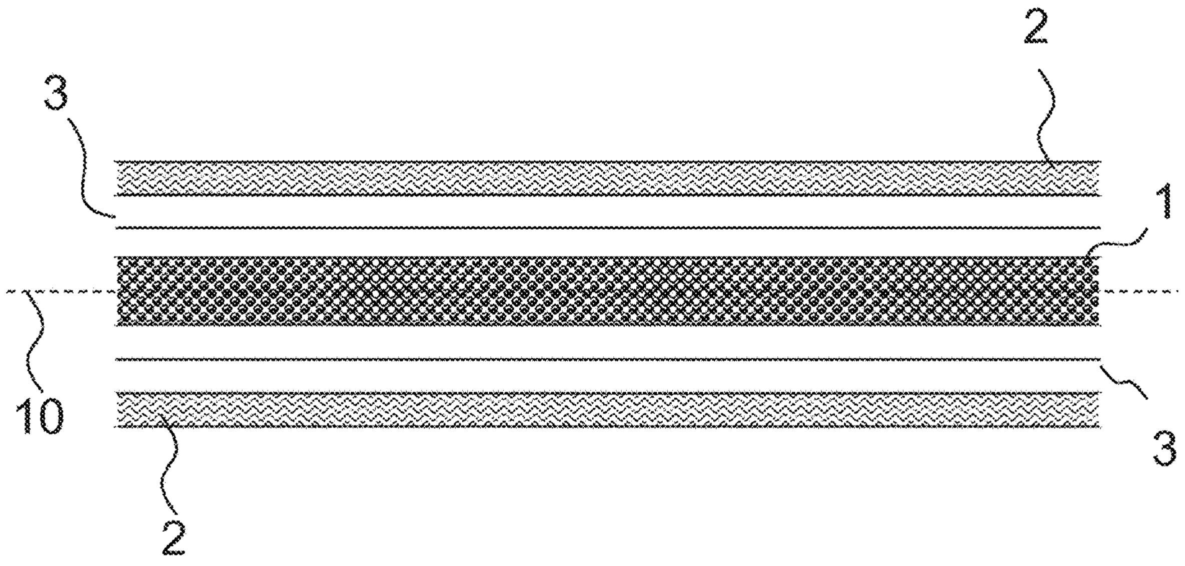
Figure 4

EXTRUDED THERMOPLASTIC FOAMS AND USES IN APPLICATIONS REQUIRING STRENGTH AND LIGHTWEIGHT

CROSS REFERENCE TO RELATED APPLICATIONS

This application is related to, claims the priority benefit of and incorporates by reference U.S. Provisional Application 63/548,370, filed Nov. 13, 2023.

This application is related to and incorporates by reference each of U.S. Provisional Application 63/343,990, filed May 19, 2022, and Ser. No. 18/199,885, filed May 19, 2023, and U.S. application Ser. No. 18/113,605 filed Feb. 23, 2023.

FIELD OF THE INVENTION

This invention relates to foamable thermoplastic compositions, thermoplastic foams, foaming methods, and systems and articles made from same, including foam articles, such as panels, boards, sheets, blocks, beams and other formed articles, comprising a thermoplastic foam comprising polyethylenefuranoate (PEF) and having a surface covered by a sheet, mat, film, scrim or like surface covering, and to the uses of such articles in devices, systems and methods that require or benefit from relatively lightweight and relatively strong foam forms, and especially to environmentally advantageous and sustainable lightweight and relatively strong foam forms.

BACKGROUND

While foams are used in a wide variety of applications, it is a desirable but difficult-to-achieve goal in many applications for the foam material to be environmentally friendly while at the same time possessing excellent performance properties and being cost effective to produce. Environmental considerations include not only of the recyclability and sustainability of the polymeric resin that forms the structure of the foam but also the low environmental impact of blowing agents used to form the foam, such as the Global Warming Potential (GWP) and Ozone Depletion Potential (ODP) of the blowing agent.

Foams based on certain thermoplastic resins, including polyester resins, have been investigated for potential advantage from the perspective of being recyclable and/or sustainably sourced. However, difficulties have been encountered in connection with the development of such materials. For example, it has been a challenge to develop polyester resins that are truly recyclable, can be produced from sustainable sources, and which are compatible with blowing agents that are able, in combination with the thermoplastic, to produce foams with good performance properties. In many applications the performance properties that are considered highly desirable include the production of high-quality closed cell foam that are low density (and therefore have a low weight in use) and at the same time having relatively high mechanical integrity and strength.

Many important applications exist which would benefit from the use of covered or faced foam forms in which the foam portion is made from a renewable and sustainable material that is relatively lightweight (i.e., has a density that is relatively low) and has a strength that is relatively high. Such applications include, for example, use in transportation devices, such as cars, trucks, rail cars, boats, ships, aircraft and the like, since in all such applications the use of lightweight and relatively strong materials can be beneficial.

Other examples include sporting equipment, such as skis, snowboards, skateboards and the like, as well as stationary building structures, including for example, as roof and floor underlayment, and as components of walls, in buildings and homes. Packaging applications can also benefit from foams which are provided by the present invention.

Another important example of an application which would benefit from a relatively lightweight and relatively high strength covered or faced foam made from renewable and sustainable material is in blades, foils and the like used as fluid energy transfer devices. Examples of such fluid energy transfer devices include the blades used on wind generators. Other types of fluid energy transfer devices include vortex, tidal, oceans current oscillating hydrofoils and kites which recover air or water kinetic energy from fixed or mobile devices located in air or water.

An example of one type of wind generator is schematically illustrated in FIG. 1. In the illustrated configuration, a wind turbine designated generally as 2 includes a tower 4 supporting a nacelle 6 enclosing a drive train 8. In a typical configuration, the wind turbine blades 10 are arranged on a hub to form a "rotor" at one end of the drive train 8 outside of the nacelle 6. In operation, wind passing over the blades 10 generate lift and cause them to rotate, and the rotating blades 10 drive a gearbox 12 connected to an electrical generator 14 at the other end of the drive train 8 arranged inside the nacelle 6 along with a control system 16 that receives input from an anemometer 18. It will be appreciated that other configurations of wind turbines are direct drive and therefore do not include a gearbox.

The nacelle in many wind generators sits atop a tower that can be 120 meters off the ground for ground-based generators or and potentially even higher, and for off-shore application can be 150 meters, and potentially even higher, above the water surface for offshore generators, and for this and other reasons it is often critical to construct the various components of the wind turbine blades from materials that are relatively light in weight and at the same time sufficiently strong to withstand the forces to which the blades will be exposed. It is therefore highly important in such uses that the lightest weight material be used that can provide the necessary strength properties since this will not only improve the efficiency of operation of the wind turbine but can benefit the cost of construction and maintenance of the wind generator. While thermoplastic foams formed from polyethylene terephthalate (PET) have been used in wind turbine blades, applicants have come to appreciate that several important disadvantages are associated with the use of such materials in such applications. For example, PET is not a sustainable material. In addition, certain portions of the wind turbine blade use higher density materials, such as balsa wood, instead of PET foam because PET foams do not provide sufficient strength to meet the needs in those areas of the wind turbine blade.

With particular reference to FIGS. 2 and 3, for example, a typical rotor blade 10 of FIG. 1 is illustrated in perspective view, and FIG. 3A illustrates a cross-sectional view of the rotor blade 10 along the sectional line 3-3. As shown, a typical rotor blade 10 generally includes a blade root 30 configured to be mounted or otherwise secured to the hub of the wind turbine 2 and a blade tip 32 disposed opposite the blade root 30. A body shell 21 of the rotor blade is typically 1-6 centimeters in thickness and generally extends between the blade root 30 and the blade tip 32 along a longitudinal axis 27. The body shell 21 may generally serve as the outer casing/covering of the rotor blade 10 and may define a substantially aerodynamic profile, such as by defining a symmetrical or cambered airfoil-shaped cross-section. Because of the varying mechanical strength requirements along the length of the turbine blade 10, it has been common to use core materials containing polymeric foams, such as PET foam, in combination with balsa wood to form the body shell of the blade between the segment 42 and the root 30, with the balsa wood in higher concentration in regions closer to the root where strength requirements are higher.

With respect to FIG. 3A, it is noted that the rotor blade 10 typically has a pressure side 34 and a suction side 36 extending between leading and trailing ends 26, 28 of the rotor blades 10. Further, the rotor blade 10 may also have a span 23 defining the total length between the blade root 30 and the blade tip 32 and a chord 25 defining the total length between the leading edge 26 and the trialing edge 28. As is generally understood, the chord 25 may generally vary in length with respect to the span 23, as the rotor blade 10 extends from the blade root 30 to the blade tip 32. Furthermore, the rotor blade 10 may also include one or more longitudinally extending structural components configured to provide increased stiffness, buckling resistance and/or strength to the rotor blade 10. For example, the rotor blade 10 may include a pair of longitudinally extending shear webs 24 with spar caps 20, 22 configured to be engaged against the opposing inner surfaces 35, 37 of the pressure and suction sides 34, 36 of the rotor blades 10, respectively. Additionally, one or more shear webs 24 may be disposed between the spar caps 20, 22 so as to form a beam-like configuration. The spar caps 20, 22 may generally be designed to resist bending loads and to minimize blade tip deflection and/or other loads acting on the rotor blade 10 in a generally span-wise direction (a direction parallel to the span 23 of the rotor blade 10) during operation of a wind turbine 2. In some configurations, the spar is designed to also resist shear as well as tension and compression based on how the fibers are angled in the laminate that makes us the spar cap. Similarly, the spar caps 20, 22 may also be designed to withstand the span-wise compression and/or tension occurring during operation of the wind turbine 6. In an alternative arrangement as shown in FIGS. 3B and 3C, the spar caps 20A and 22A can be integrated into a structural shell.

Because of these requirements of the spar caps used in rotor blades, it has heretofore been common to not generally use PET foam for these portions of the blade and to instead form the spar caps from other materials considered to have better strength properties, such as balsa wood which has been surface reinforced with facing or glass fiber reinforced laminate or carbon fiber reinforced laminate.

Whether the core material is in the shell or is in the shear web or is in the spar caps of the wind turbine blade, the core is typically sandwiched between two or more face sheets that are made of a few layers glass fibers adhered with epoxy resin. The facings, after being rigidized, provide longitudinal stiffness and strength, whereas the core provides out-of-plane strength and stiffness. The face sheets carry most of the bending and in-plane loads, while the core mostly carries the shear load.

With respect to the selection of thermoplastic resin, EP 3,231,836 acknowledges that while there has been interest in thermoplastic resins, in particularly polyester-based resins, this interest has encountered difficulty in development, including difficulty in identifying suitable foaming grades of such resins. Moreover, while EP 3,231,836 notes that certain polyethylene terephthalate (PET) resins, including recycled versions of PET, can be melt-extruded with a suitable physical and/or chemical blowing agent to yield closed-cell foams with the potential for low density and good mechanical properties, it is not disclosed that any such resins are at once are able to produce foams with good environmental properties and good performance properties, and are also able to be formed from sustainable sources. The '836 application identifies several possible polyester resins to be used in the formation of open-celled foams, including polyethylene terephthalate, poly butylene terephthalate, poly cyclohexane terephthalate, polyethylene naphthalate, polyethylene furanoate or a mixture of two or more of these. While the use of polyester materials to make foams that have essentially no closed cells, as required by EP '836, may be beneficial for some applications, a disadvantage of such structures is that in general open cell foams will exhibit relatively poor mechanical strength properties.

CN 108484959 discloses that making foam products based on 2,5-furan dimethyl copolyester is problematic because of an asserted problem of dissolution of foaming agent into the polyester and proposes the use of a combination of a liquid blowing agent and a gaseous blowing agent and a particular process involving sequential use of these different classes of blowing agent.

US 2020/0308363 and US 2020/0308396 each disclose the production of amorphous polyester copolymers that comprise starting with a recycled polyester, of which only PET is exemplified, as the main component and then proceeding through a series of processing steps to achieve an amorphous co-polymer, that is, as copolymer having no crystallinity. A wide variety of different classes of blowing agent are mentioned for use with such amorphous polymers.

With respect to blowing agents, the use generally of halogenated olefin blowing agents, including hydrofluoroolefins (HFOs) and hydrochlorofluorolefins (HCFOs), is also known, as disclosed for example in US 2009/0305876, which is assigned to the assignee of the present invention, and which is incorporated herein by reference. While the '876 application discloses the use of HFO and HFCO blowing agents with various thermoplastic materials to form foams, including PET, there is no disclosure or suggestion to use any of such blowing agents with any other type of polyester resin.

Applicants have come to appreciate that one or more unexpected advantages can be achieved in connection with the formation of thermoplastic foams, and in particular extruded thermoplastic foams, by using a polyester resin as disclosed herein in combination with a blowing agent comprising one of more hydrohaloolefin as disclosed herein.

Applicants have come to appreciate that one or more unexpected advantages can be achieved in connection with the formation of foam articles and members, including covered or faced thermoplastic foams, in which the foam is based on PEF, and preferably such PEF foams that are formed using a blowing agent comprising one of more hydrohaloolefin as disclosed herein. The articles as disclosed herein overcome one or more of the deficiencies of prior art foam article, including those deficiencies describe above, and provide significant and unexpected advantages over prior art foam articles and members, as described in more detail hereinafter.

SUMMARY

The present invention includes foam articles comprising:

(a) an extruded thermoplastic, closed-cell extruded foam and having at least a first foam surface and being any of Extruded Foams 1-4 as defined hereinafter; and (b) a material different than said thermoplastic, closed-cell foam attached to and/or integral with at least a portion of said first foam surface.

For the purposes of convenience, foam articles in accordance with this paragraph are referred to herein as Foam Article 1.

For the purposes of convenience, but not necessarily by way of limitation, the material of the present invention that is different than said thermoplastic, closed-cell foam and which is attached to and/or integral with at least a portion of said first foam surface is sometimes referred to herein as a "facing."

The present invention also includes extruded foam articles comprising:

(a) an extruded thermoplastic, closed-cell foam having at least a first surface; and (b) a material different than said thermoplastic, closed-cell foam attached to and/or integral with at least a portion of said first foam surface, wherein said thermoplastic, closed-cell foam comprises thermoplastic polymer cell walls comprising at least about 0.5% by weight of ethylene furanoate moieties and optionally one or more co-monomer moieties and HFO-1234ze(E) in the closed cells.

For the purposes of convenience, foam articles in accordance with this paragraph are referred to herein as Foam Article 2.

The present invention also includes extruded foam articles comprising:

(a) an extruded thermoplastic, closed-cell foam having at least a first foam surface wherein: (1) said thermoplastic polymer cells consists essentially of ethylene furanoate moieties and ethylene terephthalate moieties; (2) said closed cells contain HFO-1234ze(E); and (b) a material different than said thermoplastic, closed-cell foam attached to and/or integral with at least a portion of said first foam surface.

For the purposes of convenience, foam articles in accordance with this paragraph are referred to herein as Foam Article 3A.

The present invention also includes extruded foam articles comprising:

(a) an extruded thermoplastic, closed-cell foam having at least a first foam surface; and (b) a material different than said thermoplastic, closed-cell foam attached to and/or integral with at least a portion of said first foam surface, wherein:

(i) said thermoplastic polymer cells comprise cell walls comprising at least about 0.5% by weight of ethylene furanoate moieties;

(ii) said closed cells contain 1234ze(E); and (iii) said extruded foam has a foam density of from about 130 kg/m3 to about 425 kg/m3.

For the purposes of convenience, foam articles in accordance with this paragraph are referred to herein as Foam Article 3B.

The present invention also includes extruded foam articles comprising:

(a) an extruded thermoplastic, closed-cell foam having at least a first foam surface; and (b) a material different than said thermoplastic, closed-cell foam attached to and/or integral with at least a portion of said first foam surface, wherein:

(i) said thermoplastic polymer cells comprise cell walls comprising at least about 1% by weight of ethylene furanoate moieties; and (ii) said foam has a foam density of from about 130 kg/m3 to about 400 kg/m3; and (iii) said closed thermoplastic polymer cells contain HFO-1234ze(E).

For the purposes of convenience, foam articles in accordance with this paragraph are referred to herein as Foam Article 3C.

The present invention also includes extruded foam articles comprising:

(a) an extruded thermoplastic, closed-cell foam having at least a first foam surface; and (b) a material different than said thermoplastic, closed-cell foam attached to and/or integral with at least a portion of said first foam surface, wherein:

(i) said thermoplastic polymer cells comprise cell walls comprising at least about 1% by weight of ethylene furanoate moieties; and (ii) said foam has a foam density of from about 130 kg/m3 to about 400 kg/m3 and a compressive strength of from about 1 MPa to about 14 MPa; and (iii) said closed thermoplastic polymer cells contain one or more blowing agents.

For the purposes of convenience, foam articles in accordance with this paragraph are referred to herein as Foam Article 3D.

The present invention also includes extruded foam articles comprising:

(a) an extruded thermoplastic, closed-cell foam having at least a first foam surface; and (b) a material different than said thermoplastic, closed-cell foam attached to and/or integral with at least a portion of said first foam surface, wherein:

(i) said thermoplastic polymer cells comprise cell walls comprising at least about 1% by weight of ethylene furanoate moieties;

(ii) said foam has a foam density and compressive strength in accordance with the following Foam Table 3D; and (iii) said closed thermoplastic polymer cells contain HFO-1234ze(E).

FOAM TABLE 3D

| | Extruded Foam Properties | |
|---|---|---|
| Foam Name | Density Range*, $kg/m^3$ | Compressive Strength Range* (ISO 844), megapascal (MPa) |
| Foam 3D-1 | 125-425 | 1-14 |
| Foam 3D-2 | 135-425 | 1-14 |
| Foam 3D-3 | 145-425 | 1-14 |
| Foam 3D-4 | 145-425 | 2-14 |
| Foam 3D-5 | 155-425 | 2-14 |
| Foam 3D-6 | 165-425 | 2-14 |
| Foam 3D-7 | 165-425 | 3-14 |
| Foam 3D-8 | 165-425 | 4-14 |
| Foam 3D-9 | 175-425 | 2-14 |
| Foam 3D-10 | 175-425 | 3-14 |
| Foam 3D-11 | 175-425 | 4-14 |
| Foam 3D-12 | 175-425 | 5-14 |
| Foam 3D-13 | 190-425 | 3-14 |
| Foam 3D-14 | 190-425 | 4-14 |
| Foam 3D-15 | 190-425 | 5-14 |
| Foam 3D-16 | 190-425 | 6-14 |
| Foam 3D-17 | 225-425 | 4-14 |
| Foam 3D-18 | 225-425 | 5-14 |
| Foam 3D-19 | 225-425 | 6-14 |
| Foam 3D-20 | 225-425 | 7-14 |
| Foam 3D-21 | 250-425 | 5-14 |
| Foam 3D-22 | 250-425 | 6-14 |
| Foam 3D-23 | 250-425 | 7-14 |

-continued

| FOAM TABLE 3D | | |
|---|---|---|
| | Extruded Foam Properties | |
| Foam Name | Density Range*, $kg/m^3$ | Compressive Strength Range* (ISO 844), megapascal (MPa) |
| Foam 3D-24 | 250-425 | 8-14 |
| Foam 3D-25 | 275-425 | 5-14 |
| Foam 3D-26 | 275-425 | 6-14 |
| Foam 3D-27 | 275-425 | 7-14 |
| Foam 3D-28 | 275-425 | 8-14 |
| Foam 3D-28 | 275-425 | 9-14 |
| Foam 3D-29 | 325-425 | 6-14 |
| Foam 3D-30 | 325-425 | 7-14 |
| Foam 3D-31 | 325-425 | 8-14 |
| Foam 3D-32 | 325-425 | 9-14 |
| Foam 3D-33 | 325-425 | 10-14 |
| Foam 3D-29 | 375-425 | 7-14 |
| Foam 3D-30 | 375-425 | 8-14 |
| Foam 3D-31 | 375-425 | 9-14 |
| Foam 3D-32 | 375-425 | 10-14 |
| Foam 3D-33 | 375-425 | 11-14 |
| Foam 3D-34 | 125-425 | 1-12 |
| Foam 3D-35 | 135-425 | 1-12 |
| Foam 3D-36 | 145-425 | 1-12 |
| Foam 3D-37 | 145-425 | 2-13 |
| Foam 3D-38 | 155-425 | 2-12 |
| Foam 3D-39 | 165-425 | 2-12 |
| Foam 3D-40 | 165-425 | 3-12 |
| Foam 3D-41 | 165-425 | 4-12 |
| Foam 3D-42 | 175-425 | 2-12 |
| Foam 3D-43 | 175-425 | 3-12 |
| Foam 3D-44 | 175-425 | 4-12 |
| Foam 3D-45 | 175-425 | 5-12 |
| Foam 3D-46 | 190-425 | 3-12 |
| Foam 3D-47 | 190-425 | 4-12 |
| Foam 3D-48 | 190-425 | 5-12 |
| Foam 3D-49 | 190-425 | 6-12 |
| Foam 3D-50 | 225-425 | 4-12 |
| Foam 3D-51 | 225-425 | 5-12 |
| Foam 3D-52 | 225-425 | 6-12 |
| Foam 3D-53 | 225-425 | 7-12 |
| Foam 3D-54 | 250-425 | 5-12 |
| Foam 3D-55 | 250-425 | 6-12 |
| Foam 3D-56 | 250-425 | 7-12 |
| Foam 3D-57 | 250-425 | 8-12 |
| Foam 3D-58 | 275-425 | 5-12 |
| Foam 3D-59 | 275-425 | 6-12 |
| Foam 3D-60 | 275-425 | 7-12 |
| Foam 3D-61 | 275-425 | 8-12 |
| Foam 3D-62 | 275-425 | 9-12 |
| Foam 3D-63 | 325-425 | 6-12 |
| Foam 3D-64 | 325-425 | 7-12 |
| Foam 3D-65 | 325-425 | 8-12 |
| Foam 3D-66 | 325-425 | 9-12 |
| Foam 3D-67 | 325-425 | 10-12 |
| Foam 3D-68 | 375-425 | 7-12 |
| Foam 3D-69 | 375-425 | 8-12 |
| Foam 3D-70 | 375-425 | 9-12 |
| Foam 3D-71 | 375-425 | 10-12 |
| Foam 3D-72 | 375-425 | 11-12 |
| Foam 3D-73 | 125-425 | 1-10 |
| Foam 3D-74 | 135-425 | 1-10 |
| Foam 3D-75 | 145-425 | 1-10 |
| Foam 3D-76 | 145-425 | 2-13 |
| Foam 3D-77 | 155-425 | 2-10 |
| Foam 3D-78 | 165-425 | 2-10 |
| Foam 3D-79 | 165-425 | 3-10 |
| Foam 3D-80 | 165-425 | 4-10 |
| Foam 3D-81 | 175-425 | 2-10 |
| Foam 3D-82 | 175-425 | 3-10 |
| Foam 3D-83 | 175-425 | 4-10 |
| Foam 3D-84 | 175-425 | 5-10 |
| Foam 3D-85 | 190-425 | 3-10 |
| Foam 3D-86 | 190-425 | 4-10 |
| Foam 3D-87 | 190-425 | 5-10 |
| Foam 3D-88 | 190-425 | 6-10 |
| Foam 3D-89 | 225-425 | 4-10 |

-continued

| FOAM TABLE 3D | | |
|---|---|---|
| | Extruded Foam Properties | |
| Foam Name | Density Range*, $kg/m^3$ | Compressive Strength Range* (ISO 844), megapascal (MPa) |
| Foam 3D-90 | 225-425 | 5-10 |
| Foam 3D-91 | 225-425 | 6-10 |
| Foam 3D-92 | 225-425 | 7-10 |
| Foam 3D-93 | 250-425 | 5-10 |
| Foam 3D-94 | 250-425 | 6-10 |
| Foam 3D-95 | 250-425 | 7-10 |
| Foam 3D-96 | 250-425 | 8-10 |
| Foam 3D-97 | 275-425 | 5-10 |
| Foam 3D-98 | 275-425 | 6-10 |
| Foam 3D-99 | 275-425 | 7-10 |
| Foam 3D-99 | 275-425 | 8-10 |
| Foam 3D-100 | 275-425 | 9-10 |
| Foam 3D-101 | 325-425 | 6-10 |
| Foam 3D-102 | 325-425 | 6.5-10 |
| Foam 3D-103 | 325-425 | 7-10 |
| Foam 3D-104 | 325-425 | 7.5-10 |
| Foam 3D-105 | 325-425 | 8-10 |
| Foam 3D-106 | 375-425 | 7-10 |
| Foam 3D-107 | 375-425 | 8-10 |
| Foam 3D-108 | 375-425 | 9-10 |

For the purposes of convenience, foam articles in accordance with this paragraph are referred to herein as Foam Article 3E.

The present invention also provides wind turbine blades comprising a blade shell and a foam article of the present invention, including a foam article selected from each of Foam Articles 1-3 within said blade shell. For the purposes of convenience, methods in accordance with this paragraph are referred to herein as Wind Turbine Blade 1.

The present invention also provides a transportation vehicle comprising a vehicle body and a foam article of the present invention, including a foam article selected from each of Foam Articles 1-3 within said vehicle body. For the purposes of convenience, methods in accordance with this paragraph are referred to herein as Vehicle 1.

The present invention also provides stationary building structures comprising a structural component and a foam article of the present invention, including a foam article selected from each of Foam Articles 1-3, within or otherwise attached to said vehicle body. For the purposes of convenience, methods in accordance with this paragraph are referred to herein as Stationary Building Structure 1.

The present invention also provides sporting equipment article comprising a foam article of the present invention, including a foam article selected from each of Foam Articles 1-3, within or otherwise attached to said sporting equipment article vehicle body. For the purposes of convenience, methods in accordance with this paragraph are referred to herein as Sporting
Equipment Article 1.

The present invention also provides sporting equipment article comprising a foam article of the present invention, including a foam article selected from each of Foam Articles 1-3, within or otherwise attached to said sporting equipment article vehicle body. For the purposes of convenience, methods in accordance with this paragraph are referred to herein as Packaging 1.

BRIEF DESCRIPTION OF THE DRAWINGS

FIG. 3B is cross-section of an exemplary wind turbine blade.

FIG. 3C is cross-section of an exemplary wind turbine blade.

FIG. 4 is a cross-section of an exemplary covered foam of the present invention in the particular form of a sandwich structure.

DEFINITIONS

Figure 1:
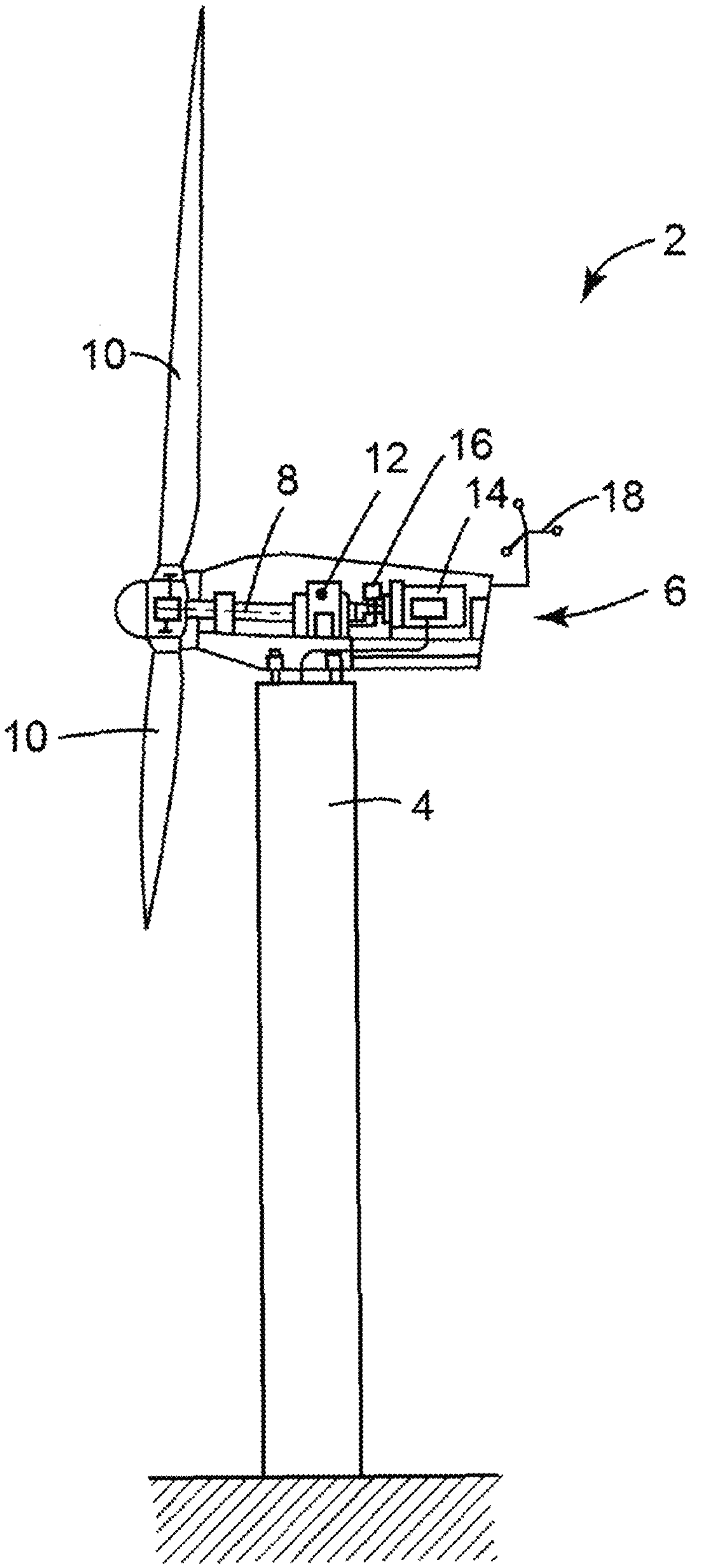
FIG. 1 is a schematic representation of an exemplary wind turbine.

1234ze means 1,1,1,3-tetrafluoropropene, without limitation as to isomeric form.

Trans1234ze, 1234ze(E) and HFO-1234ze(E) each means trans1,3,3,3-tetrafluoropropene.

Closed cell foam means that a substantial volume percentage of the cells in the foam are closed, for example, about 20% by volume or more.

Ethylene furanoate moiety means the following structure:

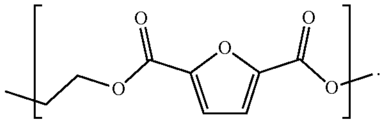

FDCA means 2,5-furandicarboxylic acid and has the following structure:

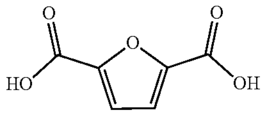 [SMILES: O=C(O)c1ccc(C(=O)O)o1]

MEG means monoethylene glycol and has the following structure:

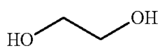

FDME means dimethyl 2,5-furandicarboxylate and has the following structure:

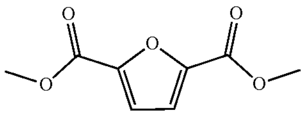

PEF homopolymer means a polymer having at least 99 mole % of ethylene furanoate moieties.

PEF copolymer means a polymer having at least about 0.5 mole % ethylene furanoate moieties and more than 0.5% of polymer moieties other than ethylene furanoate moieties.

PEF:PET copolymer means a polymer having at least about 0.5 mole % ethylene furanoate moieties and at least 0.5% of ethylene terephthalate moieties.

PEF means poly(ethylene furanoate) and encompasses and is intended to reflect a description of PEF homopolymer and PEF copolymer.

Ethylene terephthalate moiety means the structure in brackets:

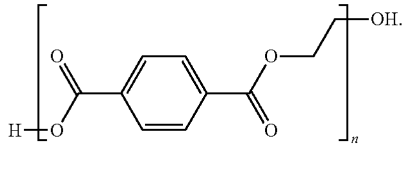

SSP means solid-state polymerization.

PMDA means pyromellitic dianhydride having the following structure:

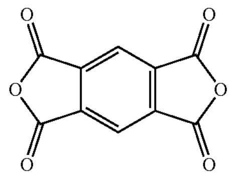 [SMILES: O=c1oc(=O)c2cc3c(=O)oc(=O)c3cc12]

DETAILED DESCRIPTION

Poly (Ethylene Furanoate)

The present invention relates to foams and foam articles that comprise cell walls comprising PEF moieties.

The PEF which forms the cells walls of the foams and foam articles of the present invention can be PEF homopolymer or PEF copolymer, and particularly PEF:PET copolymer.

PEF homopolymer is a known material that is known to be formed by either: (a) esterification and polycondensation of FDCA with MEG; or (b) transesterification and polycondensation of FDME with MEG as illustrated below for example:

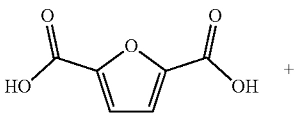

(a)
2,5-Furandicarboxylic acid (FDCA)

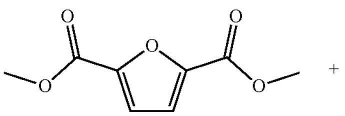

(b)
Dimethyl 2,5-Furandicarboxylate (FDME)

-continued

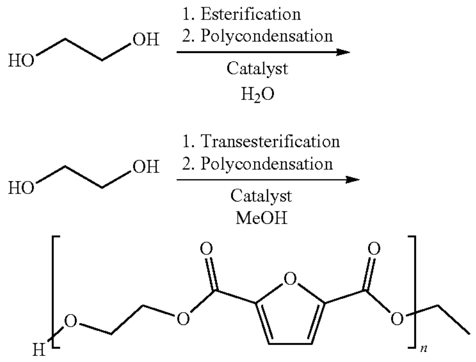

A detailed description of such known esterification and polycondensation synthesis methods is provided in GB Patent 621971 (Drewitt, J. G. N., and Lincoln, J., entitled “Improvements in Polymers”), which is incorporated herein by reference. A detailed description of such know transesterification and polycondensation synthesis methods is provided in Gandini, A., Silvestre, A. J. D., Neto, C. P., Sousa, A. F., and Gomes, M. (2009), “The furan counterpart of poly(ethylene terephthalate): an alternative material based on renewable resources.”, J. Polym. Sci. Polym. Chem. 47, 295-298. doi: 10.1002/pola.23130, which is incorporated herein by reference.

Foams

The present invention includes extruded thermoplastic foam comprising:

(a) closed thermoplastic polymer cells formed during extrusion, wherein said thermoplastic polymer consists essentially of ethylene furanoate moieties and optionally ethylene terephthalate moieties, wherein said polymer comprises from about 0.5 mole % to about 100 mole % of ethylene furanoate moieties and optionally at least about 1 mole % ethylene terephthalate moieties; and (b) HFO-1234ze(E) contained in the closed cells.

For the purposes of convenience, extruded foams in accordance with this paragraph are referred to herein as Extruded Foam 1A.

The present invention includes extruded thermoplastic foam comprising:

(a) closed thermoplastic polymer cells formed during extrusion, wherein said thermoplastic polymer has a crystallinity of at least about 5% and consists essentially of ethylene furanoate moieties and optionally ethylene terephthalate moieties, wherein said polymer comprises from about 0.5 mole % to about 100 mole % of ethylene furanoate moieties and optionally at least about 0.5 mole % ethylene terephthalate moieties; and (b) HFO-1234ze(E) contained in the closed cells.

For the purposes of convenience, extruded foams in accordance with this paragraph are referred to herein as Extruded Foam 1B.

The present invention includes extruded thermoplastic foam comprising:

(a) closed thermoplastic polymer cells formed during extrusion, wherein said thermoplastic polymer has a molecular weight of at least about 10,000 kg/mole and a crystallinity of at least about 5% and consists essentially of ethylene furanoate moieties and ethylene terephthalate moieties, wherein said polymer comprises from about 0.5 mole % to about 20 mole % of ethylene furanoate moieties and at least about 0.5 mole % ethylene terephthalate moieties; and (b) HFO-1234ze(E) contained in the closed cells.

For the purposes of convenience, extruded foams in accordance with this paragraph are referred to herein as Extruded Foam 1C.

The present invention includes extruded thermoplastic foam comprising:

(a) closed thermoplastic polymer cells formed during extrusion, wherein said thermoplastic polymer has a molecular weight of at least about 10,000 kg/mole and consists essentially of ethylene furanoate moieties and ethylene terephthalate moieties, wherein said polymer comprises from about 1 mole % to about 20 mole % of ethylene furanoate moieties and from about 80 mole % to about 99 mole % ethylene terephthalate moieties; and (b) HFO-1234ze(E) contained in the closed cells.

For the purposes of convenience, extruded foams in accordance with this paragraph are referred to herein as Extruded Foam 1D.

The present invention includes extruded thermoplastic foam comprising:

(a) closed thermoplastic polymer cells formed during extrusion, wherein said thermoplastic polymer has a molecular weight of at least about 10,000 kg/mole and a crystallinity of at least about 5% and consists essentially of ethylene furanoate moieties and ethylene terephthalate moieties, wherein said polymer comprises from about 1 mole % to about 20 mole % of ethylene furanoate moieties and from about 80 mole % to about 99 mole % ethylene terephthalate moieties; and (b) HFO-1234ze(E) contained in the closed cells.

For the purposes of convenience, extruded foams in accordance with this paragraph are referred to herein as Extruded Foam 1E.

The present invention includes extruded thermoplastic foam comprising:

(a) closed thermoplastic polymer cells formed during extrusion, wherein said thermoplastic polymer has a molecular weight of at least about 10,000 kg/mole and a crystallinity of at least about 5% and consists essentially of ethylene furanoate moieties and ethylene terephthalate moieties, wherein said polymer comprises from about 0.5 mole % to about 5 mole % of ethylene furanoate moieties and from about 95 mole % to about 99.5 mole % ethylene terephthalate moieties; and (b) HFO-1234ze(E) contained in the closed cells.

For the purposes of convenience, extruded foams in accordance with this paragraph are referred to herein as Extruded Foam 1F.

The present invention includes extruded thermoplastic foam comprising:

(a) closed thermoplastic polymer cells formed during extrusion, wherein said thermoplastic polymer has a molecular weight of at least about 10,000 kg/mole and a crystallinity of at least about 5% and consists essentially of ethylene furanoate moieties and ethylene terephthalate moieties, wherein said polymer comprises from about 0.5 mole % to about 2 mole % of ethylene furanoate moieties and from about 98 mole % to about 99.5 mole % ethylene terephthalate moieties; and (b) HFO-1234ze(E) contained in the closed cells.

For the purposes of convenience, extruded foams in accordance with this paragraph are referred to herein as Extruded Foam 1G.

The present invention includes extruded thermoplastic foam comprising:

(a) closed thermoplastic polymer cells formed during extrusion, wherein said thermoplastic polymer has a molecular weight of at least about 10,000 kg/mole and a crystallinity of at least about 5% and consists essentially of ethylene furanoate moieties and ethylene terephthalate moieties, wherein said polymer comprises about 1 mole % of ethylene furanoate moieties and about 99 mole % ethylene terephthalate moieties; and (b) HFO-1234ze(E) contained in the closed cells.

For the purposes of convenience, extruded foams in accordance with this paragraph are referred to herein as Extruded Foam 1H.

The present invention includes low-density, thermoplastic foam comprising:

(a) closed thermoplastic polymer cells formed during extrusion, wherein said thermoplastic polymer has a molecular weight of at least about 10,000 kg/mole and a crystallinity of at least about 5% and consists essentially of ethylene furanoate moieties and ethylene terephthalate moieties, wherein said polymer comprises about 0.5 mole % of ethylene furanoate moieties and about 99.5 mole % ethylene terephthalate moieties; and (b) HFO-1234ze(E) contained in the closed cells.

For the purposes of convenience, extruded foams in accordance with this paragraph are referred to herein as Extruded Foam 1I.

The present invention includes extruded thermoplastic foam comprising:

(a) closed thermoplastic polymer cells formed during extrusion, wherein said thermoplastic polymer has a molecular weight of at least about 10,000 kg/mole and a crystallinity of at least about 5% and consists essentially of ethylene furanoate moieties and ethylene terephthalate moieties, wherein said polymer comprises about 5 mole % of ethylene furanoate moieties and about 95 mole % ethylene terephthalate moieties; and (b) HFO-1234ze(E) contained in the closed cells.

For the purposes of convenience, extruded foams in accordance with this paragraph are referred to herein as Extruded Foam 1J.

The present invention includes extruded thermoplastic foam comprising:

(a) closed thermoplastic polymer cells formed during extrusion, wherein said thermoplastic polymer has a molecular weight of at least about 10,000 kg/mole and a crystallinity of at least about 5% and consists essentially of ethylene furanoate moieties and ethylene terephthalate moieties, wherein said polymer comprises about 10 mole % of ethylene furanoate moieties and about 90 mole % ethylene terephthalate moieties; and (b) HFO-1234ze(E) contained in the closed cells.

For the purposes of convenience, extruded foams in accordance with this paragraph are referred to herein as Extruded Foam 1K.

The present invention includes extruded thermoplastic foam comprising:

(a) closed thermoplastic polymer cells formed during extrusion, wherein said thermoplastic polymer has a molecular weight of at least about 10,000 kg/mole and a crystallinity of at least about 5% and consists essentially of ethylene furanoate moieties and ethylene terephthalate moieties, wherein said polymer comprises about 20 mole % of ethylene furanoate moieties and about 80 mole % ethylene terephthalate moieties; and (b) HFO-1234ze(E) contained in the closed cells.

For the purposes of convenience, extruded foams in accordance with this paragraph are referred to herein as Extruded Foam 1L.

The present invention includes extruded thermoplastic foam comprising:

(a) closed thermoplastic polyethylene furanoate cells formed during extrusion and comprising cells walls comprising polyethylene furanoate wherein at least 25% of said cells are closed cells; and (b) 1234ze(E) contained in the closed cells.

For the purposes of convenience, extruded foams in accordance with this paragraph are referred to herein as Extruded Foam 2A.

The present invention includes extruded thermoplastic foam comprising:

(a) closed thermoplastic polymer cells formed during extrusion, said cells comprising cell walls comprising from about 1 mole % to about 20 mole % of ethylene furanoate moieties and about 0.5 mole % or more of ethylene terephthalate moieties; and (b) 1234ze(E) contained in the closed cells.

For the purposes of convenience, extruded foams in accordance with this paragraph are referred to herein as Extruded Foam 2B.

The present invention includes extruded thermoplastic foam comprising:

(a) closed thermoplastic polymer cells formed during extrusion and comprising cell walls comprising from about 1 mole % to about 20 mole % of ethylene furanoate moieties and about 0.5 mole % or more of ethylene terephthalate moieties, wherein at least 50% of said cells are closed cells; and (b) gas in said closed cell, wherein said gas comprises from about 25% by weight to 100% by weight of 1234ze(E). For the purposes of convenience, extruded foams in accordance with this paragraph are referred to herein as Extruded Foam 2C.

Reference will be made at various locations herein to a numbered extruded foam (e.g., Extruded foam 1) or to group of numbered extruded foams that have been defined herein, and such reference means each of such numbered systems, including each system having a number within the group, including any suffixed numbered system. For example, reference to Extruded foam 1 includes a separate reference to each of Extruded foams 1A, 1B, 1C, 1D, etc., and reference to Extruded foams 1-2 is understood to include a separate reference to each of Extruded foams 1A, 1B, 1C, 1D, etc., and each of extruded foams 2A, 2B, 2C, 2D, etc. Further, this convention is used throughout the present specification for other defined materials, including Blowing Agents.

The present invention includes extruded thermoplastic foam comprising:

(a) closed thermoplastic polymer cells formed during extrusion and comprising cell walls consisting essentially of ethylene furanoate moieties and optionally ethylene terephthalate moieties, wherein said thermoplastic polymer: (i) comprises from about 0.5 mole % to about 99.5 mole % of ethylene furanoate moieties and optionally at least about 0.5 mole % ethylene terephthalate moieties; and (ii) has a molecular weight of at least about 25,000; and (b) 1234ze(E) contained in the closed cells.

For the purposes of convenience, extruded foams in accordance with this paragraph are referred to herein as Extruded Foam 3.

The present invention includes extruded thermoplastic foam comprising:

(a) closed thermoplastic polymer cells formed during extrusion and comprising cell walls consists essentially of ethylene furanoate moieties and optionally ethylene terephthalate moieties, wherein said thermoplastic polymer: (i) comprises from about 0.5 mole % to about 99.5 mole % of ethylene furanoate moieties and optionally at least about 0.5 mole % ethylene terephthalate moieties; and (ii) has a molecular weight of from about 25,000 to about 140,000; and (b) trans1234ze contained in the closed cells.

For the purposes of convenience, extruded foams in accordance with this paragraph are referred to herein as Extruded Foam 4.

The extruded foams of the present invention, including each of Extruded foams 1-4, are formed from either PEF homopolymers, PEF copolymers, or a combination/mixture of these.

The extruded foams of the present invention, including each of Extruded foams 1-4, may be formed in preferred embodiments from PEF homopolymer in which the polymer has at least 99.5% by weight, or at least 99.9% of by weight, of ethylene furanoate moieties.

It is contemplated that the extruded foams of the present invention, including each of Extruded foams 1-4, may be formed in preferred embodiments from PEF copolymer in which the polymer, including PEF copolymer, has from about 60% to about 99% by weight of ethylene furanoate moieties, or from about 70% to about 99% by weight of ethylene furanoate moieties, or from about 80% to about 99% by weight of ethylene furanoate moieties, or from about 90% to about 99% by weight of ethylene furanoate moieties or from about 95% to about 99.5% by weight of ethylene furanoate moieties.

It is contemplated that the extruded foams of the present invention, including each of Extruded Foams 1-4, may be formed in preferred embodiments from PEF copolymer in which the polymer, including PEF copolymer, has from about 40% to about 1% by weight of ethylene furanoate moieties, or from about 30% to about 1% by weight of ethylene furanoate moieties, or from about 20% to about 1% by weight of ethylene furanoate moieties, or from about 10% to about 1% by weight of ethylene furanoate moieties, or from about 5% to about 1% by weight of ethylene furanoate moieties, or from about 5% to about 0.5% by weight of ethylene furanoate moieties.

It is contemplated that the extruded foams of the present invention, including each of Extruded Foams 1-4, may be formed in preferred embodiments from PEF copolymer in which the polymer, including PEF copolymer, has from about 40% to about 1% by mole of ethylene furanoate moieties, or from about 30% to about 1% by mole of ethylene furanoate moieties, or from about 20% to about 1% by mole of ethylene furanoate moieties, or from about 10% to about 1% by mole of ethylene furanoate moieties, or from about 5% to about 1% by mole of ethylene furanoate moieties, or from about 5% to about 0.5% by mole of ethylene furanoate moieties.

It is contemplated that the extruded foams of the present invention, including each of Extruded Foams 1-4, may be formed in preferred embodiments from PEF copolymer in which the polymer, including PEF copolymer, has from about 40% to about 1% by mole of ethylene furanoate moieties and from about 60% to about 99% by mole of ethylene terephthalate moieties, or from about 30% to about 1% by mole of ethylene furanoate moieties and from about 70% to about 99% by mole of ethylene terephthalate moieties, or from about 20% to about 1% by mole of ethylene furanoate moieties and from about 80% to about 99% by mole of ethylene terephthalate moieties, or from about 10% to about 1% by mole of ethylene furanoate moieties and from about 90% to about 99% by mole of ethylene terephthalate moieties, or from about 5% to about 1% by mole of ethylene furanoate moieties and from about 95% to about 99% by mole of ethylene terephthalate moieties, or from about 5% to about 0.5% by mole of ethylene furanoate moieties and from about 95% to about 99.5% by mole of ethylene terephthalate moieties.

For those embodiments of the present invention involving PEF copolymers, it is contemplated that those skilled in the art will be able, in view of the teachings contained herein, to select the type and amount of co-polymeric materials to be used within each of the ranges described herein to achieve the desired enhancement/modification of the polymer without undue experimentation.

For those embodiments of the present invention involving the use of PEF homopolymer or PEF copolymer, it is contemplated that such material may be formed with a wide variety of molecular weights and physical properties within the scope of the present invention. In preferred embodiments, the extruded foams, including each of Extruded Foams 1-4, are formed from PEF having the ranges of characteristics identified in Table 1 below, which are measured as described in the Examples hereof:

TABLE 1

| Polymer property | Broad Range | First Intermediate Range | Second Intermediate Range | Narrow Range |
|---|---|---|---|---|
| Molecular weight | 25,000-150,000 | 45,000-130,000 | 45,000-130,000 | 55,000-120,000 |
| Glass Transition Temperature, $T_g$, ° C. | 75-100 | 75-95 | 75-95 | 75-95 |
| Melting Temperature, $T_m$, ° C. | 180-250 | 190-240 | 190-240 | 200-230 |
| Decomposition Temperature, $T_d$, ° C. | 300-420 | 320-400 | 320-400 | 330-380 |
| Crystallinity, % | 5-75 | 25-75 | 30-60 | 40-50 |

In general, it is contemplated that those skilled in the art will be able to formulate PEF polymers within the range of properties described above without undue experimentation in view of the teachings contained herein. In preferred embodiments, however, PEF (including PEF homopolymer and PEF copolymer) having these properties is achieved using one or more of the synthesis methods described above, in combination with a variety of known supplemental processing techniques, including by treatment with chain extenders, such as PMDA (and alternatives and supplements to PMDA, such as ADR, pentaerythritol (hereinafter referred to as "PENTA") and talc as described in the present examples, and others) and/or SSP processing. It is believed that, in view of the disclosures contained herein, including the polymer synthesis described in the Examples below (including the use of methods to enhance crystallization of polymers), a person skilled in the art will be able to produce PEF polymers within the range of characteristics described in the table above and elsewhere herein. Such processing conditions include methods of increasing crystallization as described herein, and such methods as are disclosed in the Examples hereof.

An example of the process for chain extension treatment of polyesters is provided in the article "Recycled poly (ethylene terephthalate) chain extension by a reactive extrusion process," Firas Awaja, Fugen Daver, Edward Kosior, 16 Aug. 2004, available at https://doi.org/10.1002/pen.20155, which is incorporated herein by reference. As explained in US 1009/0264545, which is incorporated herein by reference, chain extenders generally are typically compounds that are at least di-functional with respect to reactive groups which can react with end groups or functional groups in the polyester to extend the length of the polymer chains. In certain cases, as disclosed herein, such a treatment can advantageously increases the average molecular weight of the polyester to improve its melt strength and/or other important properties. The degree of chain extension achieved is related, at least in part, to the structure and functionalities of the compounds used. Various compounds are useful as chain extenders. Non-limiting examples of chain extenders include trimellitic anhydride, pyromellitic dianhydride (hereinafter referred to as PMDA), trimellitic acid, haloformyl derivatives thereof, or compounds containing multi-functional epoxy (e.g., glycidyl), or oxazoline functional groups. Nanocomposite material such as finely dispersed nanoclay may optionally be used for controlling viscosity. Commercial chain extenders include CESA-Extend from Clariant, Joncryl from BASF, or Lotader from Arkema. The amount of chain extender can vary depending on the type and molecular weight of the polyester components. The amount of chain extender used to treat the polymer can vary widely, and in preferred embodiments ranges from about 0.1 to about 5 wt. %, or preferably from about 0.1 to about 1.5 wt. %. Examples of chain extenders are also described in U.S. Pat. No. 4,219,527, which is incorporated herein by reference.

An example of the process for SSP processing of poly (ethylene furanoate) is provided in the article "Solid-State Polymerization of Poly(ethylene furanoate) Biobased Polyester, I: Effect of Catalyst Type on Molecular Weight Increase," Nejib Kasmi, Mustapha Majdoub, George Z. Papageorgiou, Dimitris S. Achilias, and Dimitrios N. Bikiaris, which is incorporated herein by reference.

The PEF thermoplastic polymers which are especially advantageous for making extruded foams, including Extruded foams 1-4 and FC1-FC11, and extruded foam articles, including Foam Articles 1-4 of the present invention are identified in the following Thermoplastic Polymer Table (Table 2A), wherein all numerical values in the table are understood to be preceded by the word "about."

TABLE 2A

THERMOPLASTIC POLYMER TABLE

| Thermoplastic Polymer (TPP) Number | Ethylene furanoate moieties, wt % | Tannin moieties, wt % | Other moieties, wt % | MW, Kg/mol | Crystallinity, % |
|---|---|---|---|---|---|
| TPP1A | 100 | 0 | 0 | 25-180 | 25-100 |
| TPP1B | 100 | 0 | 0 | 25-75 | 30-60 |
| TPP1C | 100 | 0 | 0 | 80-130 | 30-60 |
| TPP1D | 100 | 0 | 0 | 90-120 | 35-50 |
| TPP1E | 100 | 0 | 0 | 90-110 | 35-45 |
| TPP2A | 85 to <100 | >0 to <15 | 0 | 25-180 | 25-100 |
| TPP2B | 85 to <100 | >0 to <15 | 0 | 25-75 | 30-60 |
| TPP2C | 85 to <100 | >0 to <15 | 0 | 80-130 | 30-60 |
| TPP2D | 85 to <100 | >0 to <15 | 0 | 90-120 | 35-50 |
| TPP2E | 85 to <100 | >0 to <15 | 0 | 90-110 | 35-45 |
| TPP3A | 0.5 to 95 | 0 | 5 to 99.5 | 25-180 | 25-100 |
| TPP3B | 0.5 to 95 | 0 | 5 to 99.5 | 25-75 | 30-60 |
| TPP3C | 0.5 to 95 | 0 | 5 to 99.5 | 80-130 | 30-60 |
| TPP3D | 0.5 to 95 | 0 | 5 to 99.5 | 90-120 | 35-50 |
| TPP3E | 0.5 to 95 | 0 | 5 to 99.5 | 90-110 | 35-45 |
| TPP4A | 0.5 to 95 | >0-<15 | 5 to 99.5 | 25-180 | 25-100 |
| TPP4B | 0.5 to 95 | >0-<15 | 5 to 99.5 | 25-75 | 30-60 |
| TPP4C | 0.5 to 95 | >0-<15 | 5 to 99.5 | 80-130 | 30-60 |
| TPP4D | 0.5 to 95 | >0-<15 | 5 to 99.5 | 90-120 | 35-50 |
| TPP4E | 0.5 to 95 | >0-<15 | 5 to 99.5 | 90-110 | 35-45 |
| TPP5A | 10 | 0 | 90 | 25-180 | 25-100 |
| TPP5B | 10 | 0 | 90 | 25-75 | 30-60 |
| TPP5C | 10 | 0 | 90 | 80-130 | 30-60 |
| TPP5D | 10 | 0 | 90 | 90-120 | 35-50 |
| TPP5E | 10 | 0 | 90 | 90-110 | 35-45 |
| TPP6A | 90 | 0 | 10 | 25-180 | 25-100 |
| TPP6B | 90 | 0 | 10 | 25-75 | 30-60 |
| TPP6C | 90 | 0 | 10 | 80-130 | 30-60 |
| TPP6D | 90 | 0 | 10 | 90-120 | 35-50 |
| TPP6E | 90 | 0 | 10 | 90-110 | 35-45 |

The PEF thermoplastic polymers which are especially advantageous for making extruded foams, including Extruded Foams 1-4 and FC1-FC11, and extruded foam articles, including Foam Articles 1-4, also include those materials identified in the following Thermoplastic Polymer Table (Table 2B), wherein all numerical values in the table are understood to be preceded by the word "about."

TABLE 2B

THERMOPLASTIC POLYMER TABLE

| Thermoplastic Polymer (TPP) Number | Ethylene furanoate moieties, wt % | Tannin moieties, wt % | Ethylene Terephalate moieties, wt % | MW, Kg/mol | Crystallinity, % |
|---|---|---|---|---|---|
| TPP7A | 100 | 0 | 0 | 25-180 | 25-100 |
| TPP7B | 100 | 0 | 0 | 25-75 | 30-60 |
| TPP7C | 100 | 0 | 0 | 80-130 | 30-60 |
| TPP7D | 100 | 0 | 0 | 90-120 | 35-50 |
| TPP7E | 100 | 0 | 0 | 90-110 | 35-45 |
| TPP8A | 85 to <100 | >0 to <15 | 0 | 25-180 | 25-100 |
| TPP8B | 85 to <100 | >0 to <15 | 0 | 25-75 | 30-60 |
| TPP8C | 85 to <100 | >0 to <15 | 0 | 80-130 | 30-60 |
| TPP8D | 85 to <100 | >0 to <15 | 0 | 90-120 | 35-50 |
| TPP8E | 85 to <100 | >0 to <15 | 0 | 90-110 | 35-45 |
| TPP8A | 0.5 to 95 | 0 | 5 to 99.5 | 25-180 | 25-100 |
| TPP8B | 0.5 to 95 | 0 | 5 to 99.5 | 25-75 | 30-60 |
| TPP8C | 0.5 to 95 | 0 | 5 to 99.5 | 80-130 | 30-60 |
| TPP8D | 0.5 to 95 | 0 | 5 to 99.5 | 90-120 | 35-50 |
| TPP8E | 0.5 to 95 | 0 | 5 to 99.5 | 90-110 | 35-45 |
| TPP9A | 0.5 to 95 | 0 | 5 to 99.5 | 25-180 | 25-100 |
| TPP9B | 0.5 to 95 | 0 | 5 to 99.5 | 25-75 | 30-60 |
| TPP9C | 0.5 to 95 | 0 | 5 to 99.5 | 80-130 | 30-60 |
| TPP9D | 0.5 to 95 | 0 | 5 to 99.5 | 90-120 | 35-50 |
| TPP9E | 0.5 to 95 | 0 | 5 to 99.5 | 90-110 | 35-45 |
| TPP10A | 10 | 0 | 90 | 25-180 | 25-100 |
| TPP10B | 10 | 0 | 90 | 25-75 | 30-60 |
| TPP10C | 10 | 0 | 90 | 80-130 | 30-60 |
| TPP10D | 10 | 0 | 90 | 90-120 | 35-50 |
| TPP10E | 10 | 0 | 90 | 90-110 | 35-45 |
| TPP11A | 90 | 0 | 10 | 25-180 | 25-100 |
| TPP11B | 90 | 0 | 10 | 25-75 | 30-60 |
| TPP11C | 90 | 0 | 10 | 80-130 | 30-60 |
| TPP11D | 90 | 0 | 10 | 90-120 | 35-50 |
| TPP11E | 90 | 0 | 10 | 90-110 | 35-45 |

The PEF thermoplastic polymers which are especially advantageous for making extruded foams, including Extruded Foams 1-4 and FC1-FC11, and extruded foam articles, including Foam Articles 1-4 of the present invention also include those materials identified in the following Thermoplastic Polymer Table (Table 2C), wherein all numerical values in the table are understood to be preceded by the word "about."

TABLE 2C

THERMOPLASTIC POLYMER TABLE

| Thermoplastic Polymer (TPP) Number | Ethylene furanoate moieties, mole % | Tannin moieties, mole % | Ethylene Terephalate moieties, mole % | MW, Kg/mol | Crystallinity, % |
|---|---|---|---|---|---|
| TPP12A | 100 | 0 | 0 | 25-180 | 25-100 |
| TPP12B | 100 | 0 | 0 | 25-75 | 30-60 |
| TPP12C | 100 | 0 | 0 | 80-130 | 30-60 |
| TPP12D | 100 | 0 | 0 | 90-120 | 35-50 |
| TPP12E | 100 | 0 | 0 | 90-110 | 35-45 |
| TPP13A | 85 to <100 | >0 to <15 | 0 | 25-180 | 25-100 |
| TPP13B | 85 to <100 | >0 to <15 | 0 | 25-75 | 30-60 |
| TPP13C | 85 to <100 | >0 to <15 | 0 | 80-130 | 30-60 |
| TPP13D | 85 to <100 | >0 to <15 | 0 | 90-120 | 35-50 |
| TPP13E | 85 to <100 | >0 to <15 | 0 | 90-110 | 35-45 |
| TPP14A | 0.5 to 95 | 0 | 5 to 99.5 | 25-180 | 25-100 |
| TPP14B | 0.5 to 95 | 0 | 5 to 99.5 | 25-75 | 30-60 |
| TPP14C | 0.5 to 95 | 0 | 5 to 99.5 | 80-130 | 30-60 |
| TPP14D | 0.5 to 95 | 0 | 5 to 99.5 | 90-120 | 35-50 |
| TPP14E | 0.5 to 95 | 0 | 5 to 99.5 | 90-110 | 35-45 |
| TPP15A | 0.5 to 95 | 0 | 5 to 99.5 | 25-180 | 25-100 |
| TPP15B | 0.5 to 95 | 0 | 5 to 99.5 | 25-75 | 30-60 |

TABLE 2C-continued

THERMOPLASTIC POLYMER TABLE

| Thermoplastic Polymer (TPP) Number | Ethylene furanoate moieties, mole % | Tannin moieties, mole % | Ethylene Terephalate moieties, mole % | MW, Kg/mol | Crystallinity, % |
|---|---|---|---|---|---|
| TPP15C | 0.5 to 95 | 0 | 5 to 99.5 | 80-130 | 30-60 |
| TPP16D | 0.5 to 95 | 0 | 5 to 99.5 | 90-120 | 35-50 |
| TPP16E | 0.5 to 95 | 0 | 5 to 99.5 | 90-110 | 35-45 |
| TPP17A | 10 | 0 | 90 | 25-180 | 25-100 |
| TPP17B | 10 | 0 | 90 | 25-75 | 30-60 |
| TPP17C | 10 | 0 | 90 | 80-130 | 30-60 |
| TPP17D | 10 | 0 | 90 | 90-120 | 35-50 |
| TPP17E | 10 | 0 | 90 | 90-110 | 35-45 |
| TPP18A | 90 | 0 | 10 | 25-180 | 25-100 |
| TPP18B | 90 | 0 | 10 | 25-75 | 30-60 |
| TPP18C | 90 | 0 | 10 | 80-130 | 30-60 |
| TPP18D | 90 | 0 | 10 | 90-120 | 35-50 |
| TPP18E | 90 | 0 | 10 | 90-110 | 35-45 |
| TPP19A | 5 | 0 | 95 | 25-180 | 25-100 |
| TPP19B | 5 | 0 | 95 | 25-75 | 30-60 |
| TPP19C | 5 | 0 | 95 | 80-130 | 30-60 |
| TPP19D | 5 | 0 | 95 | 90-120 | 35-50 |
| TPP19E | 5 | 0 | 95 | 90-110 | 35-45 |
| TPP20A | 1 | 0 | 99 | 25-180 | 25-100 |
| TPP20B | 1 | 0 | 99 | 25-75 | 30-60 |
| TPP20C | 1 | 0 | 99 | 80-130 | 30-60 |
| TPP20D | 1 | 0 | 99 | 90-120 | 35-50 |
| TPP20E | 1 | 0 | 99 | 90-110 | 35-45 |
| TPP21A | 1-20 | 0 | 80-99 | 25-180 | 25-100 |
| TPP21B | 1-20 | 0 | 80-99 | 25-75 | 30-60 |
| TPP21C | 1-20 | 0 | 80-99 | 80-130 | 30-60 |
| TPP21D | 1-20 | 0 | 80-99 | 90-120 | 35-50 |
| TPP21E | 1-20 | 0 | 80-99 | 90-110 | 35-45 |
| TPP22A | 1-10 | 0 | 80-99 | 25-180 | 25-100 |
| TPP22B | 1-10 | 0 | 90-99 | 25-75 | 30-60 |
| TPP22C | 1-10 | 0 | 90-99 | 80-130 | 30-60 |
| TPP22D | 1-10 | 0 | 90-99 | 90-120 | 35-50 |
| TPP22E | 1-10 | 0 | 90-99 | 90-110 | 35-45 |

For the purposes of definition of terms used herein, it is to be noted that reference will be made at various locations herein to the thermoplastic polymers identified in the first column in each of rows in the TPP table above, and reference to each of these numbers is a reference to a thermoplastic polymer as defined in the corresponding columns of that row. Reference to a group of TPPs that have been defined in the table above by reference to a TPP number means separately and individually each such numbered TPP, including each TPP having the indicated number, including any such number that has a suffix. So, for example, reference to TPP1 is a separate and independent reference to TPP1A, TPP1B, TPP1C, TPP1D and TPP1E. Reference to TPP1-TPP2 is a separate and independent reference to TPP1A, TPP1B, TPP1C, TPP1D, TTP1E, TPP2A, TPP2B, TPP2C, TPP2D and TPP1E. This use convention is used for the Foamable Composition Table and the Extruded Foam Table below as well.

Blowing Agent

As explained in detail herein, the present invention includes, but is not limited to, applicant's discovery that a select group of blowing agents are capable of providing foamable PEF foamable compositions and PEF extruded foams and extruded foam articles, including Foam Articles 1-4, having a difficult-to-achieve and surprising combination of physical properties, including low density as well as good mechanical strength properties.

The blowing agent used in accordance with the present invention preferably comprises one or more hydrohaloolefins having three or four carbon atoms. For the purposes of convenience, a blowing agent in accordance with this paragraph is sometimes referred to herein as Blowing Agent 1A.

The blowing agent used in accordance with the present invention preferably consists essentially of one or more hydrohaloolefins having three or four carbon atoms. For the purposes of convenience, a blowing agent in accordance with this paragraph is sometimes referred to herein as Blowing Agent 1B.

The blowing agent used in accordance with the present invention preferably consists essentially of one or more hydrohaloolefins having three or four carbon atoms. For the purposes of convenience, a blowing agent in accordance with this paragraph is sometimes referred to herein as Blowing Agent 1C.

The blowing agent used in accordance with of the present invention preferably comprises one or more of 1234ze, 1234yf, 1336mzz, 1233zd and 1224ydf (referred to hereinafter for convenience as Blowing Agent 2A); or comprises one or more of trans1234ze, 1336mzz, trans1233zd and cis1224yd (referred to hereinafter for convenience as Blowing Agent 3A); or comprises one or more of trans1234ze, trans1336mzz, trans1233zd and cis1224yd (referred to hereinafter for convenience as Blowing Agent 4A); or comprises one or more of trans1234ze and trans1336mzz (referred to hereinafter for convenience as Blowing Agent 5A); or comprises trans1234ze (referred to hereinafter for convenience as Blowing Agent 6A); or comprises trans1336mzz (referred to hereinafter for convenience as Blowing Agent 7A); or comprises cis1336mzz (referred to hereinafter for convenience as Blowing Agent 8A); or comprises 1234yf (referred to hereinafter for convenience as Blowing Agent 9A); or comprises 1224yd (referred to hereinafter for convenience as Blowing Agent 10A); or comprises trans1233zd (referred to hereinafter for convenience as Blowing Agent 11A).

The blowing agent used in accordance with of the present invention preferably consists essentially of one or more of 1234ze, 1234yf, 1336mzz, 1233zd and 1224ydf (referred to hereinafter for convenience as Blowing Agent 2B); or consists essentially of one or more of trans1234ze, 1336mzz, trans1233zd and cis1224yd (referred to hereinafter for convenience as Blowing Agent 3B); or consists essentially of one or more of trans1234ze, trans1336mzz, trans1233zd and cis1224yd (referred to hereinafter for convenience as Blowing Agent 4B); or consists essentially of one or more of trans1234ze and trans1336mzz (referred to hereinafter for convenience as Blowing Agent 5B); or consists essentially of trans1234ze (referred to hereinafter for convenience as Blowing Agent 6B); or consists essentially of trans1336mzz (referred to hereinafter for convenience as Blowing Agent 7B); or consists essentially of cis1336mzz (referred to hereinafter for convenience as Blowing Agent 8B); or consists essentially of 1234yf (referred to hereinafter for convenience as Blowing Agent 9B); or consists essentially of 1224yd (referred to hereinafter for convenience as Blowing Agent 10B); or consists essentially of trans1233zd (referred to hereinafter for convenience as Blowing Agent 11B).

The blowing agent used in accordance with of the present invention preferably consists of one or more of 1234ze, 1234yf, 1336mzz, 1233zd and 1224ydf (referred to hereinafter for convenience as Blowing Agent 2B); or consists of one or more of trans1234ze, 1336mzz, trans1233zd and cis1224yd (referred to hereinafter for convenience as Blowing Agent 3B); or consists of one or more of trans1234ze, trans1336mzz, trans1233zd and cis1224yd (referred to hereinafter for convenience as Blowing Agent 4B); or consists of one or more of trans1234ze and trans1336mzz (referred to hereinafter for convenience as Blowing Agent 5B); or consists of trans1234ze (referred to hereinafter for convenience as Blowing Agent 6B); or consists of trans1336mzz (referred to hereinafter for convenience as Blowing Agent 7B); or consists of cis1336mzz (referred to hereinafter for convenience as Blowing Agent 8B); or consists of 1234yf (referred to hereinafter for convenience as Blowing Agent 9B); or consists of 1224yd (referred to hereinafter for convenience as Blowing Agent 10B); or consists of trans1233zd (referred to hereinafter for convenience as Blowing Agent 11B).

It is thus contemplated that the blowing agent of the present invention, including each of Blowing Agents 1-11, can include, in addition to each of the above-identified blowing agent(s), co-blowing agent including in one or more of the optional potential co-blowing agents as described below. In preferred embodiments, the present foamable compositions, extruded foams, and extruding methods include a blowing agent as described according described herein, wherein the indicated blowing agent (including the compound or group of compound(s) specifically identified in each of Blowing Agent 1-11) is present in an amount, based upon the total weight of all blowing agent present, of at least about 50% by weight, or preferably at least about 60% by weight, preferably at least about 70% by weight, or preferably at least about 80% by weight, or preferably at least about 90% by weight, or preferably at least about 95% by weight, or preferably at least about 99% by weight, based on the total of all blowing agent components.

It is contemplated and understood that blowing agent of the present invention, including each of Blowing Agents 1-11, can include one or more co-blowing agents which are not included in the indicated selection, provided that such co-blowing agent in the amount used does not interfere with or negate the ability to achieve relatively low-density extruded foams as described herein, including each of Extruded Foams 1-4, and preferably further does not interfere with or negate the ability to achieve extruded foam with mechanical strengths properties as described herein. It is contemplated, therefore, that given the teachings contained herein a person of skill in the art will be able to select, by way of example, one or more of the following potential co-blowing agents for use with a particular application without undue experimentation: one or more saturated hydrocarbons or hydrofluorocarbons (HFCs), particularly C4-C6 hydrocarbons or C1-C4 HFCs, that are known in the art. Examples of such HFC co-blowing agents include, but are not limited to, one or a combination of difluoromethane (HFC-32), fluoroethane (HFC-161), difluoroethane (HFC-152), trifluoroethane (HFC-143), tetrafluoroethane (HFC-134), pentafluoroethane (HFC-125), pentafluoropropane (HFC-245), hexafluoropropane (HFC-236), heptafluoropropane (HFC-227ea), pentafluorobutane (HFC-365), hexafluorobutane (HFC-356) and all isomers of all such HFC's. With respect to hydrocarbons, the present blowing agent compositions also may include in certain preferred embodiments, for example, iso, normal and/or cyclopentane and butane and/or isobutane. Other materials, such as water, CO2, CFCs (such as trichlorofluoromethane (CFC-11) and dichlorodifluoromethane (CFC-12)), hydrochlorocarbons (HCCs such as dichloroethylene (preferably trans-dichloroethylene), ethyl chloride and chloropropane), HCFCs, C1-C5 alcohols (such as, for example, ethanol and/or propanol and/or butanol), C1-C4 aldehydes, C1-C4 ketones, C1-C4 ethers (including ethers (such as dimethyl ether and diethyl ether), diethers (such as dimethoxy methane and diethoxy methane)), and methyl formate, organic acids (such as but not limited to formic acid), including combinations of any of these may be included, although such components are not necessarily preferred in many embodiments due to negative environmental impact.

Extruded Foams and Extruding Process

The extruded foams of the present invention, including each of Extruded Foams 1-4, or extruded foam made from PEF polymer of the present invention, including Thermoplastic Polymer TPP1A-TPP22E, or any of the extruded PEF foams described in the Examples below may generally be formed from a foamable and extrudable composition of the present invention. In general, the foamable compositions of the present invention may be formed by combining a PEF polymer of the present invention, including each of Thermoplastic Polymer TPP1A-TPP22E, with a blowing agent of the present invention, including each of Blowing Agents 1-11.

Foamable compositions that are included within the present invention and which provide particular advantage in connection with forming the foams of the present invention, are described in the following Foamable Composition Table (Table 3A and Table 3B), in which all numerical values in the table are understood to be preceded by the word "about" and in which the following terms used in the table have the following meanings:

CBAG1 means co-blowing agent selected from the group consisting of 1336mzz(Z), 1336mzzm(E), 1224yd(Z), 1233zd(E), 1234yf and combinations of two or more of these.

CBAG2 means co-blowing agent selected from the group consisting of water, CO2, C1-C6 hydrocarbons (HCs) HCFCs, C1-C5 HFCs, C2-C4 hydrohaloolefins, C1-C5 alcohols, C1-C4 aldehydes, C1-C4 ketones, C1-C4 ethers, C1-C4 esters, organic acids and combinations of two or more of these.

CCBAG3 means co-blowing agent selected from the group consisting of water, CO2, isobutane, n-butane, isopentane, cyclopentane, cyclohexane, trans-dichloroethylene, ethanol, propanol, butanol, acetone, dimethyl ether, diethyl ether, dimethoxy methane, diethoxy methane, methyl formate, difluoromethane (HFC-32), fluoroethane (HFC-161), 1,1-difluoroethane (HFC-152a), trifluoroethane (HFC-143), 1,1,1,2-tetrafluoroethane (HFC-134a), pentafluoroethane (HFC-125), pentafluoropropane (HFC-245), hexafluoropropane (HFC-236), heptafluoropropane (HFC-227ea), pentafluorobutane (HFC-365), hexafluorobutane (HFC-356), and combinations of any two or more of these.

NR means not required.

TABLE 3A

FOAMABLE COMPOSITION TABLE

| | Foamable Composition Components | Blowing Agent(s) and Amounts, wt % of All Blowing Agents | | | |
|---|---|---|---|---|---|
| Foamable Composition Number | Polymer, TPP No. | Blowing Agent 1 (BA1) | Wt % BA1 | Co Blowing Agent(s) (CB) | Wt % CB |
| FC1A1 | TPP1A | 1234ze(E) | 100 | NR | 0 |
| FC1B1 | TPP1B | 1234ze(E) | 100 | NR | 0 |
| FC1C1 | TPP1C | 1234ze(E) | 100 | NR | 0 |
| FC1D1 | TPP1D | 1234ze(E) | 100 | NR | 0 |
| FC1E1 | TPP1E | 1234ze(E) | 100 | NR | 0 |
| FC1A2 | TPP2A | 1234ze(E) | 100 | NR | 0 |
| FC1B2 | TPP2B | 1234ze(E) | 100 | NR | 0 |
| FC1C2 | TPP2C | 1234ze(E) | 100 | NR | 0 |
| FC1D2 | TPP2D | 1234ze(E) | 100 | NR | 0 |
| FC1E2 | TPP2E | 1234ze(E) | 100 | NR | 0 |
| FC1A3 | TPP3A | 1234ze(E) | 100 | NR | 0 |
| FC1B3 | TPP3B | 1234ze(E) | 100 | NR | 0 |
| FC1C3 | TPP3C | 1234ze(E) | 100 | NR | 0 |
| FC1D3 | TPP3D | 1234ze(E) | 100 | NR | 0 |
| FC1E3 | TPP3E | 1234ze(E) | 100 | NR | 0 |
| FC1A4 | TPP4A | 1234ze(E) | 100 | NR | 0 |
| FC1B4 | TPP4B | 1234ze(E) | 100 | NR | 0 |
| FC1C4 | TPP4C | 1234ze(E) | 100 | NR | 0 |
| FC1D4 | TPP4D | 1234ze(E) | 100 | NR | 0 |
| FC1E4 | TPP4E | 1234ze(E) | 100 | NR | 0 |
| FC1A5 | TPP5A | 1234ze(E) | 100 | NR | 0 |
| FC1B5 | TPP5B | 1234ze(E) | 100 | NR | 0 |
| FC1C5 | TPP5C | 1234ze(E) | 100 | NR | 0 |
| FC1D5 | TPP5D | 1234ze(E) | 100 | NR | 0 |
| FC1E5 | TPP5E | 1234ze(E) | 100 | NR | 0 |
| FC1A6 | TPP6A | 1234ze(E) | 100 | NR | 0 |
| FC1B6 | TPP6B | 1234ze(E) | 100 | NR | 0 |
| FC1C6 | TPP6C | 1234ze(E) | 100 | NR | 0 |
| FC1D6 | TPP6D | 1234ze(E) | 100 | NR | 0 |
| FC1E6 | TPP6E | 1234ze(E) | 100 | NR | 0 |
| FC2A1 | TPP1A | 1234ze(E) | 5-95 | CBAG1 | 5-95 |
| FC2B1 | TPP1B | 1234ze(E) | 5-95 | CBAG1 | 5-95 |
| FC2C1 | TPP1C | 1234ze(E) | 5-95 | CBAG1 | 5-95 |
| FC2D1 | TPP1D | 1234ze(E) | 5-95 | CBAG1 | 5-95 |
| FC2E1 | TPP1E | 1234ze(E) | 5-95 | CBAG1 | 5-95 |
| FC2A2 | TPP2A | 1234ze(E) | 5-95 | CBAG1 | 5-95 |
| FC2B2 | TPP2B | 1234ze(E) | 5-95 | CBAG1 | 5-95 |
| FC2C2 | TPP2C | 1234ze(E) | 5-95 | CBAG1 | 5-95 |
| FC2D2 | TPP2D | 1234ze(E) | 5-95 | CBAG1 | 5-95 |
| FC2E2 | TPP2E | 1234ze(E) | 5-95 | CBAG1 | 5-95 |
| FC2A3 | TPP3A | 1234ze(E) | 5-95 | CBAG1 | 5-95 |
| FC2B3 | TPP3B | 1234ze(E) | 5-95 | CBAG1 | 5-95 |
| FC2C3 | TPP3C | 1234ze(E) | 5-95 | CBAG1 | 5-95 |
| FC2D3 | TPP3D | 1234ze(E) | 5-95 | CBAG1 | 5-95 |
| FC2E3 | TPP3E | 1234ze(E) | 5-95 | CBAG1 | 5-95 |
| FC2A4 | TPP4A | 1234ze(E) | 5-95 | CBAG1 | 5-95 |
| FC2B4 | TPP4B | 1234ze(E) | 5-95 | CBAG1 | 5-95 |
| FC2C4 | TPP4C | 1234ze(E) | 5-95 | CBAG1 | 5-95 |
| FC2D4 | TPP4D | 1234ze(E) | 5-95 | CBAG1 | 5-95 |
| FC2E4 | TPP4E | 1234ze(E) | 5-95 | CBAG1 | 5-95 |
| FC2A5 | TPP5A | 1234ze(E) | 5-95 | CBAG1 | 5-95 |
| FC2B5 | TPP5B | 1234ze(E) | 5-95 | CBAG1 | 5-95 |
| FC2C5 | TPP5C | 1234ze(E) | 5-95 | CBAG1 | 5-95 |
| FC2D5 | TPP5D | 1234ze(E) | 5-95 | CBAG1 | 5-95 |
| FC2E5 | TPP5E | 1234ze(E) | 5-95 | CBAG1 | 5-95 |
| FC2A6 | TPP6A | 1234ze(E) | 5-95 | CBAG1 | 5-95 |
| FC2B6 | TPP6B | 1234ze(E) | 5-95 | CBAG1 | 5-95 |

TABLE 3A-continued

| FOAMABLE COMPOSITION TABLE | | | | | |
|---|---|---|---|---|---|
| | Foamable Composition Components | | | | |
| | | Blowing Agent(s) and Amounts, wt % of All Blowing Agents | | | |
| Foamable Composition Number | Polymer, TPP No. | Blowing Agent 1 (BA1) | Wt % BA1 | Co Blowing Agent(s) (CB) | Wt % CB |
| FC2C6 | TPP6C | 1234ze(E) | 5-95 | CBAG1 | 5-95 |
| FC2D6 | TPP6D | 1234ze(E) | 5-95 | CBAG1 | 5-95 |
| FC2E6 | TPP6E | 1234ze(E) | 5-95 | CBAG1 | 5-95 |
| FC3A1 | TPP1A | 1234ze(E) | 5-95 | CBAG2 | 5-95 |
| FC3B1 | TPP1B | 1234ze(E) | 5-95 | CBAG2 | 5-95 |
| FC3C1 | TPP1C | 1234ze(E) | 5-95 | CBAG2 | 5-95 |
| FC3D1 | TPP1D | 1234ze(E) | 5-95 | CBAG2 | 5-95 |
| FC3E1 | TPP1E | 1234ze(E) | 5-95 | CBAG2 | 5-95 |
| FC3A2 | TPP2A | 1234ze(E) | 5-95 | CBAG2 | 5-95 |
| FC3B2 | TPP2B | 1234ze(E) | 5-95 | CBAG2 | 5-95 |
| FC3C2 | TPP2C | 1234ze(E) | 5-95 | CBAG2 | 5-95 |
| FC3D2 | TPP2D | 1234ze(E) | 5-95 | CBAG2 | 5-95 |
| FC3E2 | TPP2E | 1234ze(E) | 5-95 | CBAG2 | 5-95 |
| FC3A3 | TPP3A | 1234ze(E) | 5-95 | CBAG2 | 5-95 |
| FC3B3 | TPP3B | 1234ze(E) | 5-95 | CBAG2 | 5-95 |
| FC3C3 | TPP3C | 1234ze(E) | 5-95 | CBAG2 | 5-95 |
| FC3D3 | TPP3D | 1234ze(E) | 5-95 | CBAG2 | 5-95 |
| FC3E3 | TPP3E | 1234ze(E) | 5-95 | CBAG2 | 5-95 |
| FC3A4 | TPP4A | 1234ze(E) | 5-95 | CBAG2 | 5-95 |
| FC3B4 | TPP4B | 1234ze(E) | 5-95 | CBAG2 | 5-95 |
| FC3C4 | TPP4C | 1234ze(E) | 5-95 | CBAG2 | 5-95 |
| FC3D4 | TPP4D | 1234ze(E) | 5-95 | CBAG2 | 5-95 |
| FC3E4 | TPP4E | 1234ze(E) | 5-95 | CBAG2 | 5-95 |
| FC3A5 | TPP5A | 1234ze(E) | 5-95 | CBAG2 | 5-95 |
| FC3B5 | TPP5B | 1234ze(E) | 5-95 | CBAG2 | 5-95 |
| FC3C5 | TPP5C | 1234ze(E) | 5-95 | CBAG2 | 5-95 |
| FC3D5 | TPP5D | 1234ze(E) | 5-95 | CBAG2 | 5-95 |
| FC3E5 | TPP5E | 1234ze(E) | 5-95 | CBAG2 | 5-95 |
| FC3A6 | TPP6A | 1234ze(E) | 5-95 | CBAG2 | 5-95 |
| FC3B6 | TPP6B | 1234ze(E) | 5-95 | CBAG2 | 5-95 |
| FC3C6 | TPP6C | 1234ze(E) | 5-95 | CBAG2 | 5-95 |
| FC3D6 | TPP6D | 1234ze(E) | 5-95 | CBAG2 | 5-95 |
| FC3E6 | TPP6E | 1234ze(E) | 5-95 | CBAG2 | 5-95 |
| FC4A1 | TPP1A | 1234ze(E) | 5-95 | CBAG3 | 5-95 |
| FC4B1 | TPP1B | 1234ze(E) | 5-95 | CBAG3 | 5-95 |
| FC4C1 | TPP1C | 1234ze(E) | 5-95 | CBAG3 | 5-95 |
| FC4D1 | TPP1D | 1234ze(E) | 5-95 | CBAG3 | 5-95 |
| FC4E1 | TPP1E | 1234ze(E) | 5-95 | CBAG3 | 5-95 |
| FC4A2 | TPP2A | 1234ze(E) | 5-95 | CBAG3 | 5-95 |
| FC4B2 | TPP2B | 1234ze(E) | 5-95 | CBAG3 | 5-95 |
| FC4C2 | TPP2C | 1234ze(E) | 5-95 | CBAG3 | 5-95 |
| FC4D2 | TPP2D | 1234ze(E) | 5-95 | CBAG3 | 5-95 |
| FC4E2 | TPP2E | 1234ze(E) | 5-95 | CBAG3 | 5-95 |
| FC4A3 | TPP3A | 1234ze(E) | 5-95 | CBAG3 | 5-95 |
| FC4B3 | TPP3B | 1234ze(E) | 5-95 | CBAG3 | 5-95 |
| FC4C3 | TPP3C | 1234ze(E) | 5-95 | CBAG3 | 5-95 |
| FC4D3 | TPP3D | 1234ze(E) | 5-95 | CBAG3 | 5-95 |
| FC4E3 | TPP3E | 1234ze(E) | 5-95 | CBAG3 | 5-95 |
| FC4A4 | TPP4A | 1234ze(E) | 5-95 | CBAG3 | 5-95 |
| FC4B4 | TPP4B | 1234ze(E) | 5-95 | CBAG3 | 5-95 |
| FC4C4 | TPP4C | 1234ze(E) | 5-95 | CBAG3 | 5-95 |
| FC4D4 | TPP4D | 1234ze(E) | 5-95 | CBAG3 | 5-95 |
| FC4E4 | TPP4E | 1234ze(E) | 5-95 | CBAG3 | 5-95 |
| FC4A5 | TPP5A | 1234ze(E) | 5-95 | CBAG3 | 5-95 |
| FC4B5 | TPP5B | 1234ze(E) | 5-95 | CBAG3 | 5-95 |
| FC4C5 | TPP5C | 1234ze(E) | 5-95 | CBAG3 | 5-95 |
| FC4D5 | TPP5D | 1234ze(E) | 5-95 | CBAG3 | 5-95 |
| FC4E5 | TPP5E | 1234ze(E) | 5-95 | CBAG3 | 5-95 |
| FC4A6 | TPP6A | 1234ze(E) | 5-95 | CBAG3 | 5-95 |
| FC4B6 | TPP6B | 1234ze(E) | 5-95 | CBAG3 | 5-95 |
| FC4C6 | TPP6C | 1234ze(E) | 5-95 | CBAG3 | 5-95 |
| FC4D6 | TPP6D | 1234ze(E) | 5-95 | CBAG3 | 5-95 |
| FC4E6 | TPP6E | 1234ze(E) | 5-95 | CBAG3 | 5-95 |
| FC5A1 | TPP1A | 1234ze(E) | 5-95 | cyclopentane | 5-95 |
| FC5B1 | TPP1B | 1234ze(E) | 5-95 | cyclopentane | 5-95 |
| FC5C1 | TPP1C | 1234ze(E) | 5-95 | cyclopentane | 5-95 |
| FC5D1 | TPP1D | 1234ze(E) | 5-95 | cyclopentane | 5-95 |
| FC5E1 | TPP1E | 1234ze(E) | 5-95 | cyclopentane | 5-95 |
| FC5A2 | TPP2A | 1234ze(E) | 5-95 | cyclopentane | 5-95 |
| FC5B2 | TPP2B | 1234ze(E) | 5-95 | cyclopentane | 5-95 |

TABLE 3A-continued

| FOAMABLE COMPOSITION TABLE | | | | | |
|---|---|---|---|---|---|
| | Foamable Composition Components | | | | |
| | | Blowing Agent(s) and Amounts, wt % of All Blowing Agents | | | |
| Foamable Composition Number | Polymer, TPP No. | Blowing Agent 1 (BA1) | Wt % BA1 | Co Blowing Agent(s) (CB) | Wt % CB |
| FC5C2 | TPP2C | 1234ze(E) | 5-95 | cyclopentane | 5-95 |
| FC5D2 | TPP2D | 1234ze(E) | 5-95 | cyclopentane | 5-95 |
| FC5E2 | TPP2E | 1234ze(E) | 5-95 | cyclopentane | 5-95 |
| FC5A3 | TPP3A | 1234ze(E) | 5-95 | cyclopentane | 5-95 |
| FC5B3 | TPP3B | 1234ze(E) | 5-95 | cyclopentane | 5-95 |
| FC5C3 | TPP3C | 1234ze(E) | 5-95 | cyclopentane | 5-95 |
| FC5D3 | TPP3D | 1234ze(E) | 5-95 | cyclopentane | 5-95 |
| FC5E3 | TPP3E | 1234ze(E) | 5-95 | cyclopentane | 5-95 |
| FC5A4 | TPP4A | 1234ze(E) | 5-95 | cyclopentane | 5-95 |
| FC5B4 | TPP4B | 1234ze(E) | 5-95 | cyclopentane | 5-95 |
| FC5C4 | TPP4C | 1234ze(E) | 5-95 | cyclopentane | 5-95 |
| FC5D4 | TPP4D | 1234ze(E) | 5-95 | cyclopentane | 5-95 |
| FC5E4 | TPP4E | 1234ze(E) | 5-95 | cyclopentane | 5-95 |
| FC5A5 | TPP5A | 1234ze(E) | 5-95 | cyclopentane | 5-95 |
| FC5B5 | TPP5B | 1234ze(E) | 5-95 | cyclopentane | 5-95 |
| FC5C5 | TPP5C | 1234ze(E) | 5-95 | cyclopentane | 5-95 |
| FC5D5 | TPP5D | 1234ze(E) | 5-95 | cyclopentane | 5-95 |
| FC5E5 | TPP5E | 1234ze(E) | 5-95 | cyclopentane | 5-95 |
| FC5A6 | TPP6A | 1234ze(E) | 5-95 | cyclopentane | 5-95 |
| FC5B6 | TPP6B | 1234ze(E) | 5-95 | cyclopentane | 5-95 |
| FC5C6 | TPP6C | 1234ze(E) | 5-95 | cyclopentane | 5-95 |
| FC5D6 | TPP6D | 1234ze(E) | 5-95 | cyclopentane | 5-95 |
| FC5E6 | TPP6E | 1234ze(E) | 5-95 | cyclopentane | 5-95 |
| FC6A1 | TPP1A | 1234ze(E) | 5-95 | HFC-134a | 5-95 |
| FC6B1 | TPP1B | 1234ze(E) | 5-95 | HFC-134a | 5-95 |
| FC6C1 | TPP1C | 1234ze(E) | 5-95 | HFC-134a | 5-95 |
| FC6D1 | TPP1D | 1234ze(E) | 5-95 | HFC-134a | 5-95 |
| FC6E1 | TPP1E | 1234ze(E) | 5-95 | HFC-134a | 5-95 |
| FC6A2 | TPP2A | 1234ze(E) | 5-95 | HFC-134a | 5-95 |
| FC6B2 | TPP2B | 1234ze(E) | 5-95 | HFC-134a | 5-95 |
| FC6C2 | TPP2C | 1234ze(E) | 5-95 | HFC-134a | 5-95 |
| FC6D2 | TPP2D | 1234ze(E) | 5-95 | HFC-134a | 5-95 |
| FC6E2 | TPP2E | 1234ze(E) | 5-95 | HFC-134a | 5-95 |
| FC6A3 | TPP3A | 1234ze(E) | 5-95 | HFC-134a | 5-95 |
| FC6B3 | TPP3B | 1234ze(E) | 5-95 | HFC-134a | 5-95 |
| FC6C3 | TPP3C | 1234ze(E) | 5-95 | HFC-134a | 5-95 |
| FC6D3 | TPP3D | 1234ze(E) | 5-95 | HFC-134a | 5-95 |
| FC6E3 | TPP3E | 1234ze(E) | 5-95 | HFC-134a | 5-95 |
| FC6A4 | TPP4A | 1234ze(E) | 5-95 | HFC-134a | 5-95 |
| FC6B4 | TPP4B | 1234ze(E) | 5-95 | HFC-134a | 5-95 |
| FC6C4 | TPP4C | 1234ze(E) | 5-95 | HFC-134a | 5-95 |
| FC6D4 | TPP4D | 1234ze(E) | 5-95 | HFC-134a | 5-95 |
| FC6E4 | TPP4E | 1234ze(E) | 5-95 | HFC-134a | 5-95 |
| FC6A5 | TPP5A | 1234ze(E) | 5-95 | HFC-134a | 5-95 |
| FC6B5 | TPP5B | 1234ze(E) | 5-95 | HFC-134a | 5-95 |
| FC6C5 | TPP5C | 1234ze(E) | 5-95 | HFC-134a | 5-95 |
| FC6D5 | TPP5D | 1234ze(E) | 5-95 | HFC-134a | 5-95 |
| FC6E5 | TPP5E | 1234ze(E) | 5-95 | HFC-134a | 5-95 |
| FC6A6 | TPP6A | 1234ze(E) | 5-95 | HFC-134a | 5-95 |
| FC6B6 | TPP6B | 1234ze(E) | 5-95 | HFC-134a | 5-95 |
| FC6C6 | TPP6C | 1234ze(E) | 5-95 | HFC-134a | 5-95 |
| FC6D6 | TPP6D | 1234ze(E) | 5-95 | HFC-134a | 5-95 |
| FC6E6 | TPP6E | 1234ze(E) | 5-95 | HFC-134a | 5-95 |
| FC7A1 | TPP1A | 1234ze(E) | 5-95 | $CO_2$ | 5-95 |
| FC7B1 | TPP1B | 1234ze(E) | 5-95 | $CO_2$ | 5-95 |
| FC7C1 | TPP1C | 1234ze(E) | 5-95 | $CO_2$ | 5-95 |
| FC7D1 | TPP1D | 1234ze(E) | 5-95 | $CO_2$ | 5-95 |
| FC7E1 | TPP1E | 1234ze(E) | 5-95 | $CO_2$ | 5-95 |
| FC7A2 | TPP2A | 1234ze(E) | 5-95 | $CO_2$ | 5-95 |
| FC7B2 | TPP2B | 1234ze(E) | 5-95 | $CO_2$ | 5-95 |
| FC7C2 | TPP2C | 1234ze(E) | 5-95 | $CO_2$ | 5-95 |
| FC7D2 | TPP2D | 1234ze(E) | 5-95 | $CO_2$ | 5-95 |
| FC7E2 | TPP2E | 1234ze(E) | 5-95 | $CO_2$ | 5-95 |
| FC7A3 | TPP3A | 1234ze(E) | 5-95 | $CO_2$ | 5-95 |
| FC7B3 | TPP3B | 1234ze(E) | 5-95 | $CO_2$ | 5-95 |
| FC7C3 | TPP3C | 1234ze(E) | 5-95 | $CO_2$ | 5-95 |
| FC7D3 | TPP3D | 1234ze(E) | 5-95 | $CO_2$ | 5-95 |
| FC7E3 | TPP3E | 1234ze(E) | 5-95 | $CO_2$ | 5-95 |
| FC7A4 | TPP4A | 1234ze(E) | 5-95 | $CO_2$ | 5-95 |
| FC7B4 | TPP4B | 1234ze(E) | 5-95 | $CO_2$ | 5-95 |

TABLE 3A-continued

| FOAMABLE COMPOSITION TABLE | | | | | |
|---|---|---|---|---|---|
| | Foamable Composition Components | | | | |
| | | Blowing Agent(s) and Amounts, wt % of All Blowing Agents | | | |
| Foamable Composition Number | Polymer, TPP No. | Blowing Agent 1 (BA1) | Wt % BA1 | Co Blowing Agent(s) (CB) | Wt % CB |
| FC7C4 | TPP4C | 1234ze(E) | 5-95 | $CO_2$ | 5-95 |
| FC7D4 | TPP4D | 1234ze(E) | 5-95 | $CO_2$ | 5-95 |
| FC7E4 | TPP4E | 1234ze(E) | 5-95 | $CO_2$ | 5-95 |
| FC7A5 | TPP5A | 1234ze(E) | 5-95 | $CO_2$ | 5-95 |
| FC7B5 | TPP5B | 1234ze(E) | 5-95 | $CO_2$ | 5-95 |
| FC7C5 | TPP5C | 1234ze(E) | 5-95 | $CO_2$ | 5-95 |
| FC7D5 | TPP5D | 1234ze(E) | 5-95 | $CO_2$ | 5-95 |
| FC7E5 | TPP5E | 1234ze(E) | 5-95 | $CO_2$ | 5-95 |
| FC7A6 | TPP6A | 1234ze(E) | 5-95 | $CO_2$ | 5-95 |
| FC7B6 | TPP6B | 1234ze(E) | 5-95 | $CO_2$ | 5-95 |
| FC7C6 | TPP6C | 1234ze(E) | 5-95 | $CO_2$ | 5-95 |
| FC7D6 | TPP6D | 1234ze(E) | 5-95 | $CO_2$ | 5-95 |
| FC7E6 | TPP6E | 1234ze(E) | 5-95 | $CO_2$ | 5-95 |
| FC8A1 | TPP1A | 1234ze(E) | 5-95 | 1233zd(E) | 5-95 |
| FC8B1 | TPP1B | 1234ze(E) | 5-95 | 1233zd(E) | 5-95 |
| FC8C1 | TPP1C | 1234ze(E) | 5-95 | 1233zd(E) | 5-95 |
| FC8D1 | TPP1D | 1234ze(E) | 5-95 | 1233zd(E) | 5-95 |
| FC8E1 | TPP1E | 1234ze(E) | 5-95 | 1233zd(E) | 5-95 |
| FC8A2 | TPP2A | 1234ze(E) | 5-95 | 1233zd(E) | 5-95 |
| FC8B2 | TPP2B | 1234ze(E) | 5-95 | 1233zd(E) | 5-95 |
| FC8C2 | TPP2C | 1234ze(E) | 5-95 | 1233zd(E) | 5-95 |
| FC8D2 | TPP2D | 1234ze(E) | 5-95 | 1233zd(E) | 5-95 |
| FC8E2 | TPP2E | 1234ze(E) | 5-95 | 1233zd(E) | 5-95 |
| FC8A3 | TPP3A | 1234ze(E) | 5-95 | 1233zd(E) | 5-95 |
| FC8B3 | TPP3B | 1234ze(E) | 5-95 | 1233zd(E) | 5-95 |
| FC8C3 | TPP3C | 1234ze(E) | 5-95 | 1233zd(E) | 5-95 |
| FC8D3 | TPP3D | 1234ze(E) | 5-95 | 1233zd(E) | 5-95 |
| FC8E3 | TPP3E | 1234ze(E) | 5-95 | 1233zd(E) | 5-95 |
| FC8A4 | TPP4A | 1234ze(E) | 5-95 | 1233zd(E) | 5-95 |
| FC8B4 | TPP4B | 1234ze(E) | 5-95 | 1233zd(E) | 5-95 |
| FC8C4 | TPP4C | 1234ze(E) | 5-95 | 1233zd(E) | 5-95 |
| FC8D4 | TPP4D | 1234ze(E) | 5-95 | 1233zd(E) | 5-95 |
| FC8E4 | TPP4E | 1234ze(E) | 5-95 | 1233zd(E) | 5-95 |
| FC8A5 | TPP5A | 1234ze(E) | 5-95 | 1233zd(E) | 5-95 |
| FC8B5 | TPP5B | 1234ze(E) | 5-95 | 1233zd(E) | 5-95 |
| FC8C5 | TPP5C | 1234ze(E) | 5-95 | 1233zd(E) | 5-95 |
| FC8D5 | TPP5D | 1234ze(E) | 5-95 | 1233zd(E) | 5-95 |
| FC8E5 | TPP5E | 1234ze(E) | 5-95 | 1233zd(E) | 5-95 |
| FC8A6 | TPP6A | 1234ze(E) | 5-95 | 1233zd(E) | 5-95 |
| FC8B6 | TPP6B | 1234ze(E) | 5-95 | 1233zd(E) | 5-95 |
| FC8C6 | TPP6C | 1234ze(E) | 5-95 | 1233zd(E) | 5-95 |
| FC8D6 | TPP6D | 1234ze(E) | 5-95 | 1233zd(E) | 5-95 |
| FC8E6 | TPP6E | 1234ze(E) | 5-95 | 1233zd(E) | 5-95 |

TABLE 3BA

| FOAMABLE COMPOSITION TABLE | | | | | |
|---|---|---|---|---|---|
| | Foamable Composition Components | | | | |
| Foamable | | Blowing Agent(s) and Amounts, wt % of All Blowing Agents | | | |
| Composition Number | Polymer, TPP No. | Blowing Agent 1 (BA1) | Wt % BA1 | Co Blowing Agent(s) (CB) | Wt % CB |
| FC9A1 | TPP17A | 1234ze(E) | 100 | NR | 0 |
| FC9B1 | TPP17B | 1234ze(E) | 100 | NR | 0 |
| FC9C1 | TPP17C | 1234ze(E) | 100 | NR | 0 |
| FC9D1 | TPP17D | 1234ze(E) | 100 | NR | 0 |
| FC9E1 | TPP17E | 1234ze(E) | 100 | NR | 0 |
| FC9A2 | TPP18A | 1234ze(E) | 100 | NR | 0 |
| FC9B2 | TPP18B | 1234ze(E) | 100 | NR | 0 |
| FC9C2 | TPP18C | 1234ze(E) | 100 | NR | 0 |
| FC9D2 | TPP18D | 1234ze(E) | 100 | NR | 0 |
| FC9E2 | TPP18E | 1234ze(E) | 100 | NR | 0 |
| FC9A3 | TPP18A | 1234ze(E) | 100 | NR | 0 |
| FC9B3 | TPP18B | 1234ze(E) | 100 | NR | 0 |

TABLE 3BA-continued

| FOAMABLE COMPOSITION TABLE | | | | | |
|---|---|---|---|---|---|
| | Foamable Composition Components | | | | |
| Foamable | | Blowing Agent(s) and Amounts, wt % of All Blowing Agents | | | |
| Composition Number | Polymer, TPP No. | Blowing Agent 1 (BA1) | Wt % BA1 | Co Blowing Agent(s) (CB) | Wt % CB |
| FC9C3 | TPP18C | 1234ze(E) | 100 | NR | 0 |
| FC9D3 | TPP18 | 1234ze(E) | 100 | NR | 0 |
| FC9E3 | TPP18 | 1234ze(E) | 100 | NR | 0 |
| FC9A4 | TPP19A | 1234ze(E) | 100 | NR | 0 |
| FC9B4 | TPP19B | 1234ze(E) | 100 | NR | 0 |
| FC9C4 | TPP19C | 1234ze(E) | 100 | NR | 0 |
| FC9D4 | TPP19D | 1234ze(E) | 100 | NR | 0 |
| FC9E4 | TPP19E | 1234ze(E) | 100 | NR | 0 |
| FC9A5 | TPP20A | 1234ze(E) | 100 | NR | 0 |
| FC9B5 | TPP20B | 1234ze(E) | 100 | NR | 0 |
| FC9C5 | TPP20C | 1234ze(E) | 100 | NR | 0 |
| FC9D5 | TPP20D | 1234ze(E) | 100 | NR | 0 |
| FC9E5 | TPP20E | 1234ze(E) | 100 | NR | 0 |
| FC9A6 | TPP17A | 1234ze(E) | 100 | NR | 0 |
| FC9B6 | TPP17B | 1234ze(E) | 100 | NR | 0 |
| FC9C6 | TPP17C | 1234ze(E) | 100 | NR | 0 |
| FC9D6 | TPP17D | 1234ze(E) | 100 | NR | 0 |
| FC9E6 | TPP17E | 1234ze(E) | 100 | NR | 0 |
| FC10A1 | TPP17A | 1234ze(E) | 5-95 | CBAG1 | 5-95 |
| FC10B1 | TPP17B | 1234ze(E) | 5-95 | CBAG1 | 5-95 |
| FC10C1 | TPP17C | 1234ze(E) | 5-95 | CBAG1 | 5-95 |
| FC10D1 | TPP17D | 1234ze(E) | 5-95 | CBAG1 | 5-95 |
| FC10E1 | TPP17E | 1234ze(E) | 5-95 | CBAG1 | 5-95 |
| FC10A2 | TPP18A | 1234ze(E) | 5-95 | CBAG1 | 5-95 |
| FC10B2 | TPP18B | 1234ze(E) | 5-95 | CBAG1 | 5-95 |
| FC10C2 | TPP18C | 1234ze(E) | 5-95 | CBAG1 | 5-95 |
| FC10D2 | TPP18D | 1234ze(E) | 5-95 | CBAG1 | 5-95 |
| FC10E2 | TPP18E | 1234ze(E) | 5-95 | CBAG1 | 5-95 |
| FC10A3 | TPP18A | 1234ze(E) | 5-95 | CBAG1 | 5-95 |
| FC10B3 | TPP18B | 1234ze(E) | 5-95 | CBAG1 | 5-95 |
| FC10C3 | TPP18C | 1234ze(E) | 5-95 | CBAG1 | 5-95 |
| FC10D3 | TPP19D | 1234ze(E) | 5-95 | CBAG1 | 5-95 |
| FC10E3 | TPP19E | 1234ze(E) | 5-95 | CBAG1 | 5-95 |
| FC10A4 | TPP20A | 1234ze(E) | 5-95 | CBAG1 | 5-95 |
| FC10B4 | TPP20B | 1234ze(E) | 5-95 | CBAG1 | 5-95 |
| FC10C4 | TPP20C | 1234ze(E) | 5-95 | CBAG1 | 5-95 |
| FC10D4 | TPP20D | 1234ze(E) | 5-95 | CBAG1 | 5-95 |
| FC10E4 | TPP20E | 1234ze(E) | 5-95 | CBAG1 | 5-95 |
| FC10A5 | TPP20A | 1234ze(E) | 5-95 | CBAG1 | 5-95 |
| FC10B5 | TPP20B | 1234ze(E) | 5-95 | CBAG1 | 5-95 |
| FC10C5 | TPP20C | 1234ze(E) | 5-95 | CBAG1 | 5-95 |
| FC10D5 | TPP20D | 1234ze(E) | 5-95 | CBAG1 | 5-95 |
| FC10E5 | TPP20E | 1234ze(E) | 5-95 | CBAG1 | 5-95 |
| FC10A6 | TPP21A | 1234ze(E) | 5-95 | CBAG1 | 5-95 |
| FC10B6 | TPP21B | 1234ze(E) | 5-95 | CBAG1 | 5-95 |
| FC10C6 | TPP21C | 1234ze(E) | 5-95 | CBAG1 | 5-95 |
| FC10D6 | TPP21D | 1234ze(E) | 5-95 | CBAG1 | 5-95 |
| FC10E6 | TPP21E | 1234ze(E) | 5-95 | CBAG1 | 5-95 |
| FC11A1 | TPP17A | 1234ze(E) | 5-95 | CBAG2 | 5-95 |
| FC11B1 | TPP17B | 1234ze(E) | 5-95 | CBAG2 | 5-95 |
| FC11C1 | TPP17C | 1234ze(E) | 5-95 | CBAG2 | 5-95 |
| FC11D1 | TPP17D | 1234ze(E) | 5-95 | CBAG2 | 5-95 |
| FC11E1 | TPP17E | 1234ze(E) | 5-95 | CBAG2 | 5-95 |
| FC11A2 | TPP18A | 1234ze(E) | 5-95 | CBAG2 | 5-95 |
| FC11B2 | TPP18B | 1234ze(E) | 5-95 | CBAG2 | 5-95 |
| FC11C2 | TPP18C | 1234ze(E) | 5-95 | CBAG2 | 5-95 |
| FC11D2 | TPP18D | 1234ze(E) | 5-95 | CBAG2 | 5-95 |
| FC11E2 | TPP18E | 1234ze(E) | 5-95 | CBAG2 | 5-95 |
| FC11A3 | TPP19A | 1234ze(E) | 5-95 | CBAG2 | 5-95 |
| FC11B3 | TPP19B | 1234ze(E) | 5-95 | CBAG2 | 5-95 |
| FC11C3 | TPP19C | 1234ze(E) | 5-95 | CBAG2 | 5-95 |
| FC11D3 | TPP19D | 1234ze(E) | 5-95 | CBAG2 | 5-95 |
| FC11E3 | TPP19E | 1234ze(E) | 5-95 | CBAG2 | 5-95 |
| FC11A4 | TPP20A | 1234ze(E) | 5-95 | CBAG2 | 5-95 |
| FC11B4 | TPP20B | 1234ze(E) | 5-95 | CBAG2 | 5-95 |
| FC11C4 | TPP20C | 1234ze(E) | 5-95 | CBAG2 | 5-95 |
| FC11D4 | TPP20D | 1234ze(E) | 5-95 | CBAG2 | 5-95 |
| FC11E4 | TPP20E | 1234ze(E) | 5-95 | CBAG2 | 5-95 |
| FC11A5 | TPP21A | 1234ze(E) | 5-95 | CBAG2 | 5-95 |
| FC11B5 | TPP21B | 1234ze(E) | 5-95 | CBAG2 | 5-95 |
| FC11C5 | TPP21C | 1234ze(E) | 5-95 | CBAG2 | 5-95 |

TABLE 3BA-continued

FOAMABLE COMPOSITION TABLE

| Foamable Composition Number | Polymer, TPP No. | Blowing Agent 1 (BA1) | Wt % BA1 | Co Blowing Agent(s) (CB) | Wt % CB |
|---|---|---|---|---|---|
| | Foamable Composition Components: Blowing Agent(s) and Amounts, wt % of All Blowing Agents | | | | |
| FC11D5 | TPP21D | 1234ze(E) | 5-95 | CBAG2 | 5-95 |
| FC11E5 | TPP21E | 1234ze(E) | 5-95 | CBAG2 | 5-95 |
| FC11A6 | TPP22A | 1234ze(E) | 5-95 | CBAG2 | 5-95 |
| FC11B6 | TPP22B | 1234ze(E) | 5-95 | CBAG2 | 5-95 |
| FC11C6 | TPP22C | 1234ze(E) | 5-95 | CBAG2 | 5-95 |
| FC11D6 | TPP22D | 1234ze(E) | 5-95 | CBAG2 | 5-95 |
| FC11E6 | TPP22E | 1234ze(E) | 5-95 | CBAG2 | 5-95 |
| FC12A1 | TPP1A | 1336mzz | 5-100 | NR | NR |
| FC12B1 | TPP1B | 1336mzz | 5-100 | NR | NR |
| FC12C1 | TPPIC | 1336mzz | 5-100 | NR | NR |
| FC12D1 | TPP1D | 1336mzz | 5-100 | NR | NR |
| FC12E1 | TPPIE | 1336mzz | 5-100 | NR | NR |
| FC12A2 | TPP2A | 1336mzz | 5-100 | NR | NR |
| FC12B2 | TPP2B | 1336mzz | 5-100 | NR | NR |
| FC12C2 | TPP2C | 1336mzz | 5-100 | NR | NR |
| FC12D2 | TPP2D | 1336mzz | 5-100 | NR | NR |
| FC12E2 | TPP2E | 1336mzz | 5-100 | NR | NR |
| FC12A3 | TPP3A | 1336mzz | 5-100 | NR | NR |
| FC12B3 | TPP3B | 1336mzz | 5-100 | NR | NR |
| FC12C3 | TPP3C | 1336mzz | 5-100 | NR | NR |
| FC12D3 | TPP3D | 1336mzz | 5-100 | NR | NR |
| FC12E3 | TPP3E | 1336mzz | 5-100 | NR | NR |
| FC12A4 | TPP4A | 1336mzz | 5-100 | NR | NR |
| FC12B4 | TPP4B | 1336mzz | 5-100 | NR | NR |
| FC12C4 | TPP4C | 1336mzz | 5-100 | NR | NR |
| FC12D4 | TPP4D | 1336mzz | 5-100 | NR | NR |
| FC12E4 | TPP4E | 1336mzz | 5-100 | NR | NR |
| FC12A5 | TPP5A | 1336mzz | 5-100 | NR | NR |
| FC12B5 | TPP5B | 1336mzz | 5-100 | NR | NR |
| FC12C5 | TPP5C | 1336mzz | 5-100 | NR | NR |
| FC12D5 | TPP5D | 1336mzz | 5-100 | NR | NR |
| FC12E5 | TPP5E | 1336mzz | 5-100 | NR | NR |
| FC12A6 | TPP6A | 1336mzz | 5-100 | NR | NR |
| FC12B6 | TPP6B | 1336mzz | 5-100 | NR | NR |
| FC12C6 | TPP6C | 1336mzz | 5-100 | NR | NR |
| FC12D6 | TPP6D | 1336mzz | 5-100 | NR | NR |
| FC12E6 | TPP6E | 1336mzz | 5-100 | NR | NR |
| FC12B3 | TPP3B | 1336mzz | 5-100 | NR | NR |
| FC12C3 | TPP3C | 1336mzz | 5-100 | NR | NR |
| FC12D3 | TPP3D | 1336mzz | 5-100 | NR | NR |
| FC12E3 | TPP3E | 1336mzz | 5-100 | NR | NR |
| FC12A4 | TPP4A | 1336mzz | 5-100 | NR | NR |
| FC12B4 | TPP4B | 1336mzz | 5-100 | NR | NR |
| FC12C4 | TPP4C | 1336mzz | 5-100 | NR | NR |
| FC12D4 | TPP4D | 1336mzz | 5-100 | NR | NR |
| FC12E4 | TPP4E | 1336mzz | 5-100 | NR | NR |
| FC12A5 | TPP5A | 1336mzz | 5-100 | NR | NR |
| FC12B5 | TPP5B | 1336mzz | 5-100 | NR | NR |
| FC12C5 | TPP5C | 1336mzz | 5-100 | NR | NR |
| FC12D5 | TPP5D | 1336mzz | 5-100 | NR | NR |
| FC12E5 | TPP5E | 1336mzz | 5-100 | NR | NR |
| FC12A6 | TPP6A | 1336mzz | 5-100 | NR | NR |
| FC12B6 | TPP6B | 1336mzz | 5-100 | NR | NR |
| FC12C6 | TPP6C | 1336mzz | 5-100 | NR | NR |
| FC12D6 | TPP6D | 1336mzz | 5-100 | NR | NR |
| FC12E6 | TPP6E | 1336mzz | 5-100 | NR | NR |
| FC13A1 | TPPIA | 1224yd | 5-100 | NR | NR |
| FC13B1 | TPP1B | 1224yd | 5-100 | NR | NR |
| FC13C1 | TPPIC | 1224yd | 5-100 | NR | NR |
| FC13D1 | TPP1D | 1224yd | 5-100 | NR | NR |
| FC13E1 | TPPIE | 1224yd | 5-100 | NR | NR |
| FC13A2 | TPP2A | 1224yd | 5-100 | NR | NR |
| FC13B2 | TPP2B | 1224yd | 5-100 | NR | NR |
| FC13C2 | TPP2C | 1224yd | 5-100 | NR | NR |
| FC13D2 | TPP2D | 1224yd | 5-100 | NR | NR |
| FC13E2 | TPP2E | 1224yd | 5-100 | NR | NR |
| FC13A3 | TPP3A | 1224yd | 5-100 | NR | NR |
| FC13B3 | TPP3B | 1224yd | 5-100 | NR | NR |
| FC13C3 | TPP3C | 1224yd | 5-100 | NR | NR |
| FC13D3 | TPP3D | 1224yd | 5-100 | NR | NR |
| FC13E3 | TPP3E | 1224yd | 5-100 | NR | NR |

TABLE 3BA-continued

| FOAMABLE COMPOSITION TABLE | | | | | |
|---|---|---|---|---|---|
| | Foamable Composition Components | | | | |
| Foamable | | Blowing Agent(s) and Amounts, wt % of All Blowing Agents | | | |
| Composition Number | Polymer, TPP No. | Blowing Agent 1 (BA1) | Wt % BA1 | Co Blowing Agent(s) (CB) | Wt % CB |
| FC13A4 | TPP4A | 1224yd | 5-100 | NR | NR |
| FC13B4 | TPP4B | 1224yd | 5-100 | NR | NR |
| FC13C4 | TPP4C | 1224yd | 5-100 | NR | NR |
| FC13D4 | TPP4D | 1224yd | 5-100 | NR | NR |
| FC13E4 | TPP4E | 1224yd | 5-100 | NR | NR |
| FC13A5 | TPP5A | 1224yd | 5-100 | NR | NR |
| FC13B5 | TPP5B | 1224yd | 5-100 | NR | NR |
| FC13C5 | TPP5C | 1224yd | 5-100 | NR | NR |
| FC13D5 | TPP5D | 1224yd | 5-100 | NR | NR |
| FC13E5 | TPP5E | 1224yd | 5-100 | NR | NR |
| FC13A6 | TPP6A | 1224yd | 5-100 | NR | NR |
| FC13B6 | TPP6B | 1224yd | 5-100 | NR | NR |
| FC13C6 | TPP6C | 1224yd | 5-100 | NR | NR |
| FC13D6 | TPP6D | 1224yd | 5-100 | NR | NR |
| FC13E6 | TPP6E | 1224yd | 5-100 | NR | NR |
| FC13B3 | TPP3B | 1224yd | 5-100 | NR | NR |
| FC13C3 | TPP3C | 1224yd | 5-100 | NR | NR |
| FC13D3 | TPP3D | 1224yd | 5-100 | NR | NR |
| FC13E3 | TPP3E | 1224yd | 5-100 | NR | NR |
| FC13A4 | TPP4A | 1224yd | 5-100 | NR | NR |
| FC13B4 | TPP4B | 1224yd | 5-100 | NR | NR |
| FC13C4 | TPP4C | 1224yd | 5-100 | NR | NR |
| FC13D4 | TPP4D | 1224yd | 5-100 | NR | NR |
| FC13E4 | TPP4E | 1224yd | 5-100 | NR | NR |
| FC13A5 | TPP5A | 1224yd | 5-100 | NR | NR |
| FC13B5 | TPP5B | 1224yd | 5-100 | NR | NR |
| FC13C5 | TPP5C | 1224yd | 5-100 | NR | NR |
| FC13D5 | TPP5D | 1224yd | 5-100 | NR | NR |
| FC13E5 | TPP5E | 1224yd | 5-100 | NR | NR |
| FC13A6 | TPP6A | 1224yd | 5-100 | NR | NR |
| FC13B6 | TPP6B | 1224yd | 5-100 | NR | NR |
| FC13C6 | TPP6C | 1224yd | 5-100 | NR | NR |
| FC13D6 | TPP6D | 1224yd | 5-100 | NR | NR |
| FC13E6 | TPP6E | 1224yd | 5-100 | NR | NR |

Foam Forming Methods

It is contemplated that any one or more of a variety of known techniques for forming a thermoplastic foam by extrusion of a thermoplastic polymer can be used in view of the disclosures contained herein to form an extruded foam of the present invention, including each of Extruded foams 1-4, all such techniques and all extruded foams and extruded foamed articles, including Foamed Articles 1-3 formed thereby, are within the broad scope of the present invention. For clarity, it will be noted that the definition of the foams in the Table below all begin with only the letter F, in contrast to the foams defined by the paragraphs in the summary above, which begin with the capitalized phrase Foamable Composition.

In general, the forming step involves introducing into a PEF polymer of the present invention, including each of TPP1-TPP22, a blowing agent of the present invention, including each of Blowing Agents 1-31, to form a foamable PEF composition comprising PEF and blowing agent. One example of a preferred method for forming a foamable PEF composition of the present invention is to plasticize the PEF, preferably comprising heating the PEF to its melt temperature, preferably above its melt temperature, in an extrusion barrel and thereafter introducing into the extrusion barrel the blowing agent of the present invention under conditions effective to incorporate (preferably by solubilizing) the desired amount of blowing agent into the polymer melt as it travels down the extrusion barrel.

In preferred embodiments, the foaming methods of the present invention comprise providing a foamable composition of the present invention above its melt temperature in an extrusion barrel, including each of FC1-FC13, and foaming the foamable composition by extruding the composition in the extrusion barrel through an orifice plate, which preferably forms an extruded foam of the present invention. In preferred embodiments the extruded foam is then used to form a foam article of the present invention, including each of Foam Articles 1-4.

The extrusion processes of the present invention can include semi-batch and continuous processes, and combinations of two or more of these. The semi-batch aspect of the present processes may generally involve preparation of at least one portion of the foamable polymer composition, including each of FC1-FC13, in a storable state (such as a hopper) and then using that portion of foamable polymer composition at some future point in time as a feed to a continuous extrusion process, such as by introducing into an extrusion barrel. The present invention thus includes processes that comprises: 1) mixing PEF thermoplastic polymer, including each of TPP1-TPP22, and a blowing agent of the present invention, including each of Blowing Agents 1-31, under conditions to form a foamable PEF composition; 2) extruding the foamable PEF composition, including each of FC1-FC13, into a holding zone maintained at a temperature and pressure which does not allow the foamable composition to foam, where the holding zone preferably comprises a die plate which defines one or more orifices opening into a zone of lower pressure at which the foamable polymer composition, including each of FC1-FC13, foams, and an openable gate closing the die orifice; 3) periodically opening the gate while substantially concurrently applying mechanical pressure, for example by means of a movable ram on the foamable polymer composition, including each of FC1-FC13, to eject it from the holding zone through the die orifice into the zone of lower pressure, and 4) allowing the ejected foamable polymer composition to expand, under the influence of the blowing agent, to form the foam, including each of Extruded Foams 1-4 and each of foams F1-F8.

The present invention also can use continuous processes for forming the foam. By way of example such a continuous process involves forming a foamable PEF composition, including each of FC1-FC13, and then expanding that foamable PEF composition without substantial interruption. For example, a foamable PEF composition, including each of FC1-FC13, may be prepared in an extruder by heating the selected PEF polymer resin, including each of TPP1-TPP22 (which may be feed from a hopper), to form a PEF melt, incorporating into the PEF melt a blowing agent of the present invention (preferably in the liquid phase), including each of Blowing Agents 1-11, preferably by solubilizing the blowing agent into the PEF melt, at an initial pressure to form a foamable PEF composition comprising a substantially homogeneous combination of PEF and blowing agent, including each of FC1-FC13, and then extruding that foamable PEF composition through a die plate into a zone at a selected foaming pressure and allowing the foamable PEF composition to expand into a foam, including each of Foams 1-4 and each of foams F1-F8 described below, under the influence of the blowing agent. Optionally, the foamable PEF composition which comprises the PEF polymer, including each of FC1-FC13, and the incorporated blowing agent, including each of Blowing Agents 1-11, may be cooled prior to extruding the composition through the die to enhance certain desired properties of the resulting foam, including each of Foams 1-6 and each of foams F1-F8.

Figure 5:
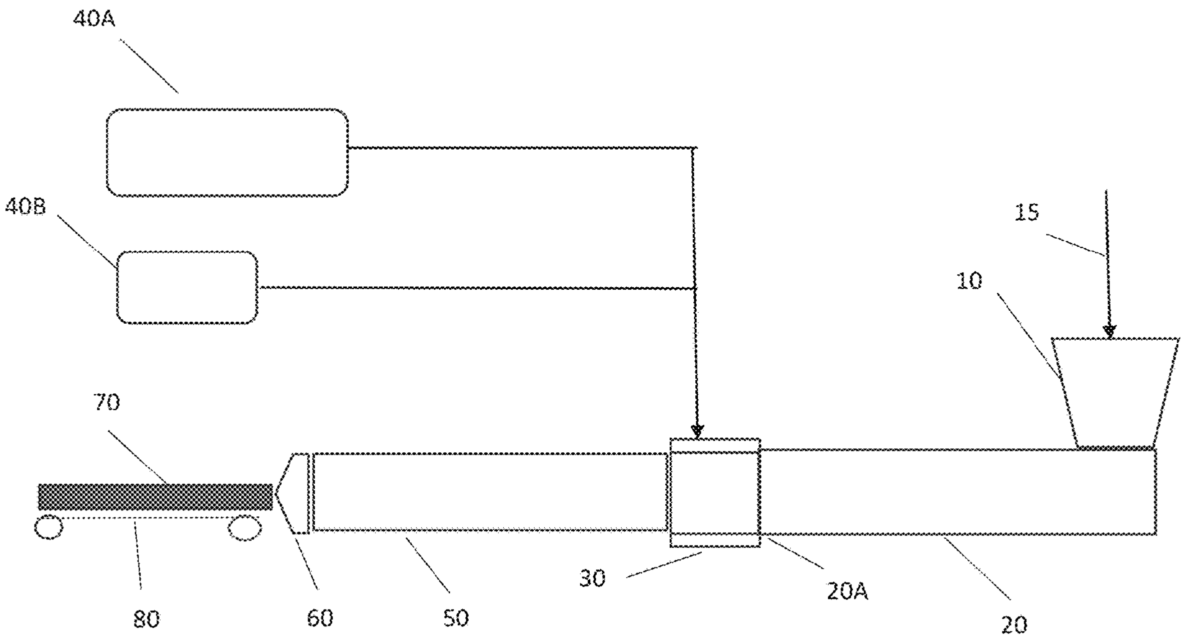
FIG. 5 is a semi-schematic figure of an extruder.

The methods can be carried out, by way of example, using extrusion equipment of the general type disclosed in FIG. 5. In particular, the extrusion apparatus can include a raw material feed hopper 10 for holding the PEF polymer 15 of the present invention, including each of TPP1-TPP22, and one or more optional components (which may be added with the PEF in the hopper or optionally elsewhere in the process depending on the particular needs of the user). The feed materials 15, excluding the blowing agent, can be charged to the hopper and delivered to the screw extruder 10. The extruder 20 can include thermocouples (not shown) located at three points along the length thereof and a pressure sensor (not shown) at the discharge end 20A of the extruder. A mixer section 30 can be located at the discharge end 20A of the extruder for receiving blowing agent components of the present invention, including each of Blowing Agents 1-31, via one or more metering pumps 40A and 40B and mixing those blowing agents into the PEF melt in the mixer section. Sensors (not shown) can be included for monitoring the temperature and pressure of the mixer section 30. The mixer section 30 can then discharge the foamable composition melt of the present invention, including each of FC1-FC13, into a pair of melt coolers 50 oriented in series, with temperature sensors (not shown) located in each cooler to monitor the melt temperature. The melt is then extruded through a die 60, which also had temperature and pressure sensors (not shown) for monitoring the pressure and temperature at the die. The die pressure and temperature can be varied, according to the needs of each particular extrusion application to produce a foam 70 of the present invention, including each of including each of Extruded Foams 1-4 and each of foams F1-F8 described below. The foam can then be carried away from the extrusion equipment by a conveyor belt 80.

The foamable polymer compositions of the present invention, including each of FC1-FC13, may optionally contain additional additives such as nucleating agents, cell-controlling agents, glass and carbon fibers, dyes, pigments, fillers, antioxidants, extrusion aids, stabilizing agents, antistatic agents, fire retardants, IR attenuating agents and thermally insulating additives. Nucleating agents include, among others, materials such as talc, calcium carbonate, sodium benzoate, and chemical blowing agents such azodicarbonamide or sodium bicarbonate and citric acid. IR attenuating agents and thermally insulating additives can include carbon black, graphite, silicon dioxide, metal flake or powder, among others. Flame retardants can include, among others, brominated materials such as hexabromocyclodecane and polybrominated biphenyl ether. Each of the above-noted additional optional additives can be introduced into the foam at various times and that various locations in the process according to known techniques, and all such additives and methods of addition or within the broad scope of the present invention.

Foams

In preferred embodiments, the extruded foams of the present invention are formed in a commercial extrusion apparatus and have the properties as indicated in the following Table 4, with the values being measured as described in the Examples hereof:

TABLE 4

| Foam property | Broad Range | Narrower Density Range |
|---|---|---|
| Foam density, kg/m3 (ISO 845) | 125-425 | 125-250 |
| Compressive Strength (perpendicular to the plane) (ISO 844), MPa | 0.5-15 | 1-14 |
| Tensile strength perpendicular to the plane (ASTM C297), MPa | 1.0-6 | 2-6 |
| Tensile Strength + Compressive Strength, MPa | 1.5-21 | 3-20 |
| Average Cell Size, (SEM) | 20-300 | 30-300 |

Foams that are included within the present invention and which provide particular advantage are described in the following Table 5, and in which all numerical values in the table are understood to be preceded by the word "about" and in which the designation NR means "not required."

TABLE 5

| FOAM TABLE | | | | | |
|---|---|---|---|---|---|
| | | Extruded Foam Properties | | | |
| Foam Number | Foamable Compo-sition, No. | % Closed Cell | Density, kg/m$^3$ | Compressive Strength, (ISO 844), megapascal (MPa) | Tensile Strength, ((ASTM C297), megapascal (MPa) |
| F1A1A | FC1A1 | >25 | NR | NR | NR |
| F1B1A | FC1B1 | >25 | NR | NR | NR |
| F1C1A | FC1C1 | >25 | NR | NR | NR |
| F1D1A | FC1D1 | >25 | NR | NR | NR |
| F1E1A | FC1E1 | >25 | NR | NR | NR |
| F1A2A | FC1A2 | >25 | NR | NR | NR |
| F1B2A | FC1B2 | >25 | NR | NR | NR |
| F1C2A | FC1C2 | >25 | NR | NR | NR |
| F1D2A | FC1D2 | >25 | NR | NR | NR |
| F1E2A | FC1E2 | >25 | NR | NR | NR |
| F1A3A | FC1A3 | >25 | NR | NR | NR |
| F1B3A | FC1B3 | >25 | NR | NR | NR |
| F1C3A | FC1C3 | >25 | NR | NR | NR |
| F1D3A | FC1D3 | >25 | NR | NR | NR |
| F1E3A | FC1E3 | >25 | NR | NR | NR |
| F1A4A | FC1A4 | >25 | NR | NR | NR |
| F1B4A | FC1B4 | >25 | NR | NR | NR |
| F1C4A | FC1C4 | >25 | NR | NR | NR |
| F1D4A | FC1D4 | >25 | NR | NR | NR |
| F1E4A | FC1E4 | >25 | NR | NR | NR |
| F1A5A | FC1A5 | >25 | NR | NR | NR |
| F1B5A | FC1B5 | >25 | NR | NR | NR |
| F1C5A | FC1C5 | >25 | NR | NR | NR |
| F1D5A | FC1D5 | >25 | NR | NR | NR |
| F1E5A | FC1E5 | >25 | NR | NR | NR |
| F1A6A | FC1A6 | >25 | NR | NR | NR |
| F1B6A | FC1B6 | >25 | NR | NR | NR |
| F1C6A | FC1C6 | >25 | NR | NR | NR |
| F1D6A | FC1D6 | >25 | NR | NR | NR |
| F1E6A | FC1E6 | >25 | NR | NR | NR |
| F2A1A | FC2A1 | >25 | NR | NR | NR |
| F2B1A | FC2B1 | >25 | NR | NR | NR |
| F2C1A | FC2C1 | >25 | NR | NR | NR |
| F2D1A | FC2D1 | >25 | NR | NR | NR |
| F2E1A | FC2E1 | >25 | NR | NR | NR |
| F2A2A | FC2A2 | >25 | NR | NR | NR |
| F2B2A | FC2B2 | >25 | NR | NR | NR |
| F2C2A | FC2C2 | >25 | NR | NR | NR |
| F2D2A | FC2D2 | >25 | NR | NR | NR |
| F2E2A | FC2E2 | >25 | NR | NR | NR |
| F2A3A | FC2A3 | >25 | NR | NR | NR |
| F2B3A | FC2B3 | >25 | NR | NR | NR |
| F2C3A | FC2C3 | >25 | NR | NR | NR |
| F2D3A | FC2D3 | >25 | NR | NR | NR |
| F2E3A | FC2E3 | >25 | NR | NR | NR |
| F2A4A | FC2A4 | >25 | NR | NR | NR |
| F2B4A | FC2B4 | >25 | NR | NR | NR |
| F2C4A | FC2C4 | >25 | NR | NR | NR |
| F2D4A | FC2D4 | >25 | NR | NR | NR |
| F2E4A | FC2E4 | >25 | NR | NR | NR |
| F2A5A | FC2A5 | >25 | NR | NR | NR |
| F2B5A | FC2B5 | >25 | NR | NR | NR |
| F2C5A | FC2C5 | >25 | NR | NR | NR |
| F2D5A | FC2D5 | >25 | NR | NR | NR |
| F2E5A | FC2E5 | >25 | NR | NR | NR |
| F2A6A | FC2A6 | >25 | NR | NR | NR |
| F2B6A | FC2B6 | >25 | NR | NR | NR |
| F2C6A | FC2C6 | >25 | NR | NR | NR |
| F2D6A | FC2D6 | >25 | NR | NR | NR |
| F2E6A | FC2E6 | >25 | NR | NR | NR |
| F3A1A | FC3A1 | >25 | NR | NR | NR |
| F3B1A | FC3B1 | >25 | NR | NR | NR |
| F3C1A | FC3C1 | >25 | NR | NR | NR |
| F3D1A | FC3D1 | >25 | NR | NR | NR |
| F3E1A | FC3E1 | >25 | NR | NR | NR |
| F3A2A | FC3A2 | >25 | NR | NR | NR |
| F3B2A | FC3B2 | >25 | NR | NR | NR |
| F3C2A | FC3C2 | >25 | NR | NR | NR |
| F3D2A | FC3D2 | >25 | NR | NR | NR |

TABLE 5-continued

| FOAM TABLE | | | | | |
|---|---|---|---|---|---|
| | | Extruded Foam Properties | | | |
| Foam Number | Foamable Compo-sition, No. | % Closed Cell | Density, kg/m$^3$ | Compressive Strength, (ISO 844), megapascal (MPa) | Tensile Strength, ((ASTM C297), megapascal (MPa) |
| F3E2A | FC3E2 | >25 | NR | NR | NR |
| F3A3A | FC3A3 | >25 | NR | NR | NR |
| F3B3A | FC3B3 | >25 | NR | NR | NR |
| F3C3A | FC3C3 | >25 | NR | NR | NR |
| F3D3A | FC3D3 | >25 | NR | NR | NR |
| F3E3A | FC3E3 | >25 | NR | NR | NR |
| F3A4A | FC3A4 | >25 | NR | NR | NR |
| F3B4A | FC3B4 | >25 | NR | NR | NR |
| F3C4A | FC3C4 | >25 | NR | NR | NR |
| F3D4A | FC3D4 | >25 | NR | NR | NR |
| F3E4A | FC3E4 | >25 | NR | NR | NR |
| F3A5A | FC3A5 | >25 | NR | NR | NR |
| F3B5A | FC3B5 | >25 | NR | NR | NR |
| F3C5A | FC3C5 | >25 | NR | NR | NR |
| F3D5A | FC3D5 | >25 | NR | NR | NR |
| F3E5A | FC3E5 | >25 | NR | NR | NR |
| F3A6A | FC3A6 | >25 | NR | VR | NR |
| F3B6A | FC3B6 | >25 | NR | NR | NR |
| F3C6A | FC3C6 | >25 | NR | NR | NR |
| F3D6A | FC3D6 | >25 | NR | NR | NR |
| F3E6A | FC3E6 | >25 | NR | NR | NR |
| F4A1A | FC4A1 | >25 | NR | NR | NR |
| F4B1A | FC4B1 | >25 | NR | NR | NR |
| F4C1A | FC4C1 | >25 | NR | NR | NR |
| F4D1A | FC4D1 | >25 | NR | NR | NR |
| F4E1A | FC4E1 | >25 | NR | NR | NR |
| F4A2A | FC4A2 | >25 | NR | NR | NR |
| F4B2A | FC4B2 | >25 | NR | NR | NR |
| F4C2A | FC4C2 | >25 | NR | NR | NR |
| F4D2A | FC4D2 | >25 | NR | NR | NR |
| F4E2A | FC4E2 | >25 | NR | NR | NR |
| F4A3A | FC4A3 | >25 | NR | NR | NR |
| F4B3A | FC4B3 | >25 | NR | NR | NR |
| FC4C3A | FC4C3 | >25 | NR | NR | NR |
| F4D3A | FC4D3 | >25 | NR | NR | NR |
| F4E3A | FC4E3 | >25 | NR | NR | NR |
| F4A4A | FC4A4 | >25 | NR | NR | NR |
| F4B4A | FC4B4 | >25 | NR | NR | NR |
| F4C4A | FC4C4 | >25 | NR | NR | NR |
| F4D4A | FC4D4 | >25 | NR | NR | NR |
| F4E4A | FC4E4 | >25 | NR | NR | NR |
| F4A5A | FC4A5 | >25 | NR | NR | NR |
| F4B5A | FC4B5 | >25 | NR | NR | NR |
| F4C5A | FC4C5 | >25 | NR | NR | NR |
| F4D5A | FC4D5 | >25 | NR | NR | NR |
| F4E5A | FC4E5 | >25 | NR | NR | NR |
| F4A6A | FC4A6 | >25 | NR | NR | NR |
| F4B6A | FC4B6 | >25 | NR | NR | NR |
| F4C6A | FC4C6 | >25 | NR | NR | NR |
| F4D6A | FC4D6 | >25 | NR | NR | NR |
| F4E6A | FC4E6 | >25 | NR | NR | NR |
| F5A1A | FC5A1 | >25 | NR | NR | NR |
| F5B1A | FC5B1 | >25 | NR | NR | NR |
| F5C1A | FC5C1 | >25 | NR | NR | NR |
| F5D1A | FC5D1 | >25 | NR | NR | NR |
| F5E1A | FC5E1 | >25 | NR | NR | NR |
| F5A2A | FC5A2 | >25 | NR | NR | NR |
| F5B2A | FC5B2 | >25 | NR | NR | NR |
| F5C2A | FC5C2 | >25 | NR | NR | NR |
| F5D2A | FC5D2 | >25 | NR | NR | NR |
| F5E2A | FC5E2 | >25 | NR | NR | NR |
| F5A3A | FC5A3 | >25 | NR | NR | NR |
| F5B3A | FC5B3 | >25 | NR | NR | NR |
| F5C3A | FC5C3 | >25 | NR | NR | NR |
| F5D3A | FC5D3 | >25 | NR | NR | NR |
| F5E3A | FC5E3 | >25 | NR | NR | NR |
| F5A4A | FC5A4 | >25 | NR | NR | NR |
| F5B4A | FC5B4 | >25 | NR | NR | NR |
| F5C4A | FC5C4 | >25 | NR | NR | NR |

TABLE 5-continued

FOAM TABLE

| Foam Number | Foamable Composition, No. | Extruded Foam Properties % Closed Cell | Density, $kg/m^3$ | Compressive Strength, (ISO 844), megapascal (MPa) | Tensile Strength, ((ASTM C297), megapascal (MPa) |
|---|---|---|---|---|---|
| F5D4A | FC5D4 | >25 | NR | NR | NR |
| F5E4A | FC5E4 | >25 | NR | NR | NR |
| F5A5A | FC5A5 | >25 | NR | NR | NR |
| F5B5A | FC5B5 | >25 | NR | NR | NR |
| F5C5A | FC5C5 | >25 | NR | NR | NR |
| F5D5A | FC5D5 | >25 | NR | NR | NR |
| F5E5A | FC5E5 | >25 | NR | NR | NR |
| F5A6A | FC5A6 | >25 | NR | NR | NR |
| F5B6A | FC5B6 | >25 | NR | NR | NR |
| F5C6A | FC5C6 | >25 | NR | NR | NR |
| F5D6A | FC5D6 | >25 | NR | NR | NR |
| F5E6A | FC5E6 | >25 | NR | NR | NR |
| F6A1A | FC6A1 | >25 | NR | NR | NR |
| F6B1A | FC6B1 | >25 | NR | NR | NR |
| F6C1A | FC6C1 | >25 | NR | NR | NR |
| F6D1A | FC6D1 | >25 | NR | NR | NR |
| F6E1A | FC6E1 | >25 | NR | NR | NR |
| F6A2A | FC6A2 | >25 | NR | NR | NR |
| F6B2A | FC6B2 | >25 | NR | NR | NR |
| F6C2A | FC6C2 | >25 | NR | NR | NR |
| F6D2A | FC6D2 | >25 | NR | NR | NR |
| F6E2A | FC6E2 | >25 | NR | NR | NR |
| F6A3A | FC6A3 | >25 | NR | NR | NR |
| F6B3A | FC6B3 | >25 | NR | NR | NR |
| F6C3A | FC6C3 | >25 | NR | NR | NR |
| F6D3A | FC6D3 | >25 | NR | NR | NR |
| F6E3A | FC6E3 | >25 | NR | NR | NR |
| F6B4A | FC6B4 | >25 | NR | NR | NR |
| F6C4A | FC6C4 | >25 | NR | NR | NR |
| F6D4A | FC6D4 | >25 | NR | NR | NR |
| F6E4A | FC6E4 | >25 | NR | NR | NR |
| F6A5A | FC6A5 | >25 | NR | NR | NR |
| F6B5A | FC6B5 | >25 | NR | NR | NR |
| F6C5A | FC6C5 | >25 | NR | NR | NR |
| F6D5A | FC6D5 | >25 | NR | NR | NR |
| F6E5A | FC6E5 | >25 | NR | NR | NR |
| F6A6A | FC6A6 | >25 | NR | NR | NR |
| F6B6A | FC6B6 | >25 | NR | NR | NR |
| F6C6A | FC6C6 | >25 | NR | NR | NR |
| F6D6A | FC6D6 | >25 | NR | NR | NR |
| F6E6A | FC6E6 | >25 | NR | NR | NR |
| F7A1A | FC7A1 | >25 | NR | NR | NR |
| F7B1A | FC7B1 | >25 | NR | NR | NR |
| F7C1A | FC7C1 | >25 | NR | NR | NR |
| F7D1A | FC7D1 | >25 | NR | NR | NR |
| F7E1A | FC7E1 | >25 | NR | NR | NR |
| F7A2A | FC7A2 | >25 | NR | NR | NR |
| F7B2 | FC7B2 | >25 | NR | NR | NR |
| F7C2A | FC7C2 | >25 | NR | NR | NR |
| F7D2A | FC7D2 | >25 | NR | NR | NR |
| F7E2A | FC7E2 | >25 | NR | NR | NR |
| F7A3A | FC7A3 | >25 | NR | NR | NR |
| F7B3A | FC7B3 | >25 | NR | NR | NR |
| F7C3A | FC7C3 | >25 | NR | NR | NR |
| F7D3A | FC7D3 | >25 | NR | NR | NR |
| F7E3A | FC7E3 | >25 | NR | NR | NR |
| F7A4A | FC7A4 | >25 | NR | NR | NR |
| F7B4A | FC7B4 | >25 | NR | NR | NR |
| F7C4A | FC7C4 | >25 | NR | NR | NR |
| F7D4A | FC7D4 | >25 | NR | NR | NR |
| F7E4A | FC7E4 | >25 | NR | NR | NR |
| F7A5A | FC7A5 | >25 | NR | NR | NR |
| F7B5A | FC7B5 | >25 | NR | NR | NR |
| F7C5A | FC7C5 | >25 | NR | NR | NR |
| F7D5A | FC7D5 | >25 | NR | NR | NR |
| F7E5A | FC7E5 | >25 | NR | NR | NR |
| F7A6A | FC7A6 | >25 | NR | NR | NR |
| F7B6A | FC7B6 | >25 | NR | NR | NR |
| F7C6A | FC7C6 | >25 | NR | NR | NR |

TABLE 5-continued

FOAM TABLE

| Foam Number | Foamable Composition, No. | Extruded Foam Properties % Closed Cell | Density, $kg/m^3$ | Compressive Strength, (ISO 844), megapascal (MPa) | Tensile Strength, ((ASTM C297), megapascal (MPa) |
|---|---|---|---|---|---|
| F7D6A | FC7D6 | >25 | NR | NR | NR |
| F7E6A | FC7E6 | >25 | NR | NR | NR |
| F8A1A | FC8A1 | >25 | NR | NR | NR |
| F8B1A | FC8B1 | >25 | NR | NR | NR |
| F8C1A | FC8C1 | >25 | NR | NR | NR |
| F8D1A | FC8D1 | >25 | NR | NR | NR |
| F8E1A | FC8E1 | >25 | NR | NR | NR |
| F8A2A | FC8A2 | >25 | NR | NR | NR |
| F8B2A | FC8B2 | >25 | NR | NR | NR |
| F8C2A | FC8C2 | >25 | NR | NR | NR |
| F8D2A | FC8D2 | >25 | NR | NR | NR |
| F8E2A | FC8E2 | >25 | NR | NR | NR |
| F8A3A | FC8A3 | >25 | NR | NR | NR |
| F8B3A | FC8B3 | >25 | NR | NR | NR |
| F8C3A | FC8C3 | >25 | NR | NR | NR |
| F8D3A | FC8D3 | >25 | NR | NR | NR |
| F8E3A | FC8E3 | >25 | NR | NR | NR |
| F8A4A | FC8A4 | >25 | NR | NR | NR |
| F8B4A | FC8B4 | >25 | NR | NR | NR |
| F8C4A | FC8C4 | >25 | NR | NR | NR |
| F8D4A | FC8D4 | >25 | NR | NR | NR |
| F8E4A | FC8E4 | >25 | NR | NR | NR |
| F8A5A | FC8A5 | >25 | NR | NR | NR |
| F8B5A | FC8B5 | >25 | NR | NR | NR |
| F8C5A | FC8C5 | >25 | NR | NR | NR |
| F8D5A | FC8D5 | >25 | NR | NR | NR |
| F8E5A | FC8E5 | >25 | NR | NR | NR |
| F8A6A | FC8A6 | >25 | NR | VR | NR |
| F8B6A | FC8B6 | >25 | NR | NR | NR |
| F8C6A | FC8C6 | >25 | NR | NR | NR |
| F8D6A | FC8D6 | >25 | NR | NR | NR |
| F8E6A | FC8E6 | >25 | NR | NR | NR |
| F1A1B | FC1A1 | NR | <300 | NR | NR |
| F1B1B | FC1B1 | NR | <300 | NR | NR |
| F1C1B | FC1C1 | NR | <300 | NR | NR |
| F1D1B | FC1D1 | NR | <300 | NR | NR |
| F1E1B | FC1E1 | NR | <300 | NR | NR |
| F1A2B | FC1A2 | NR | <300 | NR | NR |
| F1B2B | FC1B2 | NR | <300 | NR | NR |
| F1C2B | FC1C2 | NR | <300 | NR | NR |
| F1D2B | FC1D2 | NR | <300 | NR | NR |
| F1E2B | FC1E2 | NR | <300 | NR | NR |
| F1A3B | FC1A3 | NR | <300 | NR | NR |
| F1B3B | FC1B3 | NR | <300 | NR | NR |
| F1C3B | FC1C3 | NR | <300 | NR | NR |
| F1D3B | FC1D3 | NR | <300 | NR | NR |
| F1E3B | FC1E3 | NR | <300 | NR | NR |
| F1A4B | FC1A4 | NR | <300 | NR | NR |
| F1B4B | FC1B4 | NR | <300 | NR | NR |
| F1C4B | FC1C4 | NR | <300 | NR | NR |
| F1D4B | FC1D4 | NR | <300 | NR | NR |
| F1E4B | FC1E4 | NR | <300 | NR | NR |
| F1A5B | FC1A5 | NR | <300 | NR | NR |
| F1B5B | FC1B5 | NR | <300 | NR | NR |
| F1C5B | FC1C5 | NR | <300 | NR | NR |
| F1D5B | FC1D5 | NR | <300 | NR | NR |
| F1E5B | FC1E5 | NR | <300 | NR | NR |
| F1A6B | FC1A6 | NR | <300 | NR | NR |
| F1B6B | FC1B6 | NR | <300 | NR | NR |
| F1C6B | FC1C6 | NR | <300 | NR | NR |
| F1D6B | FC1D6 | NR | <300 | NR | NR |
| F1E6B | FC1E6 | NR | <300 | NR | NR |
| F2A1B | FC2A1 | NR | <300 | NR | NR |
| F2B1B | FC2B1 | NR | <300 | NR | NR |
| F2C1B | FC2C1 | NR | <300 | NR | NR |
| F2D1B | FC2D1 | NR | <300 | NR | NR |
| F2E1B | FC2E1 | NR | <300 | NR | NR |
| F2A2B | FC2A2 | NR | <300 | NR | NR |
| F2B2B | FC2B2 | NR | <300 | NR | NR |

TABLE 5-continued

| FOAM TABLE | | | | | |
|---|---|---|---|---|---|
| | | Extruded Foam Properties | | | |
| Foam Number | Foamable Compo-sition, No. | % Closed Cell | Density, kg/m$^3$ | Compressive Strength, (ISO 844), megapascal (MPa) | Tensile Strength, ((ASTM C297), megapascal (MPa) |
| F2C2B | FC2C2 | NR | <300 | NR | NR |
| F2D2B | FC2D2 | NR | <300 | NR | NR |
| F2E2B | FC2E2 | NR | <300 | NR | NR |
| F2A3B | FC2A3 | NR | <300 | NR | NR |
| F2B3B | FC2B3 | NR | <300 | NR | NR |
| F2C3B | FC2C3 | NR | <300 | NR | NR |
| F2D3B | FC2D3 | NR | <300 | NR | NR |
| F2E3B | FC2E3 | NR | <300 | NR | NR |
| F2A4B | FC2A4 | NR | <300 | NR | NR |
| F2B4B | FC2B4 | NR | <300 | NR | NR |
| F2C4B | FC2C4 | NR | <300 | NR | NR |
| F2D4B | FC2D4 | NR | <300 | NR | NR |
| F2E4B | FC2E4 | NR | <300 | NR | NR |
| F2A5B | FC2A5 | NR | <300 | NR | NR |
| F2B5B | FC2B5 | NR | <300 | NR | NR |
| F2C5B | FC2C5 | NR | <300 | NR | NR |
| F2D5B | FC2D5 | NR | <300 | NR | NR |
| F2E5B | FC2E5 | NR | <300 | NR | NR |
| F2A6B | FC2A6 | NR | <300 | NR | NR |
| F2B6B | FC2B6 | NR | <300 | NR | NR |
| F2C6B | FC2C6 | NR | <300 | NR | NR |
| F2D6B | FC2D6 | NR | <300 | NR | NR |
| F2E6B | FC2E6 | NR | <300 | NR | NR |
| F3A1B | FC3A1 | NR | <300 | NR | NR |
| F3B1B | FC3B1 | NR | <300 | NR | NR |
| F3C1B | FC3C1 | NR | <300 | NR | NR |
| F3D1B | FC3D1 | NR | <300 | NR | NR |
| F3E1B | FC3E1 | NR | <300 | NR | NR |
| F3A2B | FC3A2 | NR | <300 | NR | NR |
| F3B2B | FC3B2 | NR | <300 | NR | NR |
| F3C2B | FC3C2 | NR | <300 | NR | NR |
| F3D2B | FC3D2 | NR | <300 | NR | NR |
| F3E2B | FC3E2 | NR | <300 | NR | NR |
| F3A3B | FC3A3 | NR | <300 | NR | NR |
| F3B3B | FC3B3 | NR | <300 | NR | NR |
| F3C3B | FC3C3 | NR | <300 | NR | NR |
| F3D3B | FC3D3 | NR | <300 | NR | NR |
| F3E3B | FC3E3 | NR | <300 | NR | NR |
| F3A4B | FC3A4 | NR | <300 | NR | NR |
| F3B4B | FC3B4 | NR | <300 | NR | NR |
| F3C4B | FC3C4 | NR | <300 | NR | NR |
| F3D4B | FC3D4 | NR | <300 | NR | NR |
| F3E4B | FC3E4 | NR | <300 | NR | NR |
| F3A5B | FC3A5 | NR | <300 | NR | NR |
| F3B5B | FC3B5 | NR | <300 | NR | NR |
| F3C5B | FC3C5 | NR | <300 | NR | NR |
| F3D5B | FC3D5 | NR | <300 | NR | NR |
| F3E5B | FC3E5 | NR | <300 | NR | NR |
| F3A6B | FC3A6 | NR | <300 | NR | NR |
| F3B6B | FC3B6 | NR | <300 | NR | NR |
| F3C6B | FC3C6 | NR | <300 | NR | NR |
| F3D6B | FC3D6 | NR | <300 | NR | NR |
| F3E6B | FC3E6 | NR | <300 | NR | NR |
| F4A1B | FC4A1 | NR | <300 | NR | NR |
| F4B1B | FC4B1 | NR | <300 | NR | NR |
| F4C1B | FC4C1 | NR | <300 | NR | NR |
| F4D1B | FC4D1 | NR | <300 | NR | NR |
| F4E1B | FC4E1 | NR | <300 | NR | NR |
| F4A2B | FC4A2 | NR | <300 | NR | NR |
| F4B2B | FC4B2 | NR | <300 | NR | NR |
| F4C2B | FC4C2 | NR | <300 | NR | NR |
| F4D2B | FC4D2 | NR | <300 | NR | NR |
| F4E2B | FC4E2 | NR | <300 | NR | NR |
| F4A3B | FC4A3 | NR | <300 | NR | NR |
| F4B3B | FC4B3 | NR | <300 | NR | NR |
| F4C3B | FC4C3 | NR | <300 | NR | NR |
| F4D3B | FC4D3 | NR | <300 | NR | NR |
| F4E3B | FC4E3 | NR | <300 | NR | NR |
| F4A4B | FC4A4 | NR | <300 | NR | NR |
| F4B4B | FC4B4 | NR | <300 | NR | NR |
| F4C4B | FC4C4 | NR | <300 | NR | NR |
| F4D4B | FC4D4 | NR | <300 | NR | NR |
| F4E4B | FC4E4 | NR | <300 | NR | NR |
| F4A5B | FC4A5 | NR | <300 | NR | NR |
| F4B5B | FC4B5 | NR | <300 | NR | NR |
| F4C5B | FC4C5 | NR | <300 | NR | NR |
| F4D5B | FC4D5 | NR | <300 | NR | NR |
| F4E5B | FC4E5 | NR | <300 | NR | NR |
| F4A6B | FC4A6 | NR | <300 | NR | NR |
| F4B6B | FC4B6 | NR | <300 | NR | NR |
| F4C6B | FC4C6 | NR | <300 | NR | NR |
| F4D6B | FC4D6 | NR | <300 | NR | NR |
| F4E6B | FC4E6 | NR | <300 | NR | NR |
| F5A1B | FC5A1 | NR | <300 | NR | NR |
| F5B1B | FC5B1 | NR | <300 | NR | NR |
| F5C1B | FC5C1 | NR | <300 | NR | NR |
| F5D1B | FC5D1 | NR | <300 | NR | NR |
| F5E1B | FC5E1 | NR | <300 | NR | NR |
| F5A2B | FC5A2 | NR | <300 | NR | NR |
| F5B2B | FC5B2 | NR | <300 | NR | NR |
| F5C2B | FC5C2 | NR | <300 | NR | NR |
| F5D2B | FC5D2 | NR | <300 | NR | NR |
| F5E2B | FC5E2 | NR | <300 | NR | NR |
| F5A3B | FC5A3 | NR | <300 | NR | NR |
| F5B3B | FC5B3 | NR | <300 | NR | NR |
| F5C3B | FC5C3 | NR | <300 | NR | NR |
| F5D3B | FC5D3 | NR | <300 | NR | NR |
| F5E3B | FC5E3 | NR | <300 | NR | NR |
| F5A4B | FC5A4 | NR | <300 | NR | NR |
| F5B4B | FC5B4 | NR | <300 | NR | NR |
| F5C4B | FC5C4 | NR | <300 | NR | NR |
| F5D4B | FC5D4 | NR | <300 | NR | NR |
| F5E4B | FC5E4 | NR | <300 | NR | NR |
| F5A5B | FC5A5 | NR | <300 | NR | NR |
| F5B5B | FC5B5 | NR | <300 | NR | NR |
| F5C5B | FC5C5 | NR | <300 | NR | NR |
| F5D5B | FC5D5 | NR | <300 | NR | NR |
| F5E5B | FC5E5 | NR | <300 | NR | NR |
| F5A6B | FC5A6 | NR | <300 | NR | NR |
| F5B6B | FC5B6 | NR | <300 | NR | NR |
| F5C6B | FC5C6 | NR | <300 | NR | NR |
| F5D6B | FC5D6 | NR | <300 | NR | NR |
| F5E6B | FC5E6 | NR | <300 | NR | NR |
| F6A1B | FC6A1 | NR | <300 | NR | NR |
| F6B1B | FC6B1 | NR | <300 | NR | NR |
| F6C1B | FC6C1 | NR | <300 | NR | NR |
| F6D1B | FC6D1 | NR | <300 | NR | NR |
| F6E1B | FC6E1 | NR | <300 | NR | NR |
| F6A2B | FC6A2 | NR | <300 | NR | NR |
| F6B2B | FC6B2 | NR | <300 | NR | NR |
| F6C2B | FC6C2 | NR | <300 | NR | NR |
| F6D2B | FC6D2 | NR | <300 | NR | NR |
| F6E2B | FC6E2 | NR | <300 | NR | NR |
| F6A3B | FC6A3 | NR | <300 | NR | NR |
| F6B3B | FC6B3 | NR | <300 | NR | NR |
| F6C3B | FC6C3 | NR | <300 | NR | NR |
| F6D3B | FC6D3 | NR | <300 | NR | NR |
| F6E3B | FC6E3 | NR | <300 | NR | NR |
| F6B4B | FC6B4 | NR | <300 | NR | NR |
| F6C4B | FC6C4 | NR | <300 | NR | NR |
| F6D4B | FC6D4 | NR | <300 | NR | NR |
| F6E4B | FC6E4 | NR | <300 | NR | NR |
| F6A5B | FC6A5 | NR | <300 | NR | NR |
| F6B5B | FC6B5 | NR | <300 | NR | NR |
| F6C5B | FC6C5 | NR | <300 | NR | NR |
| F6D5B | FC6D5 | NR | <300 | NR | NR |
| F6E5B | FC6E5 | NR | <300 | NR | NR |
| F6A6B | FC6A6 | NR | <300 | NR | NR |

TABLE 5-continued

FOAM TABLE

| Foam Number | Foamable Composition, No. | Extruded Foam Properties % Closed Cell | Density, kg/m$^3$ | Compressive Strength, (ISO 844), megapascal (MPa) | Tensile Strength, ((ASTM C297), megapascal (MPa) |
|---|---|---|---|---|---|
| F6B6B | FC6B6 | NR | <300 | NR | NR |
| F6C6B | FC6C6 | NR | <300 | NR | NR |
| F6D6B | FC6D6 | NR | <300 | NR | NR |
| F6E6B | FC6E6 | NR | <300 | NR | NR |
| F7A1B | FC7A1 | NR | <300 | NR | NR |
| F7B1B | FC7B1 | NR | <300 | NR | NR |
| F7C1B | FC7C1 | NR | <300 | NR | NR |
| F7D1B | FC7D1 | NR | <300 | NR | NR |
| F7E1B | FC7E1 | NR | <300 | NR | NR |
| F7A2B | FC7A2 | NR | <300 | NR | NR |
| F7B2B | FC7B2 | NR | <300 | NR | NR |
| F7C2B | FC7C2 | NR | <300 | NR | NR |
| F7D2B | FC7D2 | NR | <300 | NR | NR |
| F7E2B | FC7E2 | NR | <300 | NR | NR |
| F7A3B | FC7A3 | NR | <300 | NR | NR |
| F7B3B | FC7B3 | NR | <300 | NR | NR |
| F7C3B | FC7C3 | NR | <300 | NR | NR |
| F7D3B | FC7D3 | NR | <300 | NR | NR |
| F7E3B | FC7E3 | NR | <300 | NR | NR |
| F7A4B | FC7A4 | NR | <300 | NR | NR |
| F7B4B | FC7B4 | NR | <300 | NR | NR |
| F7C4B | FC7C4 | NR | <300 | NR | NR |
| F7D4B | FC7D4 | NR | <300 | NR | NR |
| F7E4B | FC7E4 | NR | <300 | NR | NR |
| F7A5B | FC7A5 | NR | <300 | NR | NR |
| F7B5B | FC7B5 | NR | <300 | NR | NR |
| F7C5B | FC7C5 | NR | <300 | NR | NR |
| F7D5B | FC7D5 | NR | <300 | NR | NR |
| F7E5B | FC7E5 | NR | <300 | NR | NR |
| F7A6B | FC7A6 | NR | <300 | NR | NR |
| F7B6B | FC7B6 | NR | <300 | NR | NR |
| F7C6B | FC7C6 | NR | <300 | NR | NR |
| F7D6B | FC7D6 | NR | <300 | NR | NR |
| F7E6B | FC7E6 | NR | <300 | NR | NR |
| F8A1B | FC8A1 | NR | <300 | NR | NR |
| F8B1B | FC8B1 | NR | <300 | NR | NR |
| F8C1B | FC8C1 | NR | <300 | NR | NR |
| F8D1B | FC8D1 | NR | <300 | NR | NR |
| F8E1B | FC8E1 | NR | <300 | NR | NR |
| F8A2B | FC8A2 | NR | <300 | NR | NR |
| F8B2B | FC8B2 | NR | <300 | NR | NR |
| F8C2B | FC8C2 | NR | <300 | NR | NR |
| F8D2B | FC8D2 | NR | <300 | NR | NR |
| F8E2B | FC8E2 | NR | <300 | NR | NR |
| F8A3B | FC8A3 | NR | <300 | NR | NR |
| F8B3B | FC8B3 | NR | <300 | NR | NR |
| F8C3B | FC8C3 | NR | <300 | NR | NR |
| F8D3B | FC8D3 | NR | <300 | NR | NR |
| F8E3B | FC8E3 | NR | <300 | NR | NR |
| F8A4B | FC8A4 | NR | <300 | NR | NR |
| F8B4B | FC8B4 | NR | <300 | NR | NR |
| F8C4B | FC8C4 | NR | <300 | NR | NR |
| F8D4B | FC8D4 | NR | <300 | NR | NR |
| F8E4B | FC8E4 | NR | <300 | NR | NR |
| F8A5B | FC8A5 | NR | <300 | NR | NR |
| F8B5B | FC8B5 | NR | <300 | NR | NR |
| F8C5B | FC8C5 | NR | <300 | NR | NR |
| F8D5B | FC8D5 | NR | <300 | NR | NR |
| F8E5B | FC8E5 | NR | <300 | NR | NR |
| F8A6B | FC8A6 | NR | <300 | NR | NR |
| F8B6B | FC8B6 | NR | <300 | NR | NR |
| F8C6B | FC8C6 | NR | <300 | NR | NR |
| F8D6B | FC8D6 | NR | <300 | NR | NR |
| F8E6B | FC8E6 | NR | <300 | NR | NR |
| F1A1C | FC1A1 | NR | 125-425 | NR | NR |
| F1B1C | FC1B1 | NR | 125-425 | NR | NR |
| F1C1C | FC1C1 | NR | 125-425 | NR | NR |
| F1D1C | FC1D1 | NR | 125-425 | NR | NR |
| F1E1C | FC1E1 | NR | 125-425 | NR | NR |

TABLE 5-continued

FOAM TABLE

| Foam Number | Foamable Composition, No. | Extruded Foam Properties % Closed Cell | Density, kg/m$^3$ | Compressive Strength, (ISO 844), megapascal (MPa) | Tensile Strength, ((ASTM C297), megapascal (MPa) |
|---|---|---|---|---|---|
| F1A2C | FC1A2 | NR | 125-425 | NR | NR |
| F1B2C | FC1B2 | NR | 125-425 | NR | NR |
| F1C2C | FC1C2 | NR | 125-425 | NR | NR |
| F1D2C | FC1D2 | NR | 125-425 | NR | NR |
| F1E2C | FC1E2 | NR | 125-425 | NR | NR |
| F1A3C | FC1A3 | NR | 125-425 | NR | NR |
| F1B3C | FC1B3 | NR | 125-425 | NR | NR |
| F1C3C | FC1C3 | NR | 125-425 | NR | NR |
| F1D3C | FC1D3 | NR | 125-425 | NR | NR |
| F1E3C | FC1E3 | NR | 125-425 | NR | NR |
| F1A4C | FC1A4 | NR | 125-425 | NR | NR |
| F1B4C | FC1B4 | NR | 125-425 | NR | NR |
| F1C4C | FC1C4 | NR | 125-425 | NR | NR |
| F1D4C | FC1D4 | NR | 125-425 | NR | NR |
| F1E4C | FC1E4 | NR | 125-425 | NR | NR |
| F1A5C | FC1A5 | NR | 125-425 | NR | NR |
| F1B5C | FC1B5 | NR | 125-425 | NR | NR |
| F1C5C | FC1C5 | NR | 125-425 | NR | NR |
| F1D5C | FC1D5 | NR | 125-425 | NR | NR |
| F1E5C | FC1E5 | NR | 125-425 | NR | NR |
| F1A6C | FC1A6 | NR | 125-425 | NR | NR |
| F1B6C | FC1B6 | NR | 125-425 | NR | NR |
| F1C6C | FC1C6 | NR | 125-425 | NR | NR |
| F1D6C | FC1D6 | NR | 125-425 | NR | NR |
| F1E6C | FC1E6 | NR | 125-425 | NR | NR |
| F2A1C | FC2A1 | NR | 125-425 | NR | NR |
| F2B1C | FC2B1 | NR | 125-425 | NR | NR |
| F2C1C | FC2C1 | NR | 125-425 | NR | NR |
| F2D1C | FC2D1 | NR | 125-425 | NR | NR |
| F2E1C | FC2E1 | NR | 125-425 | NR | NR |
| F2A2C | FC2A2 | NR | 125-425 | NR | NR |
| F2B2C | FC2B2 | NR | 125-425 | NR | NR |
| F2C2C | FC2C2 | NR | 125-425 | NR | NR |
| F2D2C | FC2D2 | NR | 125-425 | NR | NR |
| F2E2C | FC2E2 | NR | 125-425 | NR | NR |
| F2A3C | FC2A3 | NR | 125-425 | NR | NR |
| F2B3C | FC2B3 | NR | 125-425 | NR | NR |
| F2C3C | FC2C3 | NR | 125-425 | NR | NR |
| F2D3C | FC2D3 | NR | 125-425 | NR | NR |
| F2E3C | FC2E3 | NR | 125-425 | NR | NR |
| F2A4C | FC2A4 | NR | 125-425 | NR | NR |
| F2B4C | FC2B4 | NR | 125-425 | NR | NR |
| F2C4C | FC2C4 | NR | 125-425 | NR | NR |
| F2D4C | FC2D4 | NR | 125-425 | NR | NR |
| F2E4C | FC2E4 | NR | 125-425 | NR | NR |
| F2A5C | FC2A5 | NR | 125-425 | NR | NR |
| F2B5C | FC2B5 | NR | 125-425 | NR | NR |
| F2C5C | FC2C5 | NR | 125-425 | NR | NR |
| F2D5C | FC2D5 | NR | 125-425 | NR | NR |
| F2E5C | FC2E5 | NR | 125-425 | NR | NR |
| F2A6C | FC2A6 | NR | 125-425 | NR | NR |
| F2B6C | FC2B6 | NR | 125-425 | NR | NR |
| F2C6C | FC2C6 | NR | 125-425 | NR | NR |
| F2D6C | FC2D6 | NR | 125-425 | NR | NR |
| F2E6C | FC2E6 | NR | 125-425 | NR | NR |
| F3A1C | FC3A1 | NR | 125-425 | NR | NR |
| F3B1C | FC3B1 | NR | 125-425 | NR | NR |
| F3C1C | FC3C1 | NR | 125-425 | NR | NR |
| F3D1C | FC3D1 | NR | 125-425 | NR | NR |
| F3E1C | FC3E1 | NR | 125-425 | NR | NR |
| F3A2C | FC3A2 | NR | 125-425 | NR | NR |
| F3B2C | FC3B2 | NR | 125-425 | NR | NR |
| F3C2C | FC3C2 | NR | 125-425 | NR | NR |
| F3D2C | FC3D2 | NR | 125-425 | NR | NR |
| F3E2C | FC3E2 | NR | 125-425 | NR | NR |
| F3A3C | FC3A3 | NR | 125-425 | NR | NR |
| F3B3C | FC3B3 | NR | 125-425 | NR | NR |
| F3C3C | FC3C3 | NR | 125-425 | NR | NR |
| F3D3C | FC3D3 | NR | 125-425 | NR | NR |

TABLE 5-continued

FOAM TABLE

| | | Extruded Foam Properties | | | |
|---|---|---|---|---|---|
| Foam Number | Foamable Composition, No. | % Closed Cell | Density, kg/m$^3$ | Compressive Strength, (ISO 844), megapascal (MPa) | Tensile Strength, ((ASTM C297), megapascal (MPa) |
| F3E3C | FC3E3 | NR | 125-425 | NR | NR |
| F3A4C | FC3A4 | NR | 125-425 | NR | NR |
| F3B4C | FC3B4 | NR | 125-425 | NR | NR |
| F3C4C | FC3C4 | NR | 125-425 | NR | NR |
| F3D4C | FC3D4 | NR | 125-425 | NR | NR |
| F3E4C | FC3E4 | NR | 125-425 | NR | NR |
| F3A5C | FC3A5 | NR | 125-425 | NR | NR |
| F3B5C | FC3B5 | NR | 125-425 | NR | NR |
| F3C5C | FC3C5 | NR | 125-425 | NR | NR |
| F3D5C | FC3D5 | NR | 125-425 | NR | NR |
| F3E5C | FC3E5 | NR | 125-425 | NR | NR |
| F3A6C | FC3A6 | NR | 125-425 | NR | NR |
| F3B6C | FC3B6 | NR | 125-425 | NR | NR |
| F3C6C | FC3C6 | NR | 125-425 | NR | NR |
| F3D6C | FC3D6 | NR | 125-425 | NR | NR |
| F3E6C | FC3E6 | NR | 125-425 | NR | NR |
| F4A1C | FC4A1 | NR | 125-425 | NR | NR |
| F4B1C | FC4B1 | NR | 125-425 | NR | NR |
| F4C1C | FC4C1 | NR | 125-425 | NR | NR |
| F4D1C | FC4D1 | NR | 125-425 | NR | NR |
| F4E1C | FC4E1 | NR | 125-425 | NR | NR |
| F4A2C | FC4A2 | NR | 125-425 | NR | NR |
| F4B2C | FC4B2 | NR | 125-425 | NR | NR |
| F4C2C | FC4C2 | NR | 125-425 | NR | NR |
| F4D2C | FC4D2 | NR | 125-425 | NR | NR |
| F4E2C | FC4E2 | NR | 125-425 | NR | NR |
| F4A3C | FC4A3 | NR | 125-425 | NR | NR |
| F4B3C | FC4B3 | NR | 125-425 | NR | NR |
| F4C3C | FC4C3 | NR | 125-425 | NR | NR |
| F4D3C | FC4D3 | NR | 125-425 | NR | NR |
| F4E3C | FC4E3 | NR | 125-425 | NR | NR |
| F4A4C | FC4A4 | NR | 125-425 | NR | NR |
| F4B4C | FC4B4 | NR | 125-425 | NR | NR |
| F4C4C | FC4C4 | NR | 125-425 | NR | NR |
| F4D4C | FC4D4 | NR | 125-425 | NR | NR |
| F4E4C | FC4E4 | NR | 125-425 | NR | NR |
| F4A5C | FC4A5 | NR | 125-425 | NR | NR |
| F4B5C | FC4B5 | NR | 125-425 | NR | NR |
| F4C5C | FC4C5 | NR | 125-425 | NR | NR |
| F4D5C | FC4D5 | NR | 125-425 | NR | NR |
| F4E5C | FC4E5 | NR | 125-425 | NR | NR |
| F4A6C | FC4A6 | NR | 125-425 | NR | NR |
| F4B6C | FC4B6 | NR | 125-425 | NR | NR |
| F4C6C | FC4C6 | NR | 125-425 | NR | NR |
| F4D6C | FC4D6 | NR | 125-425 | NR | NR |
| F4E6C | FC4E6 | NR | 125-425 | NR | NR |
| F5A1C | FC5A1 | NR | 125-425 | NR | NR |
| F5B1C | FC5B1 | NR | 125-425 | NR | NR |
| F5C1C | FC5C1 | NR | 125-425 | NR | NR |
| F5D1C | FC5D1 | NR | 125-425 | NR | NR |
| F5E1C | FC5E1 | NR | 125-425 | NR | NR |
| F5A2C | FC5A2 | NR | 125-425 | NR | NR |
| F5B2C | FC5B2 | NR | 125-425 | NR | NR |
| F5C2C | FC5C2 | NR | 125-425 | NR | NR |
| F5D2C | FC5D2 | NR | 125-425 | NR | NR |
| F5E2C | FC5E2 | NR | 125-425 | NR | NR |
| F5A3C | FC5A3 | NR | 125-425 | NR | NR |
| F5B3C | FC5B3 | NR | 125-425 | NR | NR |
| F5C3C | FC5C3 | NR | 125-425 | NR | NR |
| F5D3C | FC5D3 | NR | 125-425 | NR | NR |
| F5E3C | FC5E3 | NR | 125-425 | NR | NR |
| F5A4C | FC5A4 | NR | 125-425 | NR | NR |
| F5B4C | FC5B4 | NR | 125-425 | NR | NR |
| F5C4C | FC5C4 | NR | 125-425 | NR | NR |
| F5D4C | FC5D4 | NR | 125-425 | NR | NR |
| F5E4C | FC5E4 | NR | 125-425 | NR | NR |
| F5A5C | FC5A5 | NR | 125-425 | NR | NR |
| F5B5C | FC5B5 | NR | 125-425 | NR | NR |
| F5C5C | FC5C5 | NR | 125-425 | NR | NR |

TABLE 5-continued

FOAM TABLE

| | | Extruded Foam Properties | | | |
|---|---|---|---|---|---|
| Foam Number | Foamable Composition, No. | % Closed Cell | Density, kg/m$^3$ | Compressive Strength, (ISO 844), megapascal (MPa) | Tensile Strength, ((ASTM C297), megapascal (MPa) |
| F5D5C | FC5D5 | NR | 125-425 | NR | NR |
| F5E5C | FC5E5 | NR | 125-425 | NR | NR |
| F5A6C | FC5A6 | NR | 125-425 | NR | NR |
| F5B6C | FC5B6 | NR | 125-425 | NR | NR |
| F5C6C | FC5C6 | NR | 125-425 | NR | NR |
| F5D6C | FC5D6 | NR | 125-425 | NR | NR |
| F5E6C | FC5E6 | NR | 125-425 | NR | NR |
| F6A1C | FC6A1 | NR | 125-425 | NR | NR |
| F6B1C | FC6B1 | NR | 125-425 | NR | NR |
| F6C1C | FC6C1 | NR | 125-425 | NR | NR |
| F6D1C | FC6D1 | NR | 125-425 | NR | NR |
| F6E1C | FC6E1 | NR | 125-425 | NR | NR |
| F6A2C | FC6A2 | NR | 125-425 | NR | NR |
| F6B2C | FC6B2 | NR | 125-425 | NR | NR |
| F6C2C | FC6C2 | NR | 125-425 | NR | NR |
| F6D2C | FC6D2 | NR | 125-425 | NR | NR |
| F6E2C | FC6E2 | NR | 125-425 | NR | NR |
| F6A3C | FC6A3 | NR | 125-425 | NR | NR |
| F6B3C | FC6B3 | NR | 125-425 | NR | NR |
| F6C3C | FC6C3 | NR | 125-425 | NR | NR |
| F6D3C | FC6D3 | NR | 125-425 | NR | NR |
| F6E3C | FC6E3 | NR | 125-425 | NR | NR |
| F6B4C | FC6B4 | NR | 125-425 | NR | NR |
| F6C4C | FC6C4 | NR | 125-425 | NR | NR |
| F6D4C | FC6D4 | NR | 125-425 | NR | NR |
| F6E4C | FC6E4 | NR | 125-425 | NR | NR |
| F6A5C | FC6A5 | NR | 125-425 | NR | NR |
| F6B5C | FC6B5 | NR | 125-425 | NR | NR |
| F6C5C | FC6C5 | NR | 125-425 | NR | NR |
| F6D5C | FC6D5 | NR | 125-425 | NR | NR |
| F6E5C | FC6E5 | NR | 125-425 | NR | NR |
| F6A6C | FC6A6 | NR | 125-425 | NR | NR |
| F6B6C | FC6B6 | NR | 125-425 | NR | NR |
| F6C6C | FC6C6 | NR | 125-425 | NR | NR |
| F6D6C | FC6D6 | NR | 125-425 | NR | NR |
| F6E6C | FC6E6 | NR | 125-425 | NR | NR |
| F7A1C | FC7A1 | NR | 125-425 | NR | NR |
| F7B1C | FC7B1 | NR | 125-425 | NR | NR |
| F7C1C | FC7C1 | NR | 125-425 | NR | NR |
| F7D1C | FC7D1 | NR | 125-425 | NR | NR |
| F7E1C | FC7E1 | NR | 125-425 | NR | NR |
| F7A2C | FC7A2 | NR | 125-425 | NR | NR |
| F7B2C | FC7B2 | NR | 125-425 | NR | NR |
| F7C2C | FC7C2 | NR | 125-425 | NR | NR |
| F7D2C | FC7D2 | NR | 125-425 | NR | NR |
| F7E2C | FC7E2 | NR | 125-425 | NR | NR |
| F7A3C | FC7A3 | NR | 125-425 | NR | NR |
| F7B3C | FC7B3 | NR | 125-425 | NR | NR |
| F7C3C | FC7C3 | NR | 125-425 | NR | NR |
| F7D3C | FC7D3 | NR | 125-425 | NR | NR |
| F7E3C | FC7E3 | NR | 125-425 | NR | NR |
| F7A4C | FC7A4 | NR | 125-425 | NR | NR |
| F7B4C | FC7B4 | NR | 125-425 | NR | NR |
| F7C4C | FC7C4 | NR | 125-425 | NR | NR |
| F7D4C | FC7D4 | NR | 125-425 | NR | NR |
| F7E4C | FC7E4 | NR | 125-425 | NR | NR |
| F7A5C | FC7A5 | NR | 125-425 | NR | NR |
| F7B5C | FC7B5 | NR | 125-425 | NR | NR |
| F7C5C | FC7C5 | NR | 125-425 | NR | NR |
| F7D5C | FC7D5 | NR | 125-425 | NR | NR |
| F7E5C | FC7E5 | NR | 125-425 | NR | NR |
| F7A6C | FC7A6 | NR | 125-425 | NR | NR |
| F7B6C | FC7B6 | NR | 125-425 | NR | NR |
| F7C6C | FC7C6 | NR | 125-425 | NR | NR |
| F7D6C | FC7D6 | NR | 125-425 | NR | NR |
| F7E6C | FC7E6 | NR | 125-425 | NR | NR |
| F8A1C | FC8A1 | NR | 125-425 | NR | NR |
| F8B1C | FC8B1 | NR | 125-425 | NR | NR |
| F8C1C | FC8C1 | NR | 125-425 | NR | NR |

TABLE 5-continued

| FOAM TABLE | | | | | |
|---|---|---|---|---|---|
| | | Extruded Foam Properties | | | |
| Foam Number | Foamable Compo-sition, No. | % Closed Cell | Density, kg/m$^3$ | Compressive Strength, (ISO 844), megapascal (MPa) | Tensile Strength, ((ASTM C297), megapascal (MPa) |
| F8D1C | FC8D1 | NR | 125-425 | NR | NR |
| F8E1C | FC8E1 | NR | 125-425 | NR | NR |
| F8A2C | FC8A2 | NR | 125-425 | NR | NR |
| F8B2C | FC8B2 | NR | 125-425 | NR | NR |
| F8C2C | FC8C2 | NR | 125-425 | NR | NR |
| F8D2C | FC8D2 | NR | 125-425 | NR | NR |
| F8E2C | FC8E2 | NR | 125-425 | NR | NR |
| F8A3C | FC8A3 | NR | 125-425 | NR | NR |
| F8B3C | FC8B3 | NR | 125-425 | NR | NR |
| F8C3C | FC8C3 | NR | 125-425 | NR | NR |
| F8D3C | FC8D3 | NR | 125-425 | NR | NR |
| F8E3C | FC8E3 | NR | 125-425 | NR | NR |
| F8A4C | FC8A4 | NR | 125-425 | NR | NR |
| F8B4C | FC8B4 | NR | 125-425 | NR | NR |
| F8C4C | FC8C4 | NR | 125-425 | NR | NR |
| F8D4C | FC8D4 | NR | 125-425 | NR | NR |
| F8E4C | FC8E4 | NR | 125-425 | NR | NR |
| F8A5C | FC8A5 | NR | 125-425 | NR | NR |
| F8B5C | FC8B5 | NR | 125-425 | NR | NR |
| F8C5C | FC8C5 | NR | 125-425 | NR | NR |
| F8D5C | FC8D5 | NR | 125-425 | NR | NR |
| F8E5C | FC8E5 | NR | 125-425 | NR | NR |
| F8A6C | FC8A6 | NR | 125-425 | NR | NR |
| F8B6C | FC8B6 | NR | 125-425 | NR | NR |
| F8C6C | FC8C6 | NR | 125-425 | NR | NR |
| F8D6C | FC8D6 | NR | 125-425 | NR | NR |
| F8E6C | FC8E6 | NR | 125-425 | NR | NR |
| F1A1D | FC1A1 | NR | NR | 1.5-14 | NR |
| F1B1D | FC1B1 | NR | NR | 1.5-14 | NR |
| F1C1D | FC1C1 | NR | NR | 1.5-14 | NR |
| F1D1D | FC1D1 | NR | NR | 1.5-14 | NR |
| F1E1D | FC1E1 | NR | NR | 1.5-14 | NR |
| F1A2D | FC1A2 | NR | NR | 1.5-14 | NR |
| F1B2D | FC1B2 | NR | NR | 1.5-14 | NR |
| F1C2D | FC1C2 | NR | NR | 1.5-14 | NR |
| F1D2D | FC1D2 | NR | NR | 1.5-14 | NR |
| F1E2D | FC1E2 | NR | NR | 1.5-14 | NR |
| F1A3D | FC1A3 | NR | NR | 1.5-14 | NR |
| F1B3D | FC1B3 | NR | NR | 1.5-14 | NR |
| F1C3D | FC1C3 | NR | NR | 1.5-14 | NR |
| F1D3D | FC1D3 | NR | NR | 1.5-14 | NR |
| F1E3D | FC1E3 | NR | NR | 1.5-14 | NR |
| F1A4D | FC1A4 | NR | NR | 1.5-14 | NR |
| F1B4D | FC1B4 | NR | NR | 1.5-14 | NR |
| F1C4D | FC1C4 | NR | NR | 1.5-14 | NR |
| F1D4D | FC1D4 | NR | NR | 1.5-14 | NR |
| F1E4D | FC1E4 | NR | NR | 1.5-14 | NR |
| F1A5D | FC1A5 | NR | NR | 1.5-14 | NR |
| F1B5D | FC1B5 | NR | NR | 1.5-14 | NR |
| F1C5D | FC1C5 | NR | NR | 1.5-14 | NR |
| F1D5D | FC1D5 | NR | NR | 1.5-14 | NR |
| F1E5D | FC1E5 | NR | NR | 1.5-14 | NR |
| F1A6D | FC1A6 | NR | NR | 1.5-14 | NR |
| F1B6D | FC1B6 | NR | NR | 1.5-14 | NR |
| F1C6D | FC1C6 | NR | NR | 1.5-14 | NR |
| F1D6D | FC1D6 | NR | NR | 1.5-14 | NR |
| F1E6D | FC1E6 | NR | NR | 1.5-14 | NR |
| F2A1D | FC2A1 | NR | NR | 1.5-14 | NR |
| F2B1D | FC2B1 | NR | NR | 1.5-14 | NR |
| F2C1D | FC2C1 | NR | NR | 1.5-14 | NR |
| F2D1D | FC2D1 | NR | NR | 1.5-14 | NR |
| F2E1D | FC2E1 | NR | NR | 1.5-14 | NR |
| F2A2D | FC2A2 | NR | NR | 1.5-14 | NR |
| F2B2D | FC2B2 | NR | NR | 1.5-14 | NR |
| F2C2D | FC2C2 | NR | NR | 1.5-14 | NR |
| F2D2D | FC2D2 | NR | NR | 1.5-14 | NR |
| F2E2D | FC2E2 | NR | NR | 1.5-14 | NR |
| F2A3D | FC2A3 | NR | NR | 1.5-14 | NR |
| F2B3D | FC2B3 | NR | NR | 1.5-14 | NR |

TABLE 5-continued

| FOAM TABLE | | | | | |
|---|---|---|---|---|---|
| | | Extruded Foam Properties | | | |
| Foam Number | Foamable Compo-sition, No. | % Closed Cell | Density, kg/m$^3$ | Compressive Strength, (ISO 844), megapascal (MPa) | Tensile Strength, ((ASTM C297), megapascal (MPa) |
| F2C3D | FC2C3 | NR | NR | 1.5-14 | NR |
| F2D3D | FC2D3 | NR | NR | 1.5-14 | NR |
| F2E3D | FC2E3 | NR | NR | 1.5-14 | NR |
| F2A4D | FC2A4 | NR | NR | 1.5-14 | NR |
| F2B4D | FC2B4 | NR | NR | 1.5-14 | NR |
| F2C4D | FC2C4 | NR | NR | 1.5-14 | NR |
| F2D4D | FC2D4 | NR | NR | 1.5-14 | NR |
| F2E4D | FC2E4 | NR | NR | 1.5-14 | NR |
| F2A5D | FC2A5 | NR | NR | 1.5-14 | NR |
| F2B5D | FC2B5 | NR | NR | 1.5-14 | NR |
| F2C5D | FC2C5 | NR | NR | 1.5-14 | NR |
| F2D5D | FC2D5 | NR | NR | 1.5-14 | NR |
| F2E5D | FC2E5 | NR | NR | 1.5-14 | NR |
| F2A6D | FC2A6 | NR | NR | 1.5-14 | NR |
| F2B6D | FC2B6 | NR | NR | 1.5-14 | NR |
| F2C6D | FC2C6 | NR | NR | 1.5-14 | NR |
| F2D6D | FC2D6 | NR | NR | 1.5-14 | NR |
| F2E6D | FC2E6 | NR | NR | 1.5-14 | NR |
| F3A1D | FC3A1 | NR | NR | 1.5-14 | NR |
| F3B1D | FC3B1 | NR | NR | 1.5-14 | NR |
| F3C1D | FC3C1 | NR | NR | 1.5-14 | NR |
| F3D1D | FC3D1 | NR | NR | 1.5-14 | NR |
| F3E1D | FC3E1 | NR | NR | 1.5-14 | NR |
| F3A2D | FC3A2 | NR | NR | 1.5-14 | NR |
| F3B2D | FC3B2 | NR | NR | 1.5-14 | NR |
| F3C2D | FC3C2 | NR | NR | 1.5-14 | NR |
| F3D2D | FC3D2 | NR | NR | 1.5-14 | NR |
| F3E2D | FC3E2 | NR | NR | 1.5-14 | NR |
| F3A3D | FC3A3 | NR | NR | 1.5-14 | NR |
| F3B3D | FC3B3 | NR | NR | 1.5-14 | NR |
| F3C3D | FC3C3 | NR | NR | 1.5-14 | NR |
| F3D3D | FC3D3 | NR | NR | 1.5-14 | NR |
| F3E3D | FC3E3 | NR | NR | 1.5-14 | NR |
| F3A4D | FC3A4 | NR | NR | 1.5-14 | NR |
| F3B4D | FC3B4 | NR | NR | 1.5-14 | NR |
| F3C4D | FC3C4 | NR | NR | 1.5-14 | NR |
| F3D4D | FC3D4 | NR | NR | 1.5-14 | NR |
| F3E4D | FC3E4 | NR | NR | 1.5-14 | NR |
| F3A5D | FC3A5 | NR | NR | 1.5-14 | NR |
| F3B5D | FC3B5 | NR | NR | 1.5-14 | NR |
| F3C5D | FC3C5 | NR | NR | 1.5-14 | NR |
| F3D5D | FC3D5 | NR | NR | 1.5-14 | NR |
| F3E5D | FC3E5 | NR | NR | 1.5-14 | NR |
| F3A6D | FC3A6 | NR | NR | 1.5-14 | NR |
| F3B6D | FC3B6 | NR | NR | 1.5-14 | NR |
| F3C6D | FC3C6 | NR | NR | 1.5-14 | NR |
| F3D6D | FC3D6 | NR | NR | 1.5-14 | NR |
| F3E6D | FC3E6 | NR | NR | 1.5-14 | NR |
| F4A1D | FC4A1 | NR | NR | 1.5-14 | NR |
| F4B1D | FC4B1 | NR | NR | 1.5-14 | NR |
| F4C1D | FC4C1 | NR | NR | 1.5-14 | NR |
| F4D1D | FC4D1 | NR | NR | 1.5-14 | NR |
| F4E1D | FC4E1 | NR | NR | 1.5-14 | NR |
| F4A2D | FC4A2 | NR | NR | 1.5-14 | NR |
| F4B2D | FC4B2 | NR | NR | 1.5-14 | NR |
| F4C2D | FC4C2 | NR | NR | 1.5-14 | NR |
| F4D2D | FC4D2 | NR | NR | 1.5-14 | NR |
| F4E2D | FC4E2 | NR | NR | 1.5-14 | NR |
| F4A3D | FC4A3 | NR | NR | 1.5-14 | NR |
| F4B3D | FC4B3 | NR | NR | 1.5-14 | NR |
| FC4C3D | FC4C3 | NR | NR | 1.5-14 | NR |
| F4D3D | FC4D3 | NR | NR | 1.5-14 | NR |
| F4E3D | FC4E3 | NR | NR | 1.5-14 | NR |
| F4A4D | FC4A4 | NR | NR | 1.5-14 | NR |
| F4B4D | FC4B4 | NR | NR | 1.5-14 | NR |
| F4C4D | FC4C4 | NR | NR | 1.5-14 | NR |
| F4D4D | FC4D4 | NR | NR | 1.5-14 | NR |
| F4E4D | FC4E4 | NR | NR | 1.5-14 | NR |
| F4A5D | FC4A5 | NR | NR | 1.5-14 | NR |

TABLE 5-continued

FOAM TABLE

| Foam Number | Foamable Compo-sition, No. | Extruded Foam Properties % Closed Cell | Density, $kg/m^3$ | Compressive Strength, (ISO 844), megapascal (MPa) | Tensile Strength, ((ASTM C297), megapascal (MPa) |
|---|---|---|---|---|---|
| F4B5D | FC4B5 | NR | NR | 1.5-14 | NR |
| F4C5D | FC4C5 | NR | NR | 1.5-14 | NR |
| F4D5D | FC4D5 | NR | NR | 1.5-14 | NR |
| F4E5D | FC4E5 | NR | NR | 1.5-14 | NR |
| F4A6D | FC4A6 | NR | NR | 1.5-14 | NR |
| F4B6D | FC4B6 | NR | NR | 1.5-14 | NR |
| F4C6D | FC4C6 | NR | NR | 1.5-14 | NR |
| F4D6D | FC4D6 | NR | NR | 1.5-14 | NR |
| F4E6D | FC4E6 | NR | NR | 1.5-14 | NR |
| F5A1D | FC5A1 | NR | NR | 1.5-14 | NR |
| F5B1D | FC5B1 | NR | NR | 1.5-14 | NR |
| F5C1D | FC5C1 | NR | NR | 1.5-14 | NR |
| F5D1D | FC5D1 | NR | NR | 1.5-14 | NR |
| F5E1D | FC5E1 | NR | NR | 1.5-14 | NR |
| F5A2D | FC5A2 | NR | NR | 1.5-14 | NR |
| F5B2D | FC5B2 | NR | NR | 1.5-14 | NR |
| F5C2D | FC5C2 | NR | NR | 1.5-14 | NR |
| F5D2D | FC5D2 | NR | NR | 1.5-14 | NR |
| F5E2D | FC5E2 | NR | NR | 1.5-14 | NR |
| F5A3D | FC5A3 | NR | NR | 1.5-14 | NR |
| F5B3D | FC5B3 | NR | NR | 1.5-14 | NR |
| F5C3D | FC5C3 | NR | NR | 1.5-14 | NR |
| F5D3D | FC5D3 | NR | NR | 1.5-14 | NR |
| F5E3D | FC5E3 | NR | NR | 1.5-14 | NR |
| F5A4D | FC5A4 | NR | NR | 1.5-14 | NR |
| F5B4D | FC5B4 | NR | NR | 1.5-14 | NR |
| F5C4D | FC5C4 | NR | NR | 1.5-14 | NR |
| F5D4D | FC5D4 | NR | NR | 1.5-14 | NR |
| F5E4D | FC5E4 | NR | NR | 1.5-14 | NR |
| F5A5D | FC5A5 | NR | NR | 1.5-14 | NR |
| F5B5D | FC5B5 | NR | NR | 1.5-14 | NR |
| F5C5D | FC5C5 | NR | NR | 1.5-14 | NR |
| F5D5D | FC5D5 | NR | NR | 1.5-14 | NR |
| F5E5D | FC5E5 | NR | NR | 1.5-14 | NR |
| F5A6D | FC5A6 | NR | NR | 1.5-14 | NR |
| F5B6D | FC5B6 | NR | NR | 1.5-14 | NR |
| F5C6D | FC5C6 | NR | NR | 1.5-14 | NR |
| F5D6D | FC5D6 | NR | NR | 1.5-14 | NR |
| F5E6D | FC5E6 | NR | NR | 1.5-14 | NR |
| F6A1D | FC6A1 | NR | NR | 1.5-14 | NR |
| F6B1D | FC6B1 | NR | NR | 1.5-14 | NR |
| F6C1D | FC6C1 | NR | NR | 1.5-14 | NR |
| F6D1D | FC6D1 | NR | NR | 1.5-14 | NR |
| F6E1D | FC6E1 | NR | NR | 1.5-14 | NR |
| F6A2D | FC6A2 | NR | NR | 1.5-14 | NR |
| F6B2D | FC6B2 | NR | NR | 1.5-14 | NR |
| F6C2D | FC6C2 | NR | NR | 1.5-14 | NR |
| F6D2D | FC6D2 | NR | NR | 1.5-14 | NR |
| F6E2D | FC6E2 | NR | NR | 1.5-14 | NR |
| F6A3D | FC6A3 | NR | NR | 1.5-14 | NR |
| F6B3D | FC6B3 | NR | NR | 1.5-14 | NR |
| F6C3D | FC6C3 | NR | NR | 1.5-14 | NR |
| F6D3D | FC6D3 | NR | NR | 1.5-14 | NR |
| F6E3D | FC6E3 | NR | NR | 1.5-14 | NR |
| F6B4D | FC6B4 | NR | NR | 1.5-14 | NR |
| F6C4D | FC6C4 | NR | NR | 1.5-14 | NR |
| F6D4D | FC6D4 | NR | NR | 1.5-14 | NR |
| F6E4D | FC6E4 | NR | NR | 1.5-14 | NR |
| F6A5D | FC6A5 | NR | NR | 1.5-14 | NR |
| F6B5D | FC6B5 | NR | NR | 1.5-14 | NR |
| F6C5D | FC6C5 | NR | NR | 1.5-14 | NR |
| F6D5D | FC6D5 | NR | NR | 1.5-14 | NR |
| F6E5D | FC6E5 | NR | NR | 1.5-14 | NR |
| F6A6D | FC6A6 | NR | NR | 1.5-14 | NR |
| F6B6D | FC6B6 | NR | NR | 1.5-14 | NR |
| F6C6D | FC6C6 | NR | NR | 1.5-14 | NR |
| F6D6D | FC6D6 | NR | NR | 1.5-14 | NR |
| F6E6D | FC6E6 | NR | NR | 1.5-14 | NR |
| F7A1D | FC7A1 | NR | NR | 1.5-14 | NR |

TABLE 5-continued

FOAM TABLE

| Foam Number | Foamable Compo-sition, No. | Extruded Foam Properties % Closed Cell | Density, $kg/m^3$ | Compressive Strength, (ISO 844), megapascal (MPa) | Tensile Strength, ((ASTM C297), megapascal (MPa) |
|---|---|---|---|---|---|
| F7B1D | FC7B1 | NR | NR | 1.5-14 | NR |
| F7C1D | FC7C1 | NR | NR | 1.5-14 | NR |
| F7D1D | FC7D1 | NR | NR | 1.5-14 | NR |
| F7E1D | FC7E1 | NR | NR | 1.5-14 | NR |
| F7A2D | FC7A2 | NR | NR | 1.5-14 | NR |
| F7B2D | FC7B2 | NR | NR | 1.5-14 | NR |
| F7C2D | FC7C2 | NR | NR | 1.5-14 | NR |
| F7D2D | FC7D2 | NR | NR | 1.5-14 | NR |
| F7E2D | FC7E2 | NR | NR | 1.5-14 | NR |
| F7A3D | FC7A3 | NR | NR | 1.5-14 | NR |
| F7B3D | FC7B3 | NR | NR | 1.5-14 | NR |
| F7C3D | FC7C3 | NR | NR | 1.5-14 | NR |
| F7D3D | FC7D3 | NR | NR | 1.5-14 | NR |
| F7E3D | FC7E3 | NR | NR | 1.5-14 | NR |
| F7A4D | FC7A4 | NR | NR | 1.5-14 | NR |
| F7B4D | FC7B4 | NR | NR | 1.5-14 | NR |
| F7C4D | FC7C4 | NR | NR | 1.5-14 | NR |
| F7D4D | FC7D4 | NR | NR | 1.5-14 | NR |
| F7E4D | FC7E4 | NR | NR | 1.5-14 | NR |
| F7A5D | FC7A5 | NR | NR | 1.5-14 | NR |
| F7B5D | FC7B5 | NR | NR | 1.5-14 | NR |
| F7C5D | FC7C5 | NR | NR | 1.5-14 | NR |
| F7D5D | FC7D5 | NR | NR | 1.5-14 | NR |
| F7E5D | FC7E5 | NR | NR | 1.5-14 | NR |
| F7A6D | FC7A6 | NR | NR | 1.5-14 | NR |
| F7B6D | FC7B6 | NR | NR | 1.5-14 | NR |
| F7C6D | FC7C6 | NR | NR | 1.5-14 | NR |
| F7D6D | FC7D6 | NR | NR | 1.5-14 | NR |
| F7E6D | FC7E6 | NR | NR | 1.5-14 | NR |
| F8A1D | FC8A1 | NR | NR | 1.5-14 | NR |
| F8B1D | FC8B1 | NR | NR | 1.5-14 | NR |
| F8C1D | FC8C1 | NR | NR | 1.5-14 | NR |
| F8D1B | FC8D1 | NR | NR | 1.5-14 | NR |
| F8E1D | FC8E1 | NR | NR | 1.5-14 | NR |
| F8A2B | FC8A2 | NR | NR | 1.5-14 | NR |
| F8B2D | FC8B2 | NR | NR | 1.5-14 | NR |
| F8C2D | FC8C2 | NR | NR | 1.5-14 | NR |
| F8D2D | FC8D2 | NR | NR | 1.5-14 | NR |
| F8E2D | FC8E2 | NR | NR | 1.5-14 | NR |
| F8A3D | FC8A3 | NR | NR | 1.5-14 | NR |
| F8B3D | FC8B3 | NR | NR | 1.5-14 | NR |
| F8C3D | FC8C3 | NR | NR | 1.5-14 | NR |
| F8D3D | FC8D3 | NR | NR | 1.5-14 | NR |
| F8E3D | FC8E3 | NR | NR | 1.5-14 | NR |
| F8A4D | FC8A4 | NR | NR | 1.5-14 | NR |
| F8B4D | FC8B4 | NR | NR | 1.5-14 | NR |
| F8C4D | FC8C4 | NR | NR | 1.5-14 | NR |
| F8D4D | FC8D4 | NR | NR | 1.5-14 | NR |
| F8E4D | FC8E4 | NR | NR | 1.5-14 | NR |
| F8A5D | FC8A5 | NR | NR | 1.5-14 | NR |
| F8B5D | FC8B5 | NR | NR | 1.5-14 | NR |
| F8C5D | FC8C5 | NR | NR | 1.5-14 | NR |
| F8D5D | FC8D5 | NR | NR | 1.5-14 | NR |
| F8E5D | FC8E5 | NR | NR | 1.5-14 | NR |
| F8A6D | FC8A6 | NR | NR | 1.5-14 | NR |
| F8B6D | FC8B6 | NR | NR | 1.5-14 | NR |
| F8C6D | FC8C6 | NR | NR | 1.5-14 | NR |
| F8D6D | FC8D6 | NR | NR | 1.5-14 | NR |
| F8E6D | FC8E6 | NR | NR | 1.5-14 | NR |
| F1A1E | FC1A1 | >25% | 0.05-0.1 | 1.5-14 | NR |
| F1B1E | FC1B1 | NR | NR | 1.5-14 | NR |
| F1C1E | FC1C1 | NR | NR | 1.5-14 | NR |
| F1D1E | FC1D1 | NR | NR | 1.5-14 | NR |
| F1E1E | FC1E1 | NR | NR | 1.5-14 | NR |
| F1A2E | FC1A2 | NR | NR | 1.5-14 | NR |
| F1B2E | FC1B2 | NR | NR | 1.5-14 | NR |
| F1C2E | FC1C2 | NR | NR | 1.5-14 | NR |
| F1D2E | FC1D2 | NR | NR | 1.5-14 | NR |
| F1E2E | FC1E2 | NR | NR | 1.5-14 | NR |

TABLE 5-continued

| FOAM TABLE | | | | | |
|---|---|---|---|---|---|
| | | Extruded Foam Properties | | | |
| Foam Number | Foamable Compo-sition, No. | % Closed Cell | Density, kg/m$^3$ | Compressive Strength, (ISO 844), megapascal (MPa) | Tensile Strength, ((ASTM C297), megapascal (MPa) |
| F1A3E | FC1A3 | NR | NR | 1.5-14 | NR |
| F1B3E | FC1B3 | NR | NR | 1.5-14 | NR |
| F1C3E | FC1C3 | NR | NR | 1.5-14 | NR |
| F1D3E | FC1D3 | NR | NR | 1.5-14 | NR |
| F1E3E | FC1E3 | NR | NR | 1.5-14 | NR |
| F1A4E | FC1A4 | NR | NR | 1.5-14 | NR |
| F1B4E | FC1B4 | NR | NR | 1.5-14 | NR |
| F1C4E | FC1C4 | NR | NR | 1.5-14 | NR |
| F1D4E | FC1D4 | NR | NR | 1.5-14 | NR |
| F1E4E | FC1E4 | NR | NR | 1.5-14 | NR |
| F1A5E | FC1A5 | NR | NR | 1.5-14 | NR |
| F1B5E | FC1B5 | NR | NR | 1.5-14 | NR |
| F1C5E | FC1C5 | NR | NR | 1.5-14 | NR |
| F1D5E | FC1D5 | NR | NR | 1.5-14 | NR |
| F1E5E | FC1E5 | NR | NR | 1.5-14 | NR |
| F1A6E | FC1A6 | NR | NR | 1.5-14 | NR |
| F1B6E | FC1B6 | NR | NR | 1.5-14 | NR |
| F1C6E | FC1C6 | NR | NR | 1.5-14 | NR |
| F1D6E | FC1D6 | NR | NR | 1.5-14 | NR |
| F1E6E | FC1E6 | NR | NR | 1.5-14 | NR |
| F2A1E | FC2A1 | NR | NR | 1.5-14 | NR |
| F2B1E | FC2B1 | NR | NR | 1.5-14 | NR |
| F2C1E | FC2C1 | NR | NR | 1.5-14 | NR |
| F2D1E | FC2D1 | NR | NR | 1.5-14 | NR |
| F2E1E | FC2E1 | NR | NR | 1.5-14 | NR |
| F2A2E | FC2A2 | NR | NR | 1.5-14 | NR |
| F2B2E | FC2B2 | NR | NR | 1.5-14 | NR |
| F2C2E | FC2C2 | NR | NR | 1.5-14 | NR |
| F2D2E | FC2D2 | NR | NR | 1.5-14 | NR |
| F2E2E | FC2E2 | NR | NR | 1.5-14 | NR |
| F2A3E | FC2A3 | NR | NR | 1.5-14 | NR |
| F2B3E | FC2B3 | NR | NR | 1.5-14 | NR |
| F2C3E | FC2C3 | NR | NR | 1.5-14 | NR |
| F2D3E | FC2D3 | NR | NR | 1.5-14 | NR |
| F2E3E | FC2E3 | NR | NR | 1.5-14 | NR |
| F2A4E | FC2A4 | NR | NR | 1.5-14 | NR |
| F2B4E | FC2B4 | NR | NR | 1.5-14 | NR |
| F2C4E | FC2C4 | NR | NR | 1.5-14 | NR |
| F2D4E | FC2D4 | NR | NR | 1.5-14 | NR |
| F2E4E | FC2E4 | NR | NR | 1.5-14 | NR |
| F2A5E | FC2A5 | NR | NR | 1.5-14 | NR |
| F2B5E | FC2B5 | NR | NR | 1.5-14 | NR |
| F2C5E | FC2C5 | NR | NR | 1.5-14 | NR |
| F2D5E | FC2D5 | NR | NR | 1.5-14 | NR |
| F2E5E | FC2E5 | NR | NR | 1.5-14 | NR |
| F2A6E | FC2A6 | NR | NR | 1.5-14 | NR |
| F2B6E | FC2B6 | NR | NR | 1.5-14 | NR |
| F2C6E | FC2C6 | NR | NR | 1.5-14 | NR |
| F2D6E | FC2D6 | NR | NR | 1.5-14 | NR |
| F2E6E | FC2E6 | NR | NR | 1.5-14 | NR |
| F3A1E | FC3A1 | NR | NR | 1.5-14 | NR |
| F3B1E | FC3B1 | NR | NR | 1.5-14 | NR |
| F3C1E | FC3C1 | NR | NR | 1.5-14 | NR |
| F3D1E | FC3D1 | NR | NR | 1.5-14 | NR |
| F3E1E | FC3E1 | NR | NR | 1.5-14 | NR |
| F3A2E | FC3A2 | NR | NR | 1.5-14 | NR |
| F3B2E | FC3B2 | NR | NR | 1.5-14 | NR |
| F3C2E | FC3C2 | NR | NR | 1.5-14 | NR |
| F3D2E | FC3D2 | NR | NR | 1.5-14 | NR |
| F3E2E | FC3E2 | NR | NR | 1.5-14 | NR |
| F3A3E | FC3A3 | NR | NR | 1.5-14 | NR |
| F3B3E | FC3B3 | NR | NR | 1.5-14 | NR |
| F3C3E | FC3C3 | NR | NR | 1.5-14 | NR |
| F3D3E | FC3D3 | NR | NR | 1.5-14 | NR |
| F3E3E | FC3E3 | NR | NR | 1.5-14 | NR |
| F3A4E | FC3A4 | NR | NR | 1.5-14 | NR |
| F3B4E | FC3B4 | NR | NR | 1.5-14 | NR |
| F3C4E | FC3C4 | NR | NR | 1.5-14 | NR |
| F3D4E | FC3D4 | NR | NR | 1.5-14 | NR |

TABLE 5-continued

| FOAM TABLE | | | | | |
|---|---|---|---|---|---|
| | | Extruded Foam Properties | | | |
| Foam Number | Foamable Compo-sition, No. | % Closed Cell | Density, kg/m$^3$ | Compressive Strength, (ISO 844), megapascal (MPa) | Tensile Strength, ((ASTM C297), megapascal (MPa) |
| F3E4E | FC3E4 | NR | NR | 1.5-14 | NR |
| F3A5E | FC3A5 | NR | NR | 1.5-14 | NR |
| F3B5E | FC3B5 | NR | NR | 1.5-14 | NR |
| F3C5E | FC3C5 | NR | NR | 1.5-14 | NR |
| F3D5E | FC3D5 | NR | NR | 1.5-14 | NR |
| F3E5E | FC3E5 | NR | NR | 1.5-14 | NR |
| F3A6E | FC3A6 | NR | NR | 1.5-14 | NR |
| F3B6E | FC3B6 | NR | NR | 1.5-14 | NR |
| F3C6E | FC3C6 | NR | NR | 1.5-14 | NR |
| F3D6E | FC3D6 | NR | NR | 1.5-14 | NR |
| F3E6E | FC3E6 | NR | NR | 1.5-14 | NR |
| F4A1E | FC4A1 | NR | NR | 1.5-14 | NR |
| F4B1E | FC4B1 | NR | NR | 1.5-14 | NR |
| F4C1E | FC4C1 | NR | NR | 1.5-14 | NR |
| F4D1E | FC4D1 | NR | NR | 1.5-14 | NR |
| F4E1E | FC4E1 | NR | NR | 1.5-14 | NR |
| F4A2E | FC4A2 | NR | NR | 1.5-14 | NR |
| F4B2E | FC4B2 | NR | NR | 1.5-14 | NR |
| F4C2E | FC4C2 | NR | NR | 1.5-14 | NR |
| F4D2E | FC4D2 | NR | NR | 1.5-14 | NR |
| F4E2E | FC4E2 | NR | NR | 1.5-14 | NR |
| F4A3E | FC4A3 | NR | NR | 1.5-14 | NR |
| F4B3E | FC4B3 | NR | NR | 1.5-14 | NR |
| F4C3E | FC4C3 | NR | NR | 1.5-14 | NR |
| F4D3E | FC4D3 | NR | NR | 1.5-14 | NR |
| F4E3E | FC4E3 | NR | NR | 1.5-14 | NR |
| F4A4E | FC4A4 | NR | NR | 1.5-14 | NR |
| F4B4E | FC4B4 | NR | NR | 1.5-14 | NR |
| F4C4E | FC4C4 | NR | NR | 1.5-14 | NR |
| F4D4E | FC4D4 | NR | NR | 1.5-14 | NR |
| F4E4E | FC4E4 | NR | NR | 1.5-14 | NR |
| F4A5E | FC4A5 | NR | NR | 1.5-14 | NR |
| F4B5E | FC4B5 | NR | NR | 1.5-14 | NR |
| F4C5E | FC4C5 | NR | NR | 1.5-14 | NR |
| F4D5E | FC4D5 | NR | NR | 1.5-14 | NR |
| F4E5E | FC4E5 | NR | NR | 1.5-14 | NR |
| F4A6E | FC4A6 | NR | NR | 1.5-14 | NR |
| F4B6E | FC4B6 | NR | NR | 1.5-14 | NR |
| F4C6E | FC4C6 | NR | NR | 1.5-14 | NR |
| F4D6E | FC4D6 | NR | NR | 1.5-14 | NR |
| F4E6E | FC4E6 | NR | NR | 1.5-14 | NR |
| F5A1E | FC5A1 | NR | NR | 1.5-14 | NR |
| F5B1E | FC5B1 | NR | NR | 1.5-14 | NR |
| F5C1E | FC5C1 | NR | NR | 1.5-14 | NR |
| F5D1E | FC5D1 | NR | NR | 1.5-14 | NR |
| F5E1E | FC5E1 | NR | NR | 1.5-14 | NR |
| F5A2E | FC5A2 | NR | NR | 1.5-14 | NR |
| F5B2E | FC5B2 | NR | NR | 1.5-14 | NR |
| F5C2E | FC5C2 | NR | NR | 1.5-14 | NR |
| F5D2E | FC5D2 | NR | NR | 1.5-14 | NR |
| F5E2E | FC5E2 | NR | NR | 1.5-14 | NR |
| F5A3E | FC5A3 | NR | NR | 1.5-14 | NR |
| F5B3E | FC5B3 | NR | NR | 1.5-14 | NR |
| F5C3E | FC5C3 | NR | NR | 1.5-14 | NR |
| F5D3E | FC5D3 | NR | NR | 1.5-14 | NR |
| F5E3E | FC5E3 | NR | NR | 1.5-14 | NR |
| F5A4E | FC5A4 | NR | NR | 1.5-14 | NR |
| F5B4E | FC5B4 | NR | NR | 1.5-14 | NR |
| F5C4E | FC5C4 | NR | NR | 1.5-14 | NR |
| F5D4E | FC5D4 | NR | NR | 1.5-14 | NR |
| F5E4E | FC5E4 | NR | NR | 1.5-14 | NR |
| F5A5E | FC5A5 | NR | NR | 1.5-14 | NR |
| F5B5B | FC5E5 | NR | NR | 1.5-14 | NR |
| F5C5E | FC5C5 | NR | NR | 1.5-14 | NR |
| F5D5E | FC5D5 | NR | NR | 1.5-14 | NR |
| F5E5E | FC5E5 | NR | NR | 1.5-14 | NR |
| F5A6E | FC5A6 | NR | NR | 1.5-14 | NR |
| F5B6E | FC5B6 | NR | NR | 1.5-14 | NR |
| F5C6E | FC5C6 | NR | NR | 1.5-14 | NR |

TABLE 5-continued

FOAM TABLE

| | | Extruded Foam Properties | | | |
|---|---|---|---|---|---|
| Foam Number | Foamable Composition, No. | % Closed Cell | Density, kg/m$^3$ | Compressive Strength, (ISO 844), megapascal (MPa) | Tensile Strength, ((ASTM C297), megapascal (MPa) |
| F5D6E | FC5D6 | NR | NR | 1.5-14 | NR |
| F5E6E | FC5E6 | NR | NR | 1.5-14 | NR |
| F6A1E | FC6A1 | NR | NR | 1.5-14 | NR |
| F6B1E | FC6B1 | NR | NR | 1.5-14 | NR |
| F6C1E | FC6C1 | NR | NR | 1.5-14 | NR |
| F6D1E | FC6D1 | NR | NR | 1.5-14 | NR |
| F6E1E | FC6E1 | NR | NR | 1.5-14 | NR |
| F6A2E | FC6A2 | NR | NR | 1.5-14 | NR |
| F6B2E | FC6E2 | NR | NR | 1.5-14 | NR |
| F6C2E | FC6C2 | NR | NR | 1.5-14 | NR |
| F6D2E | FC6D2 | NR | NR | 1.5-14 | NR |
| F6E2E | FC6E2 | NR | NR | 1.5-14 | NR |
| F6A3E | FC6A3 | NR | NR | 1.5-14 | NR |
| F6B3E | FC6B3 | NR | NR | 1.5-14 | NR |
| F6C3E | FC6C3 | NR | NR | 1.5-14 | NR |
| F6D3E | FC6D3 | NR | NR | 1.5-14 | NR |
| F6E3E | FC6E3 | NR | NR | 1.5-14 | NR |
| F6A4E | FC6A4 | NR | NR | 1.5-14 | NR |
| F6B4E | FC6B4 | NR | NR | 1.5-14 | NR |
| F6C4E | FC6C4 | NR | NR | 1.5-14 | NR |
| F6D4E | FC6D4 | NR | NR | 1.5-14 | NR |
| F6E4E | FC6E4 | NR | NR | 1.5-14 | NR |
| F6A5E | FC6A5 | NR | NR | 1.5-14 | NR |
| F6B5E | FC6B5 | NR | NR | 1.5-14 | NR |
| F6C5E | FC6C5 | NR | NR | 1.5-14 | NR |
| F6D5E | FC6D5 | NR | NR | 1.5-14 | NR |
| F6E5E | FC6E5 | NR | NR | 1.5-14 | NR |
| F6A6E | FC6A6 | NR | NR | 1.5-14 | NR |
| F6B6E | FC6B6 | NR | NR | 1.5-14 | NR |
| F6C6E | FC6C6 | NR | NR | 1.5-14 | NR |
| F6D6E | FC6D6 | NR | NR | 1.5-14 | NR |
| F6E6E | FC6E6 | NR | NR | 1.5-14 | NR |
| F7A1E | FC7A1 | NR | NR | 1.5-14 | NR |
| F7B1E | FC7B1 | NR | NR | 1.5-14 | NR |
| F7C1E | FC7C1 | NR | NR | 1.5-14 | NR |
| F7D1E | FC7D1 | NR | NR | 1.5-14 | NR |
| F7E1E | FC7E1 | NR | NR | 1.5-14 | NR |
| F7A2E | FC7A2 | NR | NR | 1.5-14 | NR |
| F7B2E | FC7B2 | NR | NR | 1.5-14 | NR |
| F7C2E | FC7C2 | NR | NR | 1.5-14 | NR |
| F7D2E | FC7D2 | NR | NR | 1.5-14 | NR |
| F7E2E | FC7E2 | NR | NR | 1.5-14 | NR |
| F7A3E | FC7A3 | NR | NR | 1.5-14 | NR |
| F7B3E | FC7B3 | NR | NR | 1.5-14 | NR |
| F7C3E | FC7C3 | NR | NR | 1.5-14 | NR |
| F7D3E | FC7D3 | NR | NR | 1.5-14 | NR |
| F7E3E | FC7E3 | NR | NR | 1.5-14 | NR |
| F7A4E | FC7A4 | NR | NR | 1.5-14 | NR |
| F7B4E | FC7B4 | NR | NR | 1.5-14 | NR |
| F7C4E | FC7C4 | NR | NR | 1.5-14 | NR |
| F7D4E | FC7D4 | NR | NR | 1.5-14 | NR |
| F7E4E | FC7E4 | NR | NR | 1.5-14 | NR |
| F7A5E | FC7A5 | NR | NR | 1.5-14 | NR |
| F7B5E | FC7B5 | NR | NR | 1.5-14 | NR |
| F7C5E | FC7C5 | NR | NR | 1.5-14 | NR |
| F7D5E | FC7D5 | NR | NR | 1.5-14 | NR |
| F7E5E | FC7E5 | NR | NR | 1.5-14 | NR |
| F7A6E | FC7A6 | NR | NR | 1.5-14 | NR |
| F7B6E | FC7B6 | NR | NR | 1.5-14 | NR |
| F7C6E | FC7C6 | NR | NR | 1.5-14 | NR |
| F7D6E | FC7D6 | NR | NR | 1.5-14 | NR |
| F7E6E | FC7E6 | NR | NR | 1.5-14 | NR |
| F8A1E | FC8A1 | NR | NR | 1.5-14 | NR |
| F8B1E | FC8B1 | NR | NR | 1.5-14 | NR |
| F8C1E | FC8C1 | NR | NR | 1.5-14 | NR |
| F8D1E | FC8D1 | NR | NR | 1.5-14 | NR |
| F8E1E | FC8E1 | NR | NR | 1.5-14 | NR |
| F8A2E | FC8A2 | NR | NR | 1.5-14 | NR |
| F8B2E | FC8B2 | NR | NR | 1.5-14 | NR |

TABLE 5-continued

FOAM TABLE

| | | Extruded Foam Properties | | | |
|---|---|---|---|---|---|
| Foam Number | Foamable Composition, No. | % Closed Cell | Density, kg/m$^3$ | Compressive Strength, (ISO 844), megapascal (MPa) | Tensile Strength, ((ASTM C297), megapascal (MPa) |
| F8C2E | FC8C2 | NR | NR | 1.5-14 | NR |
| F8D2E | FC8D2 | NR | NR | 1.5-14 | NR |
| F8E2E | FC8E2 | NR | NR | 1.5-14 | NR |
| F8A3E | FC8A3 | NR | NR | 1.5-14 | NR |
| F8B3E | FC8B3 | NR | NR | 1.5-14 | NR |
| F8C3E | FC8C3 | NR | NR | 1.5-14 | NR |
| F8D3E | FC8D3 | NR | NR | 1.5-14 | NR |
| F8E3E | FC8E3 | NR | NR | 1.5-14 | NR |
| F8A4E | FC8A4 | NR | NR | 1.5-14 | NR |
| F8B4E | FC8B4 | NR | NR | 1.5-14 | NR |
| F8C4E | FC8C4 | NR | NR | 1.5-14 | NR |
| F8D4E | FC8D4 | NR | NR | 1.5-14 | NR |
| F8E4E | FC8E4 | NR | NR | 1.5-14 | NR |
| F8A5E | FC8A5 | NR | NR | 1.5-14 | NR |
| F8B5E | FC8B5 | NR | NR | 1.5-14 | NR |
| F8C5E | FC8C5 | NR | NR | 1.5-14 | NR |
| F8D5E | FC8D5 | NR | NR | 1.5-14 | NR |
| F8E5E | FC8E5 | NR | NR | 1.5-14 | NR |
| F8A6E | FC8A6 | NR | NR | 1.5-14 | NR |
| F8B6E | FC8B6 | NR | NR | 1.5-14 | NR |
| F8C6E | FC8C6 | NR | NR | 1.5-14 | NR |
| F8D6E | FC8D6 | NR | NR | 1.5-14 | NR |
| F8E6E | FC8E6 | NR | NR | 1.5-14 | NR |
| F1B2D | FC1B2 | >25% | 150-325 | 1.5-14 | NR |
| F1C2D | FC1C2 | >25% | 150-325 | 1.5-14 | NR |
| F1D2D | FC1D2 | >25% | 150-325 | 1.5-14 | NR |
| F1E2D | FC1E2 | >25% | 150-325 | 1.5-14 | NR |
| F1A3D | FC1A3 | >25% | 150-325 | 1.5-14 | NR |
| F1B3D | FC1B3 | >25% | 150-325 | 1.5-14 | NR |
| F1C3D | FC1C3 | >25% | 150-325 | 1.5-14 | NR |
| F1D3D | FC1D3 | >25% | 150-325 | 1.5-14 | NR |
| F1E3D | FC1E3 | >25% | 150-325 | 1.5-14 | NR |
| F1A4D | FC1A4 | >25% | 150-325 | 1.5-14 | NR |
| F1B4D | FC1B4 | >25% | 150-325 | 1.5-14 | NR |
| F1C4D | FC1C4 | >25% | 150-325 | 1.5-14 | NR |
| F1D4D | FC1D4 | >25% | 150-325 | 1.5-14 | NR |
| F1E4D | FC1E4 | >25% | 150-325 | 1.5-14 | NR |
| F1A5D | FC1A5 | >25% | 150-325 | 1.5-14 | NR |
| F1B5D | FC1B5 | >25% | 150-325 | 1.5-14 | NR |
| F1C5D | FC1C5 | >25% | 150-325 | 1.5-14 | NR |
| F1D5D | FC1D5 | >25% | 150-325 | 1.5-14 | NR |
| F1E5D | FC1E5 | >25% | 150-325 | 1.5-14 | NR |
| F1A6D | FC1A6 | >25% | 150-325 | 1.5-14 | NR |
| F1B6D | FC1B6 | >25% | 150-325 | 1.5-14 | NR |
| F1C6D | FC1C6 | >25% | 150-325 | 1.5-14 | NR |
| F1D6D | FC1D6 | >25% | 150-325 | 1.5-14 | NR |
| F1E6D | FC1E6 | >25% | 150-325 | 1.5-14 | NR |
| F2A1D | FC2A1 | >25% | 150-325 | 1.5-14 | NR |
| F2B1D | FC2B1 | >25% | 150-325 | 1.5-14 | NR |
| F2C1D | FC2C1 | >25% | 150-325 | 1.5-14 | NR |
| F2D1D | FC2D1 | >25% | 150-325 | 1.5-14 | NR |
| F2E1D | FC2E1 | >25% | 150-325 | 1.5-14 | NR |
| F2A2D | FC2A2 | >25% | 150-325 | 1.5-14 | NR |
| F2B2D | FC2B2 | >25% | 150-325 | 1.5-14 | NR |
| F2C2D | FC2C2 | >25% | 150-325 | 1.5-14 | NR |
| F2D2D | FC2D2 | >25% | 150-325 | 1.5-14 | NR |
| F2E2D | FC2E2 | >25% | 150-325 | 1.5-14 | NR |
| F2A3D | FC2A3 | >25% | 150-325 | 1.5-14 | NR |
| F2B3D | FC2B3 | >25% | 150-325 | 1.5-14 | NR |
| F2C3D | FC2C3 | >25% | 150-325 | 1.5-14 | NR |
| F2D3D | FC2D3 | >25% | 150-325 | 1.5-14 | NR |
| F2E3D | FC2E3 | >25% | 150-325 | 1.5-14 | NR |
| F2A4D | FC2A4 | >25% | 150-325 | 1.5-14 | NR |
| F2B4D | FC2B4 | >25% | 150-325 | 1.5-14 | NR |
| F2C4D | FC2C4 | >25% | 150-325 | 1.5-14 | NR |
| F2D4D | FC2D4 | >25% | 150-325 | 1.5-14 | NR |
| F2E4D | FC2E4 | >25% | 150-325 | 1.5-14 | NR |
| F2A5D | FC2A5 | >25% | 150-325 | 1.5-14 | NR |
| F2B5D | FC2B5 | >25% | 150-325 | 1.5-14 | NR |

TABLE 5-continued

FOAM TABLE

| Foam Number | Foamable Compo-sition, No. | Extruded Foam Properties % Closed Cell | Density, kg/m$^3$ | Compressive Strength, (ISO 844), megapascal (MPa) | Tensile Strength, ((ASTM C297), megapascal (MPa) |
|---|---|---|---|---|---|
| F2C5D | FC2C5 | >25% | 150-325 | 1.5-14 | NR |
| F2D5D | FC2D5 | >25% | 150-325 | 1.5-14 | NR |
| F2E5D | FC2E5 | >25% | 150-325 | 1.5-14 | NR |
| F2A6D | FC2A6 | >25% | 150-325 | 1.5-14 | NR |
| F2B6D | FC2B6 | >25% | 150-325 | 1.5-14 | NR |
| F2C6D | FC2C6 | >25% | 150-325 | 1.5-14 | NR |
| F2D6D | FC2D6 | >25% | 150-325 | 1.5-14 | NR |
| F2E6D | FC2E6 | >25% | 150-325 | 1.5-14 | NR |
| F3A1D | FC3A1 | >25% | 150-325 | 1.5-14 | NR |
| F3B1D | FC3B1 | >25% | 150-325 | 1.5-14 | NR |
| F3C1D | FC3C1 | >25% | 150-325 | 1.5-14 | NR |
| F3D1D | FC3D1 | >25% | 150-325 | 1.5-14 | NR |
| F3E1D | FC3E1 | >25% | 150-325 | 1.5-14 | NR |
| F3A2D | FC3A2 | >25% | 150-325 | 1.5-14 | NR |
| F3B2D | FC3B2 | >25% | 150-325 | 1.5-14 | NR |
| F3C2D | FC3C2 | >25% | 150-325 | 1.5-14 | NR |
| F3D2D | FC3D2 | >25% | 150-325 | 1.5-14 | NR |
| F3E2D | FC3E2 | >25% | 150-325 | 1.5-14 | NR |
| F3A3D | FC3A3 | >25% | 150-325 | 1.5-14 | NR |
| F3B3D | FC3B3 | >25% | 150-325 | 1.5-14 | NR |
| F3C3D | FC3C3 | >25% | 150-325 | 1.5-14 | NR |
| F3D3D | FC3D3 | >25% | 150-325 | 1.5-14 | NR |
| F3E3D | FC3E3 | >25% | 150-325 | 1.5-14 | NR |
| F3A4D | FC3A4 | >25% | 150-325 | 1.5-14 | NR |
| F3B4D | FC3B4 | >25% | 150-325 | 1.5-14 | NR |
| F3C4D | FC3C4 | >25% | 150-325 | 1.5-14 | NR |
| F3D4D | FC3D4 | >25% | 150-325 | 1.5-14 | NR |
| F3E4D | FC3E4 | >25% | 150-325 | 1.5-14 | NR |
| F3A5D | FC3A5 | >25% | 150-325 | 1.5-14 | NR |
| F3B5D | FC3B5 | >25% | 150-325 | 1.5-14 | NR |
| F3C5D | FC3C5 | >25% | 150-325 | 1.5-14 | NR |
| F3D5D | FC3D5 | >25% | 150-325 | 1.5-14 | NR |
| F3E5D | FC3E5 | >25% | 150-325 | 1.5-14 | NR |
| F3A6D | FC3A6 | >25% | 150-325 | 1.5-14 | NR |
| F3B6D | FC3B6 | >25% | 150-325 | 1.5-14 | NR |
| F3C6D | FC3C6 | >25% | 150-325 | 1.5-14 | NR |
| F3D6D | FC3D6 | >25% | 150-325 | 1.5-14 | NR |
| F3E6D | FC3E6 | >25% | 150-325 | 1.5-14 | NR |
| F4A1D | FC4A1 | >25% | 150-325 | 1.5-14 | NR |
| F4B1D | FC4B1 | >25% | 150-325 | 1.5-14 | NR |
| F4C1D | FC4C1 | >25% | 150-325 | 1.5-14 | NR |
| F4D1D | FC4D1 | >25% | 150-325 | 1.5-14 | NR |
| F4E1D | FC4E1 | >25% | 150-325 | 1.5-14 | NR |
| F4A2D | FC4A2 | >25% | 150-325 | 1.5-14 | NR |
| F4B2D | FC4B2 | >25% | 150-325 | 1.5-14 | NR |
| F4C2D | FC4C2 | >25% | 150-325 | 1.5-14 | NR |
| F4D2D | FC4D2 | >25% | 150-325 | 1.5-14 | NR |
| F4E2D | FC4E2 | >25% | 150-325 | 1.5-14 | NR |
| F4A3D | FC4A3 | >25% | 150-325 | 1.5-14 | NR |
| F4B3D | FC4B3 | >25% | 150-325 | 1.5-14 | NR |
| FC4C3D | FC4C3 | >25% | 150-325 | 1.5-14 | NR |
| F4D3D | FC4D3 | >25% | 150-325 | 1.5-14 | NR |
| F4E3D | FC4E3 | >25% | 150-325 | 1.5-14 | NR |
| F4A4D | FC4A4 | >25% | 150-325 | 1.5-14 | NR |
| F4B4D | FC4B4 | >25% | 150-325 | 1.5-14 | NR |
| F4C4D | FC4C4 | >25% | 150-325 | 1.5-14 | NR |
| F4D4D | FC4D4 | >25% | 150-325 | 1.5-14 | NR |
| F4E4D | FC4E4 | >25% | 150-325 | 1.5-14 | NR |
| F4A5D | FC4A5 | >25% | 150-325 | 1.5-14 | NR |
| F4B5D | FC4B5 | >25% | 150-325 | 1.5-14 | NR |
| F4C5D | FC4C5 | >25% | 150-325 | 1.5-14 | NR |
| F4D5D | FC4D5 | >25% | 150-325 | 1.5-14 | NR |
| F4E5D | FC4E5 | >25% | 150-325 | 1.5-14 | NR |
| F4A6D | FC4A6 | >25% | 150-325 | 1.5-14 | NR |
| F4B6D | FC4B6 | >25% | 150-325 | 1.5-14 | NR |
| F4C6D | FC4C6 | >25% | 150-325 | 1.5-14 | NR |
| F4D6D | FC4D6 | >25% | 150-325 | 1.5-14 | NR |
| F4E6D | FC4E6 | >25% | 150-325 | 1.5-14 | NR |
| F5A1D | FC5A1 | >25% | 150-325 | 1.5-14 | NR |

TABLE 5-continued

FOAM TABLE

| Foam Number | Foamable Compo-sition, No. | Extruded Foam Properties % Closed Cell | Density, kg/m$^3$ | Compressive Strength, (ISO 844), megapascal (MPa) | Tensile Strength, ((ASTM C297), megapascal (MPa) |
|---|---|---|---|---|---|
| F5B1D | FC5B1 | >25% | 150-325 | 1.5-14 | NR |
| F5C1D | FC5C1 | >25% | 150-325 | 1.5-14 | NR |
| F5D1D | FC5D1 | >25% | 150-325 | 1.5-14 | NR |
| F5E1D | FC5E1 | >25% | 150-325 | 1.5-14 | NR |
| F5A2D | FC5A2 | >25% | 150-325 | 1.5-14 | NR |
| F5B2D | FC5B2 | >25% | 150-325 | 1.5-14 | NR |
| F5C2D | FC5C2 | >25% | 150-325 | 1.5-14 | NR |
| F5D2D | FC5D2 | >25% | 150-325 | 1.5-14 | NR |
| F5E2D | FC5E2 | >25% | 150-325 | 1.5-14 | NR |
| F5A3D | FC5A3 | >25% | 150-325 | 1.5-14 | NR |
| F5B3D | FC5B3 | >25% | 150-325 | 1.5-14 | NR |
| F5C3D | FC5C3 | >25% | 150-325 | 1.5-14 | NR |
| F5D3D | FC5D3 | >25% | 150-325 | 1.5-14 | NR |
| F5E3D | FC5E3 | >25% | 150-325 | 1.5-14 | NR |
| F5A4D | FC5A4 | >25% | 150-325 | 1.5-14 | NR |
| F5B4D | FC5B4 | >25% | 150-325 | 1.5-14 | NR |
| F5C4D | FC5C4 | >25% | 150-325 | 1.5-14 | NR |
| F5D4D | FC5D4 | >25% | 150-325 | 1.5-14 | NR |
| F5E4D | FC5E4 | >25% | 150-325 | 1.5-14 | NR |
| F5A5D | FC5A5 | >25% | 150-325 | 1.5-14 | NR |
| F5B5D | FC5B5 | >25% | 150-325 | 1.5-14 | NR |
| F5C5D | FC5C5 | >25% | 150-325 | 1.5-14 | NR |
| F5D5D | FC5D5 | >25% | 150-325 | 1.5-14 | NR |
| F5E5D | FC5E5 | >25% | 150-325 | 1.5-14 | NR |
| F5A6D | FC5A6 | >25% | 150-325 | 1.5-14 | NR |
| F5B6D | FC5B6 | >25% | 150-325 | 1.5-14 | NR |
| F5C6D | FC5C6 | >25% | 150-325 | 1.5-14 | NR |
| F5D6D | FC5D6 | >25% | 150-325 | 1.5-14 | NR |
| F5E6D | FC5E6 | >25% | 150-325 | 1.5-14 | NR |
| F6A1D | FC6A1 | >25% | 150-325 | 1.5-14 | NR |
| F6B1D | FC6B1 | >25% | 150-325 | 1.5-14 | NR |
| F6C1D | FC6C1 | >25% | 150-325 | 1.5-14 | NR |
| F6D1D | FC6D1 | >25% | 150-325 | 1.5-14 | NR |
| F6E1D | FC6E1 | >25% | 150-325 | 1.5-14 | NR |
| F6A2D | FC6A2 | >25% | 150-325 | 1.5-14 | NR |
| F6B2D | FC6B2 | >25% | 150-325 | 1.5-14 | NR |
| F6C2D | FC6C2 | >25% | 150-325 | 1.5-14 | NR |
| F6D2D | FC6D2 | >25% | 150-325 | 1.5-14 | NR |
| F6E2D | FC6E2 | >25% | 150-325 | 1.5-14 | NR |
| F6A3D | FC6A3 | >25% | 150-325 | 1.5-14 | NR |
| F6B3D | FC6B3 | >25% | 150-325 | 1.5-14 | NR |
| F6C3D | FC6C3 | >25% | 150-325 | 1.5-14 | NR |
| F6D3D | FC6D3 | >25% | 150-325 | 1.5-14 | NR |
| F6E3D | FC6E3 | >25% | 150-325 | 1.5-14 | NR |
| F6B4D | FC6B4 | >25% | 150-325 | 1.5-14 | NR |
| F6C4D | FC6C4 | >25% | 150-325 | 1.5-14 | NR |
| F6D4D | FC6D4 | >25% | 150-325 | 1.5-14 | NR |
| F6E4D | FC6E4 | >25% | 150-325 | 1.5-14 | NR |
| F6A5D | FC6A5 | >25% | 150-325 | 1.5-14 | NR |
| F6B5D | FC6B5 | >25% | 150-325 | 1.5-14 | NR |
| F6C5D | FC6C5 | >25% | 150-325 | 1.5-14 | NR |
| F6D5D | FC6D5 | >25% | 150-325 | 1.5-14 | NR |
| F6E5D | FC6E5 | >25% | 150-325 | 1.5-14 | NR |
| F6A6D | FC6A6 | >25% | 150-325 | 1.5-14 | NR |
| F6B6D | FC6B6 | >25% | 150-325 | 1.5-14 | NR |
| F6C6D | FC6C6 | >25% | 150-325 | 1.5-14 | NR |
| F6D6D | FC6D6 | >25% | 150-325 | 1.5-14 | NR |
| F6E6D | FC6E6 | >25% | 150-325 | 1.5-14 | NR |
| F7A1D | FC7A1 | >25% | 150-325 | 1.5-14 | NR |
| F7B1D | FC7B1 | >25% | 150-325 | 1.5-14 | NR |
| F7C1D | FC7C1 | >25% | 150-325 | 1.5-14 | NR |
| F7D1D | FC7D1 | >25% | 150-325 | 1.5-14 | NR |
| F7E1D | FC7E1 | >25% | 150-325 | 1.5-14 | NR |
| F7A2D | FC7A2 | >25% | 150-325 | 1.5-14 | NR |
| F7B2D | FC7B2 | >25% | 150-325 | 1.5-14 | NR |
| F7C2D | FC7C2 | >25% | 150-325 | 1.5-14 | NR |
| F7D2D | FC7D2 | >25% | 150-325 | 1.5-14 | NR |
| F7E2D | FC7E2 | >25% | 150-325 | 1.5-14 | NR |
| F7A3D | FC7A3 | >25% | 150-325 | 1.5-14 | NR |

TABLE 5-continued

FOAM TABLE

| Foam Number | Foamable Compo-sition, No. | Extruded Foam Properties % Closed Cell | Density, kg/m$^3$ | Compressive Strength, (ISO 844), megapascal (MPa) | Tensile Strength, ((ASTM C297), megapascal (MPa) |
|---|---|---|---|---|---|
| F7B3D | FC7B3 | >25% | 150-325 | 1.5-14 | NR |
| F7C3D | FC7C3 | >25% | 150-325 | 1.5-14 | NR |
| F7D3D | FC7D3 | >25% | 150-325 | 1.5-14 | NR |
| F7E3D | FC7E3 | >25% | 150-325 | 1.5-14 | NR |
| F7A4D | FC7A4 | >25% | 150-325 | 1.5-14 | NR |
| F7B4D | FC7B4 | >25% | 150-325 | 1.5-14 | NR |
| F7C4D | FC7C4 | >25% | 150-325 | 1.5-14 | NR |
| F7D4D | FC7D4 | >25% | 150-325 | 1.5-14 | NR |
| F7E4D | FC7E4 | >25% | 150-325 | 1.5-14 | NR |
| F7A5D | FC7A5 | >25% | 150-325 | 1.5-14 | NR |
| F7B5D | FC7B5 | >25% | 150-325 | 1.5-14 | NR |
| F7C5D | FC7C5 | >25% | 150-325 | 1.5-14 | NR |
| F7D5D | FC7D5 | >25% | 150-325 | 1.5-14 | NR |
| F7E5D | FC7E5 | >25% | 150-325 | 1.5-14 | NR |
| F7A6D | FC7A6 | >25% | 150-325 | 1.5-14 | NR |
| F7B6D | FC7B6 | >25% | 150-325 | 1.5-14 | NR |
| F7C6D | FC7C6 | >25% | 150-325 | 1.5-14 | NR |
| F7D6D | FC7D6 | >25% | 150-325 | 1.5-14 | NR |
| F7E6D | FC7E6 | >25% | 150-325 | 1.5-14 | NR |
| F8A1D | FC8A1 | >25% | 150-325 | 1.5-14 | NR |
| F8B1D | FC8B1 | >25% | 150-325 | 1.5-14 | NR |
| F8C1D | FC8C1 | >25% | 150-325 | 1.5-14 | NR |
| F8D1B | FC8D1 | >25% | 150-325 | 1.5-14 | NR |
| F8E1D | FC8E1 | >25% | 150-325 | 1.5-14 | NR |
| F8A2B | FC8A2 | >25% | 150-325 | 1.5-14 | NR |
| F8B2D | FC8B2 | >25% | 150-325 | 1.5-14 | NR |
| F8C2D | FC8C2 | >25% | 150-325 | 1.5-14 | NR |
| F8D2D | FC8D2 | >25% | 150-325 | 1.5-14 | NR |
| F8E2D | FC8E2 | >25% | 150-325 | 1.5-14 | NR |
| F8A3D | FC8A3 | >25% | 150-325 | 1.5-14 | NR |
| F8B3D | FC8B3 | >25% | 150-325 | 1.5-14 | NR |
| F8C3D | FC8C3 | >25% | 150-325 | 1.5-14 | NR |
| F8D3D | FC8D3 | >25% | 150-325 | 1.5-14 | NR |
| F8E3D | FC8E3 | >25% | 150-325 | 1.5-14 | NR |
| F8A4D | FC8A4 | >25% | 150-325 | 1.5-14 | NR |
| F8B4D | FC8B4 | >25% | 150-325 | 1.5-14 | NR |
| F8C4D | FC8C4 | >25% | 150-325 | 1.5-14 | NR |
| F8D4D | FC8D4 | >25% | 150-325 | 1.5-14 | NR |
| F8E4D | FC8E4 | >25% | 150-325 | 1.5-14 | NR |
| F8A5D | FC8A5 | >25% | 150-325 | 1.5-14 | NR |
| F8B5D | FC8B5 | >25% | 150-325 | 1.5-14 | NR |
| F8C5D | FC8C5 | >25% | 150-325 | 1.5-14 | NR |
| F8D5D | FC8D5 | >25% | 150-325 | 1.5-14 | NR |
| F8E5D | FC8E5 | >25% | 150-325 | 1.5-14 | NR |
| F8A6D | FC8A6 | >25% | 150-325 | 1.5-14 | NR |
| F8B6D | FC8B6 | >25% | 150-325 | 1.5-14 | NR |
| F8C6D | FC8C6 | >25% | 150-325 | 1.5-14 | NR |
| F8D6D | FC8D6 | >25% | 150-325 | 1.5-14 | NR |
| F8E6D | FC8E6 | >25% | 150-325 | 1.5-14 | NR |
| F1A1E | FC1A1 | >25% | 150-325 | 1.5-14 | NR |
| F1B1E | FC1B1 | >25% | 150-325 | 1.5-14 | NR |
| F1C1E | FC1C1 | >25% | 150-325 | 1.5-14 | NR |
| F1D1E | FC1D1 | >25% | 150-325 | 1.5-14 | NR |
| F1E1E | FC1E1 | >25% | 150-325 | 1.5-14 | NR |
| F1A2E | FC1A2 | >25% | 150-325 | 1.5-14 | NR |
| F1B2E | FC1B2 | >25% | 150-325 | 1.5-14 | NR |
| F1C2E | FC1C2 | >25% | 150-325 | 1.5-14 | NR |
| F1D2E | FC1D2 | >25% | 150-325 | 1.5-14 | NR |
| F1E2E | FC1E2 | >25% | 150-325 | 1.5-14 | NR |
| F1A3E | FC1A3 | >25% | 150-325 | 1.5-14 | NR |
| F1B3E | FC1B3 | >25% | 150-325 | 1.5-14 | NR |
| F1C3E | FC1C3 | >25% | 150-325 | 1.5-14 | NR |
| F1D3E | FC1D3 | >25% | 150-325 | 1.5-14 | NR |
| F1E3E | FC1E3 | >25% | 150-325 | 1.5-14 | NR |
| F1A4E | FC1A4 | >25% | 150-325 | 1.5-14 | NR |
| F1B4E | FC1B4 | >25% | 150-325 | 1.5-14 | NR |
| F1C4E | FC1C4 | >25% | 150-325 | 1.5-14 | NR |
| F1D4E | FC1D4 | >25% | 150-325 | 1.5-14 | NR |
| F1E4E | FC1E4 | >25% | 150-325 | 1.5-14 | NR |

TABLE 5-continued

FOAM TABLE

| Foam Number | Foamable Compo-sition, No. | Extruded Foam Properties % Closed Cell | Density, kg/m$^3$ | Compressive Strength, (ISO 844), megapascal (MPa) | Tensile Strength, ((ASTM C297), megapascal (MPa) |
|---|---|---|---|---|---|
| F1A5E | FC1A5 | >25% | 150-325 | 1.5-14 | NR |
| F1B5E | FC1B5 | >25% | 150-325 | 1.5-14 | NR |
| F1C5E | FC1C5 | >25% | 150-325 | 1.5-14 | NR |
| F1D5E | FC1D5 | >25% | 150-325 | 1.5-14 | NR |
| F1E5E | FC1E5 | >25% | 150-325 | 1.5-14 | NR |
| F1A6E | FC1A6 | >25% | 150-325 | 1.5-14 | NR |
| F1B6E | FC1B6 | >25% | 150-325 | 1.5-14 | NR |
| F1C6E | FC1C6 | >25% | 150-325 | 1.5-14 | NR |
| F1D6E | FC1D6 | >25% | 150-325 | 1.5-14 | NR |
| F1E6E | FC1E6 | >25% | 150-325 | 1.5-14 | NR |
| F2A1E | FC2A1 | >25% | 150-325 | 1.5-14 | NR |
| F2B1E | FC2B1 | >25% | 150-325 | 1.5-14 | NR |
| F2C1E | FC2C1 | >25% | 150-325 | 1.5-14 | NR |
| F2D1E | FC2D1 | >25% | 150-325 | 1.5-14 | NR |
| F2E1E | FC2E1 | >25% | 150-325 | 1.5-14 | NR |
| F2A2E | FC2A2 | >25% | 150-325 | 1.5-14 | NR |
| F2B2E | FC2B2 | >25% | 150-325 | 1.5-14 | NR |
| F2C2E | FC2C2 | >25% | 150-325 | 1.5-14 | NR |
| F2D2E | FC2D2 | >25% | 150-325 | 1.5-14 | NR |
| F2E2E | FC2E2 | >25% | 150-325 | 1.5-14 | NR |
| F2A3E | FC2A3 | >25% | 150-325 | 1.5-14 | NR |
| F2B3E | FC2B3 | >25% | 150-325 | 1.5-14 | NR |
| F2C3E | FC2C3 | >25% | 150-325 | 1.5-14 | NR |
| F2D3E | FC2D3 | >25% | 150-325 | 1.5-14 | NR |
| F2E3E | FC2E3 | >25% | 150-325 | 1.5-14 | NR |
| F2A4E | FC2A4 | >25% | 150-325 | 1.5-14 | NR |
| F2B4E | FC2B4 | >25% | 150-325 | 1.5-14 | NR |
| F2C4E | FC2C4 | >25% | 150-325 | 1.5-14 | NR |
| F2D4E | FC2D4 | >25% | 150-325 | 1.5-14 | NR |
| F2E4E | FC2E4 | >25% | 150-325 | 1.5-14 | NR |
| F2A5E | FC2A5 | >25% | 150-325 | 1.5-14 | NR |
| F2B5E | FC2B5 | >25% | 150-325 | 1.5-14 | NR |
| F2C5E | FC2C5 | >25% | 150-325 | 1.5-14 | NR |
| F2D5E | FC2D5 | >25% | 150-325 | 1.5-14 | NR |
| F2E5E | FC2E5 | >25% | 150-325 | 1.5-14 | NR |
| F2A6E | FC2A6 | >25% | 150-325 | 1.5-14 | NR |
| F2B6E | FC2B6 | >25% | 150-325 | 1.5-14 | NR |
| F2C6E | FC2C6 | >25% | 150-325 | 1.5-14 | NR |
| F2D6E | FC2D6 | >25% | 150-325 | 1.5-14 | NR |
| F2E6E | FC2E6 | >25% | 150-325 | 1.5-14 | NR |
| F3A1E | FC3A1 | >25% | 150-325 | 1.5-14 | NR |
| F3B1E | FC3B1 | >25% | 150-325 | 1.5-14 | NR |
| F3C1E | FC3C1 | >25% | 150-325 | 1.5-14 | NR |
| F3D1E | FC3D1 | >25% | 150-325 | 1.5-14 | NR |
| F3E1E | FC3E1 | >25% | 150-325 | 1.5-14 | NR |
| F3A2E | FC3A2 | >25% | 150-325 | 1.5-14 | NR |
| F3B2E | FC3B2 | >25% | 150-325 | 1.5-14 | NR |
| F3C2E | FC3C2 | >25% | 150-325 | 1.5-14 | NR |
| F3D2E | FC3D2 | >25% | 150-325 | 1.5-14 | NR |
| F3E2E | FC3E2 | >25% | 150-325 | 1.5-14 | NR |
| F3A3E | FC3A3 | >25% | 150-325 | 1.5-14 | NR |
| F3B3E | FC3B3 | >25% | 150-325 | 1.5-14 | NR |
| F3C3E | FC3C3 | >25% | 150-325 | 1.5-14 | NR |
| F3D3E | FC3D3 | >25% | 150-325 | 1.5-14 | NR |
| F3E3E | FC3E3 | >25% | 150-325 | 1.5-14 | NR |
| F3A4E | FC3A4 | >25% | 150-325 | 1.5-14 | NR |
| F3B4E | FC3B4 | >25% | 150-325 | 1.5-14 | NR |
| F3C4E | FC3C4 | >25% | 150-325 | 1.5-14 | NR |
| F3D4E | FC3D4 | >25% | 150-325 | 1.5-14 | NR |
| F3E4E | FC3E4 | >25% | 150-325 | 1.5-14 | NR |
| F3A5E | FC3A5 | >25% | 150-325 | 1.5-14 | NR |
| F3B5E | FC3B5 | >25% | 150-325 | 1.5-14 | NR |
| F3C5E | FC3C5 | >25% | 150-325 | 1.5-14 | NR |
| F3D5E | FC3D5 | >25% | 150-325 | 1.5-14 | NR |
| F3E5E | FC3E5 | >25% | 150-325 | 1.5-14 | NR |
| F3A6E | FC3A6 | >25% | 150-325 | 1.5-14 | NR |
| F3B6E | FC3B6 | >25% | 150-325 | 1.5-14 | NR |
| F3C6E | FC3C6 | >25% | 150-325 | 1.5-14 | NR |
| F3D6E | FC3D6 | >25% | 150-325 | 1.5-14 | NR |

TABLE 5-continued

FOAM TABLE

| | | Extruded Foam Properties | | | |
|---|---|---|---|---|---|
| Foam Number | Foamable Compo-sition, No. | % Closed Cell | Density, kg/m$^3$ | Compressive Strength, (ISO 844), megapascal (MPa) | Tensile Strength, ((ASTM C297), megapascal (MPa) |
| F3E6E | FC3E6 | >25% | 150-325 | 1.5-14 | NR |
| F4A1E | FC4A1 | >25% | 150-325 | 1.5-14 | NR |
| F4B1E | FC4B1 | >25% | 150-325 | 1.5-14 | NR |
| F4C1E | FC4C1 | >25% | 150-325 | 1.5-14 | NR |
| F4D1E | FC4D1 | >25% | 150-325 | 1.5-14 | NR |
| F4E1E | FC4E1 | >25% | 150-325 | 1.5-14 | NR |
| F4A2E | FC4A2 | >25% | 150-325 | 1.5-14 | NR |
| F4B2E | FC4B2 | >25% | 150-325 | 1.5-14 | NR |
| F4C2E | FC4C2 | >25% | 150-325 | 1.5-14 | NR |
| F4D2E | FC4D2 | >25% | 150-325 | 1.5-14 | NR |
| F4E2E | FC4E2 | >25% | 150-325 | 1.5-14 | NR |
| F4A3E | FC4A3 | >25% | 150-325 | 1.5-14 | NR |
| F4B3E | FC4B3 | >25% | 150-325 | 1.5-14 | NR |
| F4C3E | FC4C3 | >25% | 150-325 | 1.5-14 | NR |
| F4D3E | FC4D3 | >25% | 150-325 | 1.5-14 | NR |
| F4E3E | FC4E3 | >25% | 150-325 | 1.5-14 | NR |
| F4A4E | FC4A4 | >25% | 150-325 | 1.5-14 | NR |
| F4B4E | FC4B4 | >25% | 150-325 | 1.5-14 | NR |
| F4C4E | FC4C4 | >25% | 150-325 | 1.5-14 | NR |
| F4D4E | FC4D4 | >25% | 150-325 | 1.5-14 | NR |
| F4E4E | FC4E4 | >25% | 150-325 | 1.5-14 | NR |
| F4A5E | FC4A5 | >25% | 150-325 | 1.5-14 | NR |
| F4B5E | FC4B5 | >25% | 150-325 | 1.5-14 | NR |
| F4C5E | FC4C5 | >25% | 150-325 | 1.5-14 | NR |
| F4D5E | FC4D5 | >25% | 150-325 | 1.5-14 | NR |
| F4E5E | FC4E5 | >25% | 150-325 | 1.5-14 | NR |
| F4A6E | FC4A6 | >25% | 150-325 | 1.5-14 | NR |
| F4B6E | FC4B6 | >25% | 150-325 | 1.5-14 | NR |
| F4C6E | FC4C6 | >25% | 150-325 | 1.5-14 | NR |
| F4D6E | FC4D6 | >25% | 150-325 | 1.5-14 | NR |
| F4E6E | FC4E6 | >25% | 150-325 | 1.5-14 | NR |
| F5A1E | FC5A1 | >25% | 150-325 | 1.5-14 | NR |
| F5B1E | FC5B1 | >25% | 150-325 | 1.5-14 | NR |
| F5C1E | FC5C1 | >25% | 150-325 | 1.5-14 | NR |
| F5D1E | FC5D1 | >25% | 150-325 | 1.5-14 | NR |
| F5E1E | FC5E1 | >25% | 150-325 | 1.5-14 | NR |
| F5A2E | FC5A2 | >25% | 150-325 | 1.5-14 | NR |
| F5B2E | FC5B2 | >25% | 150-325 | 1.5-14 | NR |
| F5C2E | FC5C2 | >25% | 150-325 | 1.5-14 | NR |
| F5D2E | FC5D2 | >25% | 150-325 | 1.5-14 | NR |
| F5E2E | FC5E2 | >25% | 150-325 | 1.5-14 | NR |
| F5A3E | FC5A3 | >25% | 150-325 | 1.5-14 | NR |
| F5B3E | FC5B3 | >25% | 150-325 | 1.5-14 | NR |
| F5C3E | FC5C3 | >25% | 150-325 | 1.5-14 | NR |
| F5D3E | FC5D3 | >25% | 150-325 | 1.5-14 | NR |
| F5E3E | FC5E3 | >25% | 150-325 | 1.5-14 | NR |
| F5A4E | FC5A4 | >25% | 150-325 | 1.5-14 | NR |
| F5B4E | FC5B4 | >25% | 150-325 | 1.5-14 | NR |
| F5C4E | FC5C4 | >25% | 150-325 | 1.5-14 | NR |
| F5D4E | FC5D4 | >25% | 150-325 | 1.5-14 | NR |
| F5E4E | FC5E4 | >25% | 150-325 | 1.5-14 | NR |
| F5A5E | FC5A5 | >25% | 150-325 | 1.5-14 | NR |
| F5B5B | FC5E5 | >25% | 150-325 | 1.5-14 | NR |
| F5C5E | FC5C5 | >25% | 150-325 | 1.5-14 | NR |
| F5D5E | FC5D5 | >25% | 150-325 | 1.5-14 | NR |
| F5E5E | FC5E5 | >25% | 150-325 | 1.5-14 | NR |
| F5A6E | FC5A6 | >25% | 150-325 | 1.5-14 | NR |
| F5B6E | FC5B6 | >25% | 150-325 | 1.5-14 | NR |
| F5C6E | FC5C6 | >25% | 150-325 | 1.5-14 | NR |
| F5D6E | FC5D6 | >25% | 150-325 | 1.5-14 | NR |
| F5E6E | FC5E6 | >25% | 150-325 | 1.5-14 | NR |
| F6A1E | FC6A1 | >25% | 150-325 | 1.5-14 | NR |
| F6B1E | FC6B1 | >25% | 150-325 | 1.5-14 | NR |
| F6C1E | FC6C1 | >25% | 150-325 | 1.5-14 | NR |
| F6D1E | FC6D1 | >25% | 150-325 | 1.5-14 | NR |
| F6E1E | FC6E1 | >25% | 150-325 | 1.5-14 | NR |
| F6A2E | FC6A2 | >25% | 150-325 | 1.5-14 | NR |
| F6B2E | FC6E2 | >25% | 150-325 | 1.5-14 | NR |
| F6C2E | FC6C2 | >25% | 150-325 | 1.5-14 | NR |

TABLE 5-continued

FOAM TABLE

| | | Extruded Foam Properties | | | |
|---|---|---|---|---|---|
| Foam Number | Foamable Compo-sition, No. | % Closed Cell | Density, kg/m$^3$ | Compressive Strength, (ISO 844), megapascal (MPa) | Tensile Strength, ((ASTM C297), megapascal (MPa) |
| F6D2E | FC6D2 | >25% | 150-325 | 1.5-14 | NR |
| F6E2E | FC6E2 | >25% | 150-325 | 1.5-14 | NR |
| F6A3E | FC6A3 | >25% | 150-325 | 1.5-14 | NR |
| F6B3E | FC6B3 | >25% | 150-325 | 1.5-14 | NR |
| F6C3E | FC6C3 | >25% | 150-325 | 1.5-14 | NR |
| F6D3E | FC6D3 | >25% | 150-325 | 1.5-14 | NR |
| F6E3E | FC6E3 | >25% | 150-325 | 1.5-14 | NR |
| F6A4E | FC6A4 | >25% | 150-325 | 1.5-14 | NR |
| F6B4E | FC6B4 | >25% | 150-325 | 1.5-14 | NR |
| F6C4E | FC6C4 | >25% | 150-325 | 1.5-14 | NR |
| F6D4E | FC6D4 | >25% | 150-325 | 1.5-14 | NR |
| F6E4E | FC6E4 | >25% | 150-325 | 1.5-14 | NR |
| F6A5E | FC6A5 | >25% | 150-325 | 1.5-14 | NR |
| F6B5E | FC6B5 | >25% | 150-325 | 1.5-14 | NR |
| F6C5E | FC6C5 | >25% | 150-325 | 1.5-14 | NR |
| F6D5E | FC6D5 | >25% | 150-325 | 1.5-14 | NR |
| F6E5E | FC6E5 | >25% | 150-325 | 1.5-14 | NR |
| F6A6E | FC6A6 | >25% | 150-325 | 1.5-14 | NR |
| F6B6E | FC6B6 | >25% | 150-325 | 1.5-14 | NR |
| F6C6E | FC6C6 | >25% | 150-325 | 1.5-14 | NR |
| F6D6E | FC6D6 | >25% | 150-325 | 1.5-14 | NR |
| F6E6E | FC6E6 | >25% | 150-325 | 1.5-14 | NR |
| F7A1E | FC7A1 | >25% | 150-325 | 1.5-14 | NR |
| F7B1E | FC7B1 | >25% | 150-325 | 1.5-14 | NR |
| F7C1E | FC7C1 | >25% | 150-325 | 1.5-14 | NR |
| F7D1E | FC7D1 | >25% | 150-325 | 1.5-14 | NR |
| F7E1E | FC7E1 | >25% | 150-325 | 1.5-14 | NR |
| F7A2E | FC7A2 | >25% | 150-325 | 1.5-14 | NR |
| F7B2E | FC7B2 | >25% | 150-325 | 1.5-14 | NR |
| F7C2E | FC7C2 | >25% | 150-325 | 1.5-14 | NR |
| F7D2E | FC7D2 | >25% | 150-325 | 1.5-14 | NR |
| F7E2E | FC7E2 | >25% | 150-325 | 1.5-14 | NR |
| F7A3E | FC7A3 | >25% | 150-325 | 1.5-14 | NR |
| F7B3E | FC7B3 | >25% | 150-325 | 1.5-14 | NR |
| F7C3E | FC7C3 | >25% | 150-325 | 1.5-14 | NR |
| F7D3E | FC7D3 | >25% | 150-325 | 1.5-14 | NR |
| F7E3E | FC7E3 | >25% | 150-325 | 1.5-14 | NR |
| F7A4E | FC7A4 | >25% | 150-325 | 1.5-14 | NR |
| F7B4E | FC7B4 | >25% | 150-325 | 1.5-14 | NR |
| F7C4E | FC7C4 | >25% | 150-325 | 1.5-14 | NR |
| F7D4E | FC7D4 | >25% | 150-325 | 1.5-14 | NR |
| F7E4E | FC7E4 | >25% | 150-325 | 1.5-14 | NR |
| F7A5E | FC7A5 | >25% | 150-325 | 1.5-14 | NR |
| F7B5E | FC7B5 | >25% | 150-325 | 1.5-14 | NR |
| F7C5E | FC7C5 | >25% | 150-325 | 1.5-14 | NR |
| F7D5E | FC7D5 | >25% | 150-325 | 1.5-14 | NR |
| F7E5E | FC7E5 | >25% | 150-325 | 1.5-14 | NR |
| F7A6E | FC7A6 | >25% | 150-325 | 1.5-14 | NR |
| F7B6E | FC7B6 | >25% | 150-325 | 1.5-14 | NR |
| F7C6E | FC7C6 | >25% | 150-325 | 1.5-14 | NR |
| F7D6E | FC7D6 | >25% | 150-325 | 1.5-14 | NR |
| F7E6E | FC7E6 | >25% | 150-325 | 1.5-14 | NR |
| F8A1E | FC8A1 | >25% | 150-325 | 1.5-14 | NR |
| F8B1E | FC8B1 | >25% | 150-325 | 1.5-14 | NR |
| F8C1E | FC8C1 | >25% | 150-325 | 1.5-14 | NR |
| F8D1E | FC8D1 | >25% | 150-325 | 1.5-14 | NR |
| F8E1E | FC8E1 | >25% | 150-325 | 1.5-14 | NR |
| F8A2E | FC8A2 | >25% | 150-325 | 1.5-14 | NR |
| F8B2E | FC8B2 | >25% | 150-325 | 1.5-14 | NR |
| F8C2E | FC8C2 | >25% | 150-325 | 1.5-14 | NR |
| F8D2E | FC8D2 | >25% | 150-325 | 1.5-14 | NR |
| F8E2E | FC8E2 | >25% | 150-325 | 1.5-14 | NR |
| F8A3E | FC8A3 | >25% | 150-325 | 1.5-14 | NR |
| F8B3E | FC8B3 | >25% | 150-325 | 1.5-14 | NR |
| F8C3E | FC8C3 | >25% | 150-325 | 1.5-14 | NR |
| F8D3E | FC8D3 | >25% | 150-325 | 1.5-14 | NR |
| F8E3E | FC8E3 | >25% | 150-325 | 1.5-14 | NR |
| F8A4E | FC8A4 | >25% | 150-325 | 1.5-14 | NR |
| F8B4E | FC8B4 | >25% | 150-325 | 1.5-14 | NR |

TABLE 5-continued

FOAM TABLE

| Foam Number | Foamable Compo-sition, No. | Extruded Foam Properties % Closed Cell | Density, kg/m$^3$ | Compressive Strength, (ISO 844), megapascal (MPa) | Tensile Strength, ((ASTM C297), megapascal (MPa) |
|---|---|---|---|---|---|
| F8C4E | FC8C4 | >25% | 150-325 | 1.5-14 | NR |
| F8D4E | FC8D4 | >25% | 150-325 | 1.5-14 | NR |
| F8E4E | FC8E4 | >25% | 150-325 | 1.5-14 | NR |
| F8A5E | FC8A5 | >25% | 150-325 | 1.5-14 | NR |
| F8B5E | FC8B5 | >25% | 150-325 | 1.5-14 | NR |
| F8C5E | FC8C5 | >25% | 150-325 | 1.5-14 | NR |
| F8D5E | FC8D5 | >25% | 150-325 | 1.5-14 | NR |
| F8E5E | FC8E5 | >25% | 150-325 | 1.5-14 | NR |
| F8A6E | FC8A6 | >25% | 150-325 | 1.5-14 | NR |
| F8B6E | FC8B6 | >25% | 150-325 | 1.5-14 | NR |
| F8C6E | FC8C6 | >25% | 150-325 | 1.5-14 | NR |
| F8D6E | FC8D6 | >25% | 150-325 | 1.5-14 | NR |
| F8E6E | FC8E6 | >25% | 150-325 | 1.5-14 | NR |

The extruded foams of the present invention have wide utility. The present foams, including each of Extruded Foams 1-4 and extruded foams F1-F8, have unexpected advantage in applications requiring relatively low density and/or good compression and/or tensile and/or shear properties, and/or long-term stability, and/or sustainable sourcing, and/or being made from recycled material and being recyclable. In particular, the present extruded foams, including each of Extruded Foams 1-6 and each of extruded foams F1-F8, have unexpected advantage in: wind energy applications (wind turbine blades (shear webs, shells, cores, and root); marine applications (hulls, decks, superstructures, bulkheads, stringers, and interiors); industrial low weight applications; automotive and transport applications (interior and exterior of cars, trucks, trains, aircraft, and spacecraft).

The extruded foams of the present invention, including each of Extruded Foam 1-4, are formed from either PEF homopolymers, PEF copolymers, PEF:PET copolymers or a combination/mixture of these.

The foams, including each of Extruded Foam 1-4, may be formed in preferred embodiments from PEF homopolymer in which the polymer has at least 99.5% by weight, or at least 99.9% of by weight, of ethylene furanoate moieties.

It is contemplated that the foams of the present invention, including each of Extruded Foams 1-3, may be formed in preferred embodiments from PEF copolymer in which the polymer, including PEF copolymer that has from about 0.5% to about 99% by weight of ethylene furanoate moieties. The invention includes extruded foams, including each of Extruded Foam 1-3, wherein the thermoplastic polymer consists essentially of the components as described in the following table:

| Thermoplastic Polymer (TMP) | RELATIVE MOLE % Ethylene furanoate moieties | Ethylene terephthalate moieties | MOLECULAR WEIGHT, g/mol |
|---|---|---|---|
| TMP1A | 100 | 0 | 25,000-140,000 |
| TMP1B | 100 | 0 | 50,000-130,000 |
| TMP1C | 100 | 0 | 60,000-130,000 |
| TMP1D | 100 | 0 | 70,000-130,000 |
| TMP1E | 100 | 0 | 80,000-130,000 |

-continued

| Thermoplastic Polymer (TMP) | RELATIVE MOLE % Ethylene furanoate moieties | Ethylene terephthalate moieties | MOLECULAR WEIGHT, g/mol |
|---|---|---|---|
| TMP1F | 100 | 0 | 85,000-110,000 |
| TMP2A | 90 | 10 | 25,000-140,000 |
| TMP2B | 90 | 10 | 50,000-130,000 |
| TMP2C | 90 | 10 | 60,000-130,000 |
| TMP2D | 90 | 10 | 70,000-130,000 |
| TMP2E | 80 | 20 | 80,000-130,000 |
| TMP2F | 90 | 20 | 85,000-110,000 |
| TMP3A | 80 | 20 | 25,000-140,000 |
| TMP3B | 80 | 20 | 50,000-130,000 |
| TMP3C | 80 | 20 | 60,000-130,000 |
| TMP3D | 80 | 20 | 70,000-130,000 |
| TMP3E | 80 | 20 | 80,000-130,000 |
| TMP3F | 80 | 20 | 85,000-110,000 |
| TMP4A | 70 | 30 | 25,000-140,000 |
| TMP4B | 70 | 30 | 50,000-130,000 |
| TMP4C | 70 | 30 | 60,000-130,000 |
| TMP4D | 70 | 30 | 70,000-130,000 |
| TMP4E | 70 | 30 | 80,000-130,000 |
| TMP4F | 70 | 30 | 85,000-110,000 |
| TMP5A | 60 | 40 | 25,000-140,000 |
| TMP5B | 60 | 40 | 50,000-130,000 |
| TMP5C | 60 | 40 | 60,000-130,000 |
| TMP5D | 60 | 40 | 70,000-130,000 |
| TMP5E | 60 | 40 | 80,000-130,000 |
| TMP5F | 60 | 40 | 85,000-110,000 |
| TMP6A | 50 | 50 | 25,000-140,000 |
| TMP6B | 50 | 50 | 50,000-130,000 |
| TMP6C | 50 | 50 | 60,000-130,000 |
| TMP6D | 50 | 50 | 70,000-130,000 |
| TMP6E | 50 | 50 | 80,000-130,000 |
| TMP6F | 50 | 50 | 85,000-110,000 |
| TMP7A | 40 | 60 | 25,000-140,000 |
| TMP7B | 40 | 60 | 50,000-130,000 |
| TMP7C | 40 | 60 | 60,000-130,000 |
| TMP7D | 40 | 60 | 70,000-130,000 |
| TMP7E | 40 | 60 | 80,000-130,000 |
| TMP7F | 40 | 60 | 85,000-110,000 |
| TMP8A | 30 | 70 | 25,000-140,000 |
| TMP8B | 30 | 70 | 50,000-130,000 |
| TMP8C | 30 | 70 | 60,000-130,000 |
| TMP8D | 30 | 70 | 70,000-130,000 |
| TMP8E | 30 | 70 | 80,000-130,000 |
| TMP8F | 30 | 70 | 85,000-110,000 |
| TMP9A | 20 | 80 | 25,000-140,000 |
| TMP9B | 20 | 80 | 50,000-130,000 |
| TMP9C | 20 | 80 | 60,000-130,000 |
| TMP9D | 20 | 80 | 70,000-130,000 |
| TMP9E | 20 | 80 | 80,000-130,000 |
| TMP9F | 20 | 80 | 85,000-110,000 |
| TMP10A | 10 | 90 | 25,000-140,000 |
| TMP10B | 10 | 90 | 50,000-130,000 |
| TMP10C | 10 | 90 | 60,000-130,000 |
| TMP10D | 10 | 90 | 70,000-130,000 |
| TMP10E | 10 | 90 | 80,000-130,000 |
| TMP10F | 10 | 90 | 85,000-110,000 |
| TMP11A | 5 | 95 | 25,000-140,000 |
| TMP11B | 5 | 95 | 50,000-130,000 |
| TMP11C | 5 | 95 | 60,000-130,000 |
| TMP11D | 5 | 95 | 70,000-130,000 |
| TMP11E | 5 | 95 | 80,000-130,000 |
| TMP11F | 5 | 95 | 85,000-110,000 |
| TMP12A | 2.5 | 97.5 | 25,000-140,000 |
| TMP12B | 2.5 | 97.5 | 50,000-130,000 |
| TMP12C | 2.5 | 97.5 | 60,000-130,000 |
| TMP12D | 2.5 | 97.5 | 70,000-130,000 |
| TMP12E | 2.5 | 97.5 | 80,000-130,000 |
| TMP12F | 2.5 | 97.5 | 85,000-110,000 |
| TMP13A | 1 | 99 | 25,000-140,000 |
| TMP13B | 1 | 99 | 50,000-130,000 |
| TMP13C | 1 | 99 | 60,000-130,000 |
| TMP13D | 1 | 99 | 70,000-130,000 |
| TMP13E | 1 | 99 | 80,000-130,000 |
| TMP13F | 1 | 99 | 85,000-110,000 |

-continued

| Thermoplastic Polymer (TMP) | RELATIVE MOLE % Ethylene furanoate moieties | Ethylene terephthalate moieties | MOLECULAR WEIGHT, g/mol |
|---|---|---|---|
| TMP14A | 0.5 | 99.5 | 25,000-140,000 |
| TMP14B | 0.5 | 99.5 | 50,000-130,000 |
| TMP14C | 0.5 | 99.5 | 60,000-130,000 |
| TMP14D | 0.5 | 99.5 | 70,000-130,000 |
| TMP14E | 0.5 | 99.5 | 80,000-130,000 |
| TMP14F | 0.5 | 99.5 | 85,000-110,000 |

The extruded foams of the present invention, including each of Extruded Foams 1-4, can comprise closed cell walls comprising each of the thermoplastic polymers of the present invention, including each of TMP1-TMP12 describe in the table above.

For those embodiments of the present invention involving PEF copolymers, it is contemplated that those skilled in the art will be able, in view of the teachings contained herein, to select the type in an amount of co-polymeric materials to be used within each of the ranges described herein to achieve the desired enhancement/modification of the polymer without undue experimentation.

It is contemplated that the TMPs of the present invention may be formed with a variety of physical properties, including the following ranges of polymer characteristics, which are measured as described in the Examples hereof:

| Polymer property | Broad Range | Intermediate Range | Narrow Range |
|---|---|---|---|
| Glass Transition Temperature, $T_g$, ° C. | 80-100 | 85-95 | 90-95 |
| Melting Temperature, $T_m$, ° C. | 190-250 | 200-240 | 210-230 |
| Decomposition Temperature, $T_d$, ° C. | 300-420 | 320-400 | 330-370 |
| Crystallinity, % | 25-75 | 30-60 | 40-50 |

In general, it is contemplated that those skilled in the art will be able to formulate PEF polymers within the range of properties described above without undue experimentation in view of the teachings contained herein. In preferred embodiments, however, PEF polymer according to the present invention (including PEF:PET copolymers of the present invention), having these properties is achieved using one or more of the synthesis methods described above, in combination with a variety of known supplemental processing techniques, including by treatment with chain extenders, such as PMDA, and/or SSP processing.

An example of the process for chain extension treatment of polyesters is provided in the article "Recycled poly (ethylene terephthalate) chain extension by a reactive extrusion process," Firas Awaja, Fugen Daver, Edward Kosior, 16 Aug. 2004, available at https://doi.org/10.1002/pen.20155, which is incorporated herein by reference. As explained in US 1009/0264545, which is incorporated herein by reference, chain extenders generally are typically compounds that are at least di-functional with respect to reactive groups which can react with end groups or functional groups in the polyester to extend the length of the polymer chains. In certain cases, as disclosed herein, such a treatment can advantageously increase the average molecular weight of the polyester to improve its melt strength and/or other important properties. The degree of chain extension achieved is related, at least in part, to the structure and functionalities of the compounds used. Various compounds are useful as chain extenders. Non-limiting examples of chain extenders include trimellitic anhydride, pyromellitic dianhydride (PMDA), trimellitic acid, haloformyl derivatives thereof, or compounds containing multi-functional epoxy (e.g., glycidyl), or oxazoline functional groups. Nanocomposite material such as finely dispersed nanoclay may optionally be used for controlling viscosity. Commercial chain extenders include CESA-Extend from Clariant, Joncryl from BASF, or Lotader from Arkema. The amount of chain extender can vary depending on the type and molecular weight of the polyester components. The amount of chain extender used to treat the polymer can vary widely, and in preferred embodiments ranges from about 0.1 to about 5 wt. %, or preferably from about 0.1 to about 1.5 wt. %. Examples of chain extenders are also described in U.S. Pat. No. 4,219,527, which is incorporated herein by reference.

An example of the process for SSP processing of poly (ethylene furanoate) is provided in the article "Solid-State Polymerization of Poly(ethylene furanoate) Biobased Polyester, I: Effect of Catalyst Type on Molecular Weight Increase," Nejib Kasmi, Mustapha Majdoub, George Z. Papageorgiou, Dimitris S. Achilias, and Dimitrios N. Bikiaris, which is incorporated herein by reference.

Blowing Agent

As explained in detail herein, the present invention involves applicant's discovery that a select group of blowing agents are capable of providing foamable PEF compositions, including each of Foamable Composition 1, and PEF foams, including Extruded Foams 1-4, having a difficult to achieve a surprising combination of physical properties, including low density as well as good mechanical strengths properties.

Foams and Foaming Process

The foams of the present invention are thermoplastic foams, and generally it is contemplated that any one or more of a variety of known extrusion techniques for forming a thermoplastic foam can be used in view of the disclosures contained herein, and all such techniques and all foams formed thereby or within the broad scope of the present invention.

The extruded foams of the present invention, including each of Extruded Foams 1-4, in preferred embodiments is made in a commercial extruder, and even more preferably a commercial extruder having a throughput of from about 2000 to about 6000 pounds per hour.

Foam Articles

The foams and foam articles of the present invention have wide utility. The present foam articles, including each of Foam Articles 1-3, including foam articles made with Extruded Foams 1-4 in a commercial extruder, have unexpected advantage, especially in applications requiring low density and/or good compression and/or tensile and/or shear properties, and/or long-term stability, and/or sustainable sourcing, and/or being made from recycled material and being recyclable. In particular, the present foam articles, including each of Foam Articles 1-3, including foam articles made with Extruded Foams 1-4 in a commercial extruder, have unexpected advantage in: wind energy applications (wind turbine blades (shear webs, shells, cores, and nacelles); marine applications (hulls, decks, superstructures, bulkheads, stringers, and interiors); industrial low weight applications; automotive and transport applications (interior and exterior of cars, trucks, trains, aircraft, and spacecraft); stationary building structure; and sporting equipment.

As described above, the foam articles of the present invention, including each of Foam Articles 1-3, generally comprise a foam which has a facing on at least a portion of the surface thereof. As used herein, reference to a numbered foam article or group of numbered foam articles that have been defined herein means each of such numbered foam articles, including each foam article having a number within the group, including any suffixed number. For example, reference to Foam Article 3 includes reference to each of Foam Articles 3A, 3B, 3C and 3D.

The size and shape of the extruded foam used in the present foam articles can vary widely within the scope of the present invention depending on the use that will be made of the article, and all such sizes and shapes are within the scope of the present invention. In many applications, the foam article will be in the form of a three dimensional form in which the length and/or width are much larger in dimension than the thickness. In other applications, the form of the article can be characterized as a block, slab, panel or the like, or as a particular shape such as I-beam, U-shaped or other specific shape.

For convenience of illustration but not by way of limitation, FIG. 4 illustrates a form in which the foam article is in the general shape of a sheet or panel that has a facing on each side of the sheet or panel. In the illustrated embodiment, a foam article according to the present invention comprises a core 1 of PEF foam of the present invention, including each of TMP 1-12 as defined below, and at least one reinforcing facing 2 and at least one connecting and/or integrating layer 3. It will be understood by those skilled in the art in view of the teachings contained herein that the connecting/integrating layer may comprise a layer of adhesive, for example, or may be formed by integrating the core material and the facing material without the use of a separate adhesive, such as would occur, for example, by melting the surfaces of the two materials together to form a connecting/integrating region. The facing can be any material appropriate to the intended use, as mentioned above, but in many applications the facing 2 is a sheet or film of fibrous material as described above. The fibers of a preferred facing 2 may be, for example, in the form of a woven or nonwoven mat (or a mat comprising a combination of woven and non-woven fibers), including crimped mats that can be either woven or non-woven, and the fibers can be oriented or non-oriented (i.e., random). In embodiments in which the fibers of the facing are oriented, the orientation can include unidirectional, bi-directional, bi-axial, tri-axial, quad-axial and combinations of any of these.

The connecting/integrating film, layer or region 3 can be any material and in any thickness needed to attach or integrate the facing 3 to the core 1. Furthermore, while the film or layer 3 is shown as generally as being between the facing 2 and the core 1, it will be understood and appreciated by those skilled in the art that the connecting layer or film generally extends into each of the foam core 1 and the facing 2. In certain preferred embodiments, the film or layer 3 can comprise adhesive material, such as an epoxy adhesive, which bonds the core 1 and the facing sheet 2 together. Other adhesive resins which may be used to bond the facing to the foam include polyurethane, vinyl ester, polyester, cyanate esters, urethane-acrylates, bismaleimides, polyimides, silicones, phenolics, polypropenes, caprolactams and combinations of any two or more of these. In general, the processing of forming the foam articles of the present invention involves steps which provide a strong chemical and/or physical bond between facing 2 and the foam 1, and all such steps are within the scope of the present invention.

In preferred embodiments, the facing 2 comprises a plurality of inter-bonded sheets or mats which can be the same or different and are bound to one another by appropriate means, including inter-bonding layers of adhesive or resin or inter-bonding regions formed by material integration (e.g., melting together to form an integrated region). In such embodiments, it is contemplated that the number of inter-bonded sheets that make-up the facing 2 can vary widely, and in preferred embodiments the facing comprises from 2 to 10 inter-bonded sheets, and even more preferably from about 3 to about 5 inter-bonded sheets.

While it is understood that the dimensions of the present foam articles, including each of Foam Articles 1-3, can vary widely, in preferred embodiments involving the use in connections with wind turbine applications, the face sheet can vary from about 0.1 mm to about 3 mm, or from about 0.4 mm to about 1.5 mm. Furthermore, it is generally understood that the relative thickness of the foam compared to the face sheet can vary over a wide range depending on the particular application, and that those skilled in the art will be able to make appropriate selections in view of the teachings contained herein, and that in general the face sheet thickness will be less than the thickness of the foam.

Preferred materials which are used to form the foam articles of the present invention, including each of Foam Articles 1-3, are described in additional detail below.

Facings

The foam articles of the present invention include a facing that can have a wide variety of dimensions, and the dimensions used will depending upon the particular needs of the application in which the foam article will be used, and articles having all such dimensions are within the scope of the present invention.

The materials which form the facing material may also vary widely depending on the particular use intended for the foam article, and again all such materials are within the scope of present invention. For example, the facing used in the present foam articles, including each of Foam Articles 1-3, comprises one or more fibrous sheets or mats wherein the fibrous portion can be formed from a wide variety of materials, including for example, glass fibers (preferably impregnated with resin and/or polymers), other natural fibers (such as cellulose and other plant derived materials), mineral fibers (such as quartz), metal fibers or films, carbon fibers (preferably impregnated with or reinforced with one or more polymers, including thermoplastic polymer and/or thermoset polymers), synthetic fibers, such as polyesters (including fibers comprising furan-based polyesters, as disclosed for example in US 2015/0111450, which is incorporated herein by reference), polyethylenes, aramids, Kevlars, and any and all combinations of these.

Particular Uses

The foam articles of the present invention have wide utility. The present foam articles, including each of Foam Articles 1-3, have unexpected advantage in applications requiring low density and/or good compression and/or tensile and/or shear properties, and/or long-term stability, and/or sustainable sourcing, and/or being made from recycled material and being recyclable. In particular, the present foam articles, including each of Foam Articles 1-3, have unexpected advantage in: fluid energy transfer components, such as for example in wind and water energy transfer applications (e.g., wind turbine blades (shear webs, shells, cores, and nacelles) for transferring wind energy from fixed or mobile devices located in air, and vortex, tidal, oceans current oscillating hydrofoils and kites which recover water kinetic energy from fixed or mobile devices located in water); marine applications (hulls, decks, superstructures, bulkheads, stringers, and interiors); industrial low weight applications; automotive and transport applications (interior and exterior of cars, trucks, trains, aircraft, and spacecraft); and packaging applications.

With particular reference to FIGS. 2 and 3A, 3B and 3C, the foam articles of the present invention, including each of Foam Articles 1-3, may be used in a rotor blade 10 at any and all locations along the length of the blade from the blade root 30 to the blade tip 32 disposed opposite the blade root 30, and at any location along the body shell, including on the pressure side 34, on the suction side 36 and at all locations extending between leading edge 26 to the trailing edge 28 of the rotor blade 10. Further, the foam articles of the present invention, including each of Foam Articles 1-3, may be used for all or part of a longitudinally extending structural components configured to provide increased stiffness, buckling resistance and/or strength to the rotor blade 10, such as, longitudinally extending spar caps 20, 22 configured to be engaged against the opposing inner surfaces 35, 37 of the pressure and suction sides 34, 36 of the rotor blade 10, as well as for one or more shear webs 24 disposed between the spar caps 20, 22 so as to form a beam-like configuration. The spar caps 20, 22 may generally be designed to resist the bending stresses and minimize blade tip deflection and/or other loads acting on the rotor blade 10 in a generally span-wise direction (a direction parallel to the span 23 of the rotor blade 16) during operation of a wind turbine 10; it is understood, however, that in other applications the spar cap may also be oriented at any angle transverse to the span-wise axis, including at an angle of about 90 degrees to the span-wise axis. Similarly, the spar caps 20, 22 may also be designed to resist the span-wise compression or tension occurring during operation of the wind turbine 6. Because of the unexpected combination of light weight and high strength of the present extruded foams and the present foam articles, including each of Foam Articles 1-3, the root portions of the blade, as well as the spars and caps used in rotor blades, may utilize to advantage such foams and foam articles.

The following Extruded Foam Use Table includes an identification of some of the preferred uses for some of the preferred articles of the present invention, wherein the column heading "Foam Article Number" refers to the Foam Article as identified above and the column heading Particular Extruded Foam refers to the Extruded Foam identified above.

| Foam Article Number | Particular Foam | Use |
|---|---|---|
| 1 | NR | Energy Transfer Device |
| 1 | NR | Wind Turbine Blade |
| 1 | NR | Transportation Device |
| 1 | NR | Automobile |
| 1 | NR | Truck |
| 1 | NR | Rail car |
| 1 | NR | Aircraft |
| 1 | NR | Building Structure |
| 1 | NR | Floor Component |
| 1 | NR | Wall Component |
| 1 | NR | Roof Component |
| 1 | NR | Packaging |
| 1 | NR | Sporting Good |
| 2 | NR | Energy Transfer Device |

-continued

| Foam Article Number | Particular Foam | Use |
|---|---|---|
| 2 | NR | Wind Turbine Blade |
| 2 | NR | Transportation Device |
| 2 | NR | Automobile |
| 2 | NR | Truck |
| 2 | NR | Rail car |
| 2 | NR | Aircraft |
| 2 | NR | Building Structure |
| 2 | NR | Floor Component |
| 2 | NR | Wall Component |
| 2 | NR | Roof Component |
| 2 | NR | Packaging |
| 2 | NR | Sporting Good |
| 3 | NR | Energy Transfer Device |
| 3 | NR | Wind Turbine Blade |
| 3 | NR | Transportation Device |
| 3 | NR | Automobile |
| 3 | NR | Truck |
| 3 | NR | Rail car |
| 3 | NR | Aircraft |
| 3 | NR | Building Structure |
| 3 | NR | Floor Component |
| 3 | NR | Wall Component |
| 3 | NR | Roof Component |
| 3 | NR | Packaging |
| 3 | NR | Sporting Good |
| 1A | 1 | Energy Transfer Device |
| 1A | 1 | Wind Turbine Blade |
| 1A | 1 | Transportation Device |
| 1A | 1 | Automobile |
| 1A | 1 | Truck |
| 1A | 1 | Rail car |
| 1A | 1 | Aircraft |
| 1A | 1 | Building Structure |
| 1A | 1 | Floor Component |
| 1A | 1 | Wall Component |
| 1A | 1 | Roof Component |
| 1A | 1 | Packaging |
| 1A | 1 | Sporting Good |
| 2A | 2 | Energy Transfer Device |
| 2A | 2 | Wind Turbine Blade |
| 2A | 2 | Transportation Device |
| 2A | 2 | Automobile |
| 2A | 2 | Truck |
| 2A | 2 | Rail car |
| 2A | 2 | Aircraft |
| 2A | 2 | Building Structure |
| 2A | 2 | Floor Component |
| 2A | 2 | Wall Component |
| 2A | 2 | Roof Component |
| 2A | 2 | Packaging |
| 2A | 2 | Sporting Good |
| 3A | 3 | Energy Transfer Device |
| 3A | 3 | Wind Turbine Blade |
| 3A | 3 | Transportation Device |
| 3A | 3 | Automobile |
| 3A | 3 | Truck |
| 3A | 3 | Rail car |
| 3A | 3 | Aircraft |
| 3A | 3 | Building Structure |
| 3A | 3 | Floor Component |
| 3A | 3 | Wall Component |
| 3A | 3 | Roof Component |
| 3A | 3 | Packaging |
| 3A | 3 | Sporting Good |
| 4A | 4 | Energy Transfer Device |
| 4 | 4 | Wind Turbine Blade |
| 4 | 4 | Transportation Device |
| 4 | 4 | Automobile |
| 4 | 4 | Truck |
| 4 | 4 | Rail car |
| 4 | 4 | Aircraft |
| 4 | 4 | Building Structure |
| 4 | 4 | Floor Component |
| 4 | 4 | Wall Component |
| 4 | 4 | Roof Component |

-continued

| Foam Article Number | Particular Foam | Use |
|---|---|---|
| 4 | 4 | Packaging |
| 4 | 4 | Sporting Good |
| 1B | F1-F11 | Wind Turbine Blade |
| 1B | F1-F11 | Transportation Device |
| 1B | F1-F11 | Automobile |
| 1B | F1-F11 | Truck |
| 1B | F1-F11 | Rail car |
| 1B | F1-F11 | Aircraft |
| 1B | F1-F11 | Building Structure |
| 1B | F1-F11 | Floor Component |
| 1B | F1-F11 | Wall Component |
| 1B | F1-F11 | Roof Component |
| 1B | F1-F11 | Packaging |
| 1B | F1-F11 | Sporting Good |
| 1B | F1-F11 | Energy Transfer Device |
| 2B | F1-F11 | Wind Turbine Blade |
| 2B | F1-F11 | Transportation Device |
| 2B | F1-F11 | Automobile |
| 2B | F1-F11 | Truck |
| 2B | F1-F11 | Rail car |
| 2B | F1-F11 | Aircraft |
| 2B | F1-F11 | Building Structure |
| 2B | F1-F11 | Floor Component |
| 2B | F1-F11 | Wall Component |
| 2B | F1-F11 | Roof Component |
| 2B | F1-F11 | Packaging |
| 2B | F1-F11 | Sporting Good |
| 3B | F1-F11 | Energy Transfer Device |
| 3B | F1-F11 | Wind Turbine Blade |
| 3B | F1-F11 | Transportation Device |
| 3B | F1-F11 | Automobile |
| 3B | F1-F11 | Truck |
| 3B | F1-F11 | Rail car |
| 3B | F1-F11 | Aircraft |
| 3B | F1-F11 | Building Structure |
| 3B | F1-F11 | Floor Component |
| 3B | F1-F11 | Wall Component |
| 3B | F1-F11 | Roof Component |
| 3B | F1-F11 | Packaging |
| 3B | F1-F11 | Sporting Good |
| 4B | F1-F11 | Energy Transfer Device |
| 4B | F1-F11 | Wind Turbine Blade |
| 4B | F1-F11 | Transportation Device |
| 4B | F1-F11 | Automobile |
| 4B | F1-F11 | Truck |
| 4B | F1-F11 | Rail car |
| 4B | F1-F11 | Aircraft |
| 4B | F1-F11 | Building Structure |
| 4B | F1-F11 | Floor Component |
| 4B | F1-F11 | Wall Component |
| 4B | F1-F11 | Roof Component |
| 4B | F1-F11 | Packaging |
| 4B | F1-F11 | Sporting Good |

EXAMPLES

Extrusion Examples

Extrusion Example 1

Figure 9:
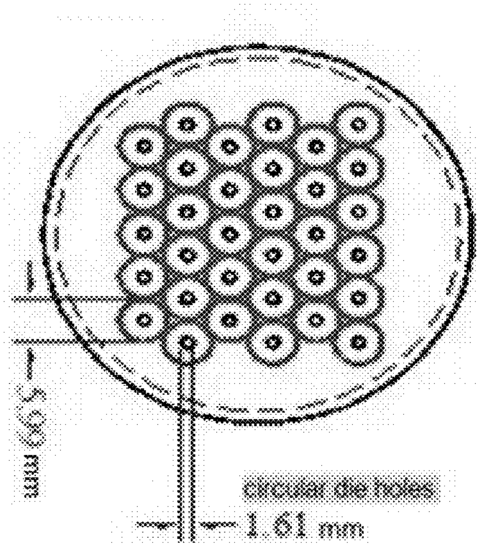
FIG. 9 is a view of the die plate referenced in Extrusion Example 1 hereof.

Without limiting the full scope of the present invention, Applicants have conducted a series of experiments using a twin screw extruder with a screw diameter of 17.8 mm and a screw length to diameter ration of 40:1. The die plate had a design and dimension generally as indicated in FIG. 9.

Although circular die holes were used, other hole shapes (such as hexagonal) may also be used. The extruder had 13 barrel sections and was operated with processing conditions in the following ranges:

Avg. Temp. First ¾ barrel sections: 210 C-250 C
Avg. Melt Temp at die plate (PEF): 220 C-250 C
Avg. Melt Temp at die plate (PTE): 240 C-260 C
Pressure at die plate: 500-1000 psig
Extruder RPM: 50-1000
Throughput: 3-4 pounds per hour
Blowing Agent Flow Rate: 1-2 ml liquid 1234ze(E) per minute These tests demonstrate the ability to make extruded PEF foams of the present invention and to demonstrate at least some of the unexpected results associated with the present invention in by comparison to foams made from PET. One difference between the foams made and tested in the present examples and extruded commercial foam is that that commercial foams are generally formed by seaming sections of extruded foam together, and the presence of these seams tends to strengthen the foam overall. In the present examples, seamed foams are not formed and the strength of the foams produced in these examples would thus have higher values than reported herein when seamed foams are formed. As a result of this and potentially other factors, the strength results reported in these examples will generally be lower than the results that a person skilled in the art would expect when the foaming process is carried out on a commercial extruder. Nevertheless, the strength results reported for the present extruded foams are unexpectedly higher than would be expected by a person skilled in the art, as illustrated by the examples which follow.

These tests utilized herein involved the use of foams made from commercially available PEF and PET polymers. The commercial PET polymer had a molecular weight of 43,000 and a crystallinity of 41%. The PEF polymer had a molecular weight of 32,000 (crystallinity unknown). As illustrated in the data reported below, the PEF foams of the present invention were unexpectedly superior to the PET polymer despite factors that would lead a person skilled in the art to expect that the PEF foam would be less strong.

The series of PEF foams and reference PET foams were prepared using the highly preferred 1234ze(E) of the present invention as the blowing agent and by adding 0.64 weight percent of PMDA to the extruder during extrusion. The foams included foams having densities of from about 130 kg/m3 to less than about 400 kg/$m^3$.

For each polymer, a unique and narrow range of extrusion conditions were identified for the foaming experiments. The conditions used were determined to obtain the best result for each polymer.

The foams thus produced throughout the Examples in this application, were tested to determine the density of foam using a method which corresponds generally to ASTM D71, except that hexane is used for displacement instead of water. The compressive strength measurements were based on the guidelines provided in ASTM C297 and ISO 844, respectively, with the measurement in each case in the direction of extrusion.

TABLE FFeX-130-380 kg/$m^3$ Foams

| Example Designation | Polymer | FOAM PROPERTIES Density, Kg/$m^3$ | CS, MPa |
|---|---|---|---|
| FFEx_PETC1 | PET | 135 | 1.5 |
| FFEx_PETC2 | PET | 135 | 1.6 |
| FFEx_PETC3 | PET | 140 | 1.6 |
| FFEx_PETC4 | PET | 145 | 1.9 |
| FFEx_PETC5 | PET | 149 | 1.8 |
| FFEx_PETC6 | PET | 152 | 1.6 |

-continued

| TABLE FFeX-130-380 kg/m³ Foams | | | |
|---|---|---|---|
| | | FOAM PROPERTIES | |
| Example Designation | Polymer | Density, Kg/m³ | CS, MPa |
| FFEx_PETC7 | PET | 152 | 1.8 |
| FFEx_PETC8 | PET | 153 | 1.7 |
| FFEx_PETC9 | PET | 160 | 1.7 |
| FFEx_PETC10 | PET | 165 | 2 |
| FFEx_PETC11 | PET | 166 | 1.6 |
| FFEx_PETC12 | PET | 173 | 2.4 |
| FFEx_PETC13 | PET | 175 | 2 |
| FFEx_PETC14 | PET | 178 | 1.8 |
| FFEx_PETC15 | PET | 197 | 1.8 |
| FFEx_PETC16 | PET | 210 | 2.3 |
| FFEx_PETC17 | PET | 222 | 4.3 |
| FFEx_PETC18 | PET | 226 | 3 |
| FFEx_PETC19 | PET | 227 | 5.9 |
| FFEx_PETC20 | PET | 228 | 3.7 |
| FFEx_PETC12 | PET | 235 | 2.9 |
| FFEx_PETC22 | PET | 235 | 3.1 |
| FFEx_PETC23 | PET | 252 | 3.9 |
| FFEx_PETC24 | PET | 255 | 4.7 |
| FFEx_PETC25 | PET | 270 | 3.9 |
| FFEx_PETC26 | PET | 272 | 3.7 |
| FFEx_PETC27 | PET | 275 | 3.9 |
| FFEx_PETC28 | PET | 275 | 5.7 |
| FFEx_PETC29 | PET | 280 | 4.8 |
| FFEx_PETC30 | PET | 285 | 5.7 |
| FFEx_PETC31 | PET | 288 | 5.1 |
| FFEx_PETC32 | PET | 291 | 7 |
| FFEx_PETC33 | PET | 302 | 3.5 |
| FFEx_PETC34 | PET | 380 | 6.1 |
| FFEx_PEF1 | PEF | 135 | 1.8 |
| FFEx_PEF2 | PEF | 143 | 1.7 |
| FFEx_PEF3 | PEF | 170 | 2.5 |
| FFEx_PEF4 | PEF | 172 | 2 |
| FFEx_PEF5 | PEF | 173 | 2.4 |
| FFEx_PEF6 | PEF | 190 | 3.5 |
| FFEx_PEF7 | PEF | 220 | 4.1 |
| FFEx_PEF8 | PEF | 225 | 5.1 |
| FFEx_PEF9 | PEF | 227 | 5 |
| FFEx_PEF10 | PEF | 235 | 7 |
| FFEx_PEF11 | PEF | 259 | 5.8 |
| FFEx_PEF12 | PEF | 298 | 12.5 |
| FFEx_PEF13 | PEF | 310 | 7 |
| FFEx_PEF14 | PEF | 385 | 8.9 |

Applicants have surprisingly found that the extruded foams of the present invention have superior strength characteristics, as measured by the value of compressive strength in particular, the following charts show the trend line data for compressive strength as a function of foam density.

As shown in the charts of the data which follow, the foams made with PEF homopolymer in accordance with the present invention produce a dramatically superior strength performance compared to the foams formed from PET homopolymer as a function of density over the entire density range reported in these examples. One method of illustrating this unexpected performance is to examine the trend lines of the two sets of foam data. By way of example, over the upper end of the tested density range (at about 380 kg/m3), the trendline of the PET data shows a compressive strength value of about 7 MPa, while the trendline of the PEF data shows a compressive strength value of about 11. This represents an advantage in compressive strength of about 1.6 times compared to the compressive strength of the PET foams. This advantage is especially unexpected given that the PEF foams were made with PEF having a molecular weight of 32,000, compared to the molecular weight of the PET foam that is of about 1.35 times higher (43,000). This is illustrated in FIG. 6, which shows the results of the data in the ranges of from about 180 kg/m3 to about 380 kg/m3.

Figure 6:
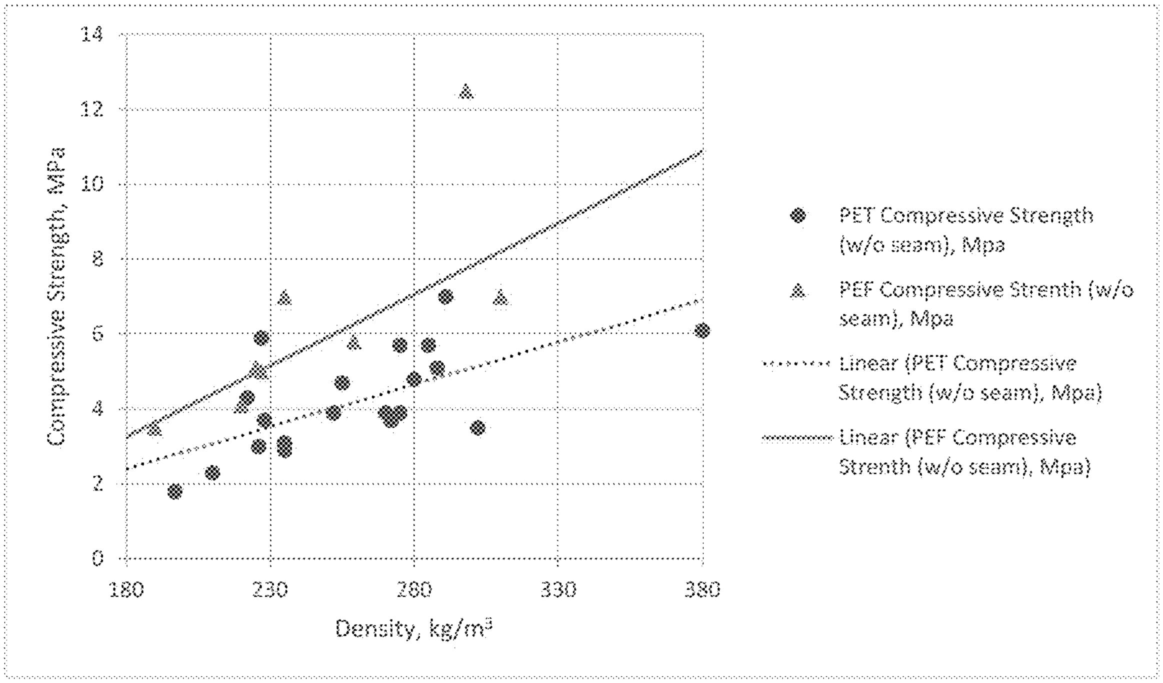
FIG. 6 is a chart showing results from Extrusion Example 1 hereof.
Figure 7:
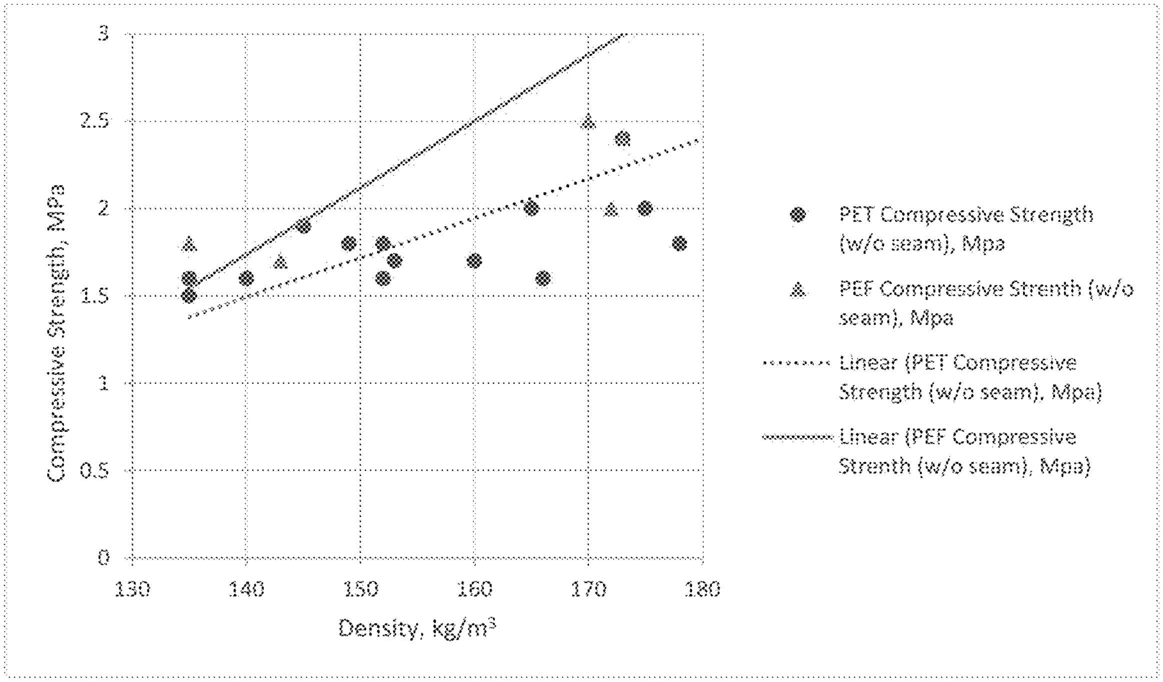
FIG. 7 is a chart showing results from Extrusion Example 1 hereof.

Even at the lowest densities tested, the trend line in FIG. 6 shows that at about 135 kg/m3, the PET data shows an average compressive strength value of about 1.4 MPa, while the trendline of the PEF data shows a compressive strength value of about 1.6. Thus, even at the low end of the density range tested, the PEF foam is unexpectedly superior, as illustrated by the chart of the data provided in FIG. 7.

Figure 8:
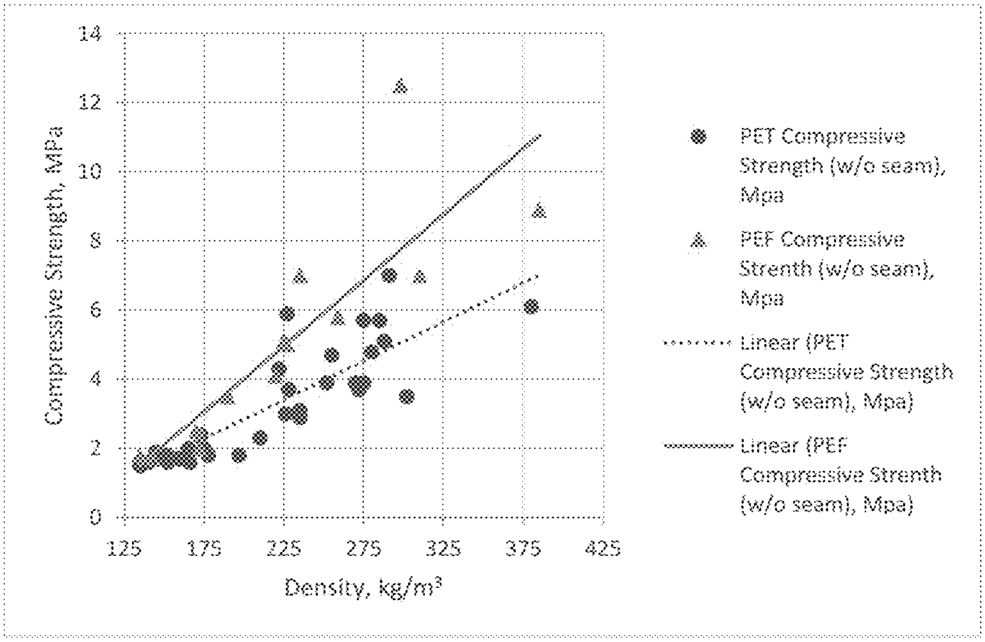
FIG. 8 is a chart showing results from Extrusion Example 1 hereof.

A chart showing all the test data is provided in FIG. 8.

Based on all the data available in the present examples, an unexpected increase in compressive strength of from about 1.25 times to about 1.6 times compared to the average PET homopolymer performance was achieved with the extruded foams of the present invention. A substantial advantage can also be achieved with the foams of the present invention compared to the foams formed from PET homopolymer by using the present foams to achieve the same compressive strength as PET foam but with a substantially lower density. By way of a specific example, if a PET having a density of 250 kg/m3 is being used in a given application (in the root of a wind turbine blade, for example), to achieve CS strength of 4, it would be possible based on the trend line data illustrated herein to replace the PET foam with a PEF foam of the present invention also having a CS strength of 4 Mpa but with a much lower foam density, that is, any density down to a density of 200 kg/m3. This represents a weight savings of up to about 25% for that given application. These are highly beneficial and unexpected results, as show in the examples below for several particular applications, including wind turbine blades.

As described in the present specification above, including the Examples, the foams of the present invention provide important and unexpected advantages in connection with many uses. These advantages include the ability to achieve extruded PEF foams having: (1) a superior strength compared to PET foams (even when using the preferred HFO-1234ze(E) blowing agent of the present invention) for a given density; (2) reduced density, and hence a weight advantage, for a foam with the same density as extruded PET foam.

Extrusion Example 2

Example 1 is repeated except using a commercial grade extruder with a throughput of from about 2000 to about 6000 pounds per hour. Similar unexpected results are achieved.

Use Examples

Comparative Use Example 1

Figure 2:
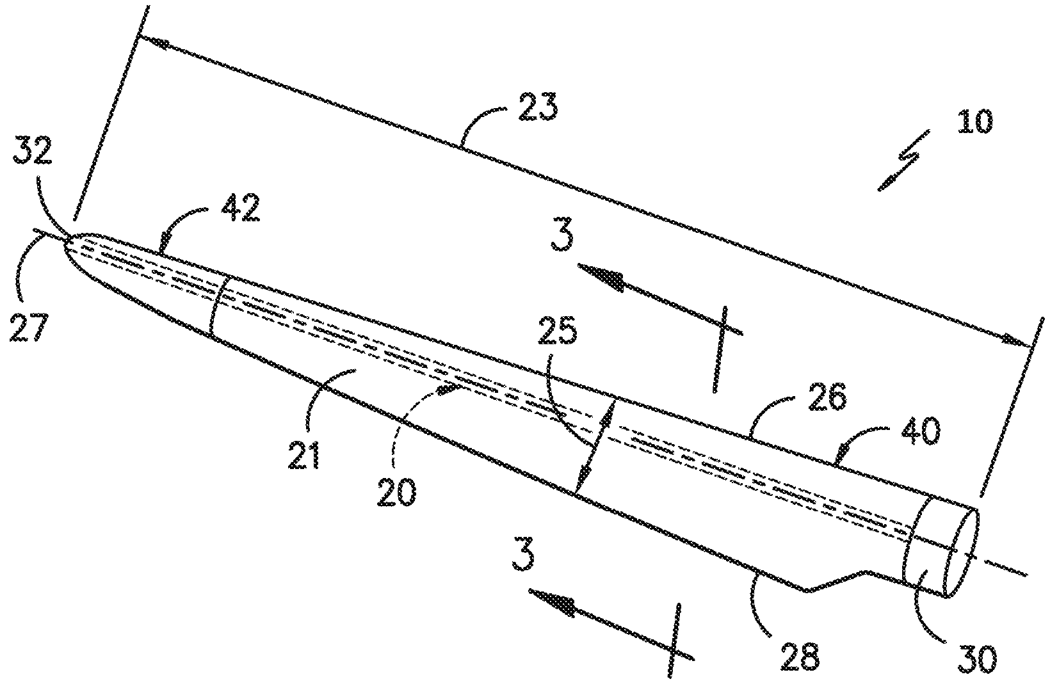
FIG. 2 is a semi-schematic representation of an exemplary wind turbine.
Figure 3A:
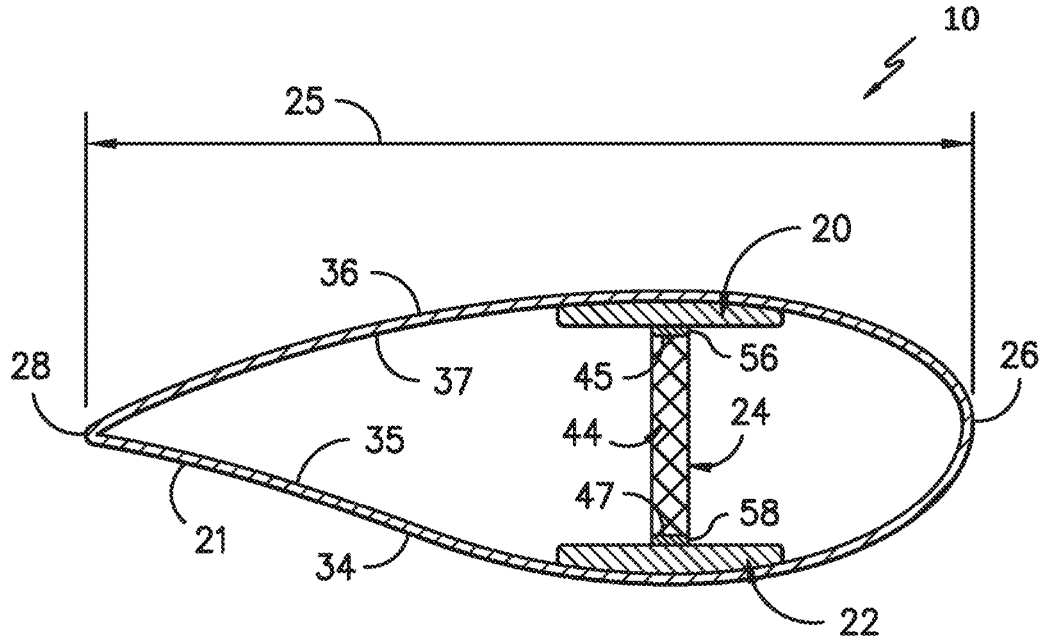
FIG. 3A is cross-section of an exemplary wind turbine blade.

A wind turbine generator having a configuration of the general type illustrated in FIGS. 1-3 hereof is constructed on land with a nacelle approximately 150 meters off the ground (referenced to the center-line of the nacelle). The blade span for each of the blades from the hub axis to the blade tip is about 100 meters, resulting in a rotor diameter of about 200 meters. The generator produces about 13 MW of electric power at peak design conditions. Each blade includes faced PET foam, with about 30% by weight of the foam being a high density foam (i.e., density of 240 kg/m3 (prior to facing)). The total weight of all PET foam (not including the facing material) to be replaced in the wind turbine is about 0.03% by weight of total blade weight.

Use Example 1-13 MW Reduded Weight Wind Turbine Generator Made with PEF Homopolymer Foam of the Present Invention A wind turbine generator having a configuration as described above in Comparative Example 1 is constructed, except that the high density PET foam is replaced with foam of the present invention based on any one of Extruded Foams 1-4 and the PEF extruded foam of Extrusion Examples 1 and 2. For this example, the high density PET foam is replaced by foam made from such extruded PEF foam blown with 1234ze as represented by the trend lines in the charts above. One option for making the replacement is to use, on an equal strength basis, an extruded PEF homopolymer represented by the trend line in the charts above to replace all of the high density extruded PET. On average, this results in the ability to use a PEF extruded foam of the present invention that has a density of about 100 kg/m3, which is only about 40% of the density of the PET foam, and hence about 40% lighter in weight, than the high density PET foam. The net result is a reduction in blade weight of about 0.03%*0.4, for a weight saving of about 1.2%. The unexpected reduction in blade weight achievable by using the foams of the present invention is substantial and commercially significant. The reduced blade weight means that many other components of the wind turbine can be made smaller and/or lighter, which in turn has not only additional environmental benefits but also significant decrease in construction costs. For example, the nacelle of wind turbines is designed to be compatible with the blades, including to be of a size and weight to balance the torque created by the blades. In addition, this weight reduction will result in a cost savings for the tower design and construction costs.

Use Example 2: Higher Output Wind Turbine Generator Made with PEF Homopolymer in the Root Area and/or PEF Homopolymer Foams of the Present Invention in the Non-Root of the Blade Shell A wind turbine generator having a configuration as described in Comparative Example 1 is made, except that the same density of extruded PEF foam of the present is used instead of PET foam but because of the increased strength of the present foam, it may be possible to improve blade design in various ways to achieve power improvements.

Use Example 3—an Aircraft Using One or More of Extruded Foam Articles 1-3

An aircraft includes in one or more locations which require structural foam, including preferably at least a portion of one or more of the wing, fuselage, tail, doors, bulkheads, interiors and/or superstructures, contain at least one extruded foam article of the present invention, including on or more of each of Foam Articles 1-3. The aircraft achieves: (1) a lighter foam weight than previously used structural foam articles, preferably a weight that is at least about 2% less than the weight of the previously used foam; (2) an advantage in size and/or performance compared to using the same foam weight as previously used structural foam; and/or (3) a combination of (1) and (2).

Use Example 4—A Land Vehicle Using One or More of Extruded Foam Articles 1-3

An automobile includes in one or more locations which require structural foam, including preferably at least a portion of one or more of the side panels, floor panels, roof panels, engine compartments, battery compartments interiors and/or superstructures, contain at least one foam article of the present invention, including on or more of each of Foam Articles 1-3. The automobile achieves: (1) a lighter foam weight than previously used structural foam articles, preferably a weight that is at least about 2% less than the weight of the previously used foam; (2) an advantage in size and/or performance compared to using the same foam weight as previously used structural foam; and/or (3) a combination of (1) and (2).

Use Example 5—a Railway Car Using One or More of Extruded Foam Articles 1-3

A railway car includes in one or more locations which require structural foam, including preferably at least a portion of one or more of the side panels, floor panels, roof panels and superstructures, contain at least one foam article of the present invention, including on or more of each of Foam Articles 1-3. The railway car achieves: (1) a lighter foam weight than previously used structural foam articles, preferably a weight that is at least about 2% less than the weight of the previously used foam; (2) an advantage in size and/or performance compared to using the same foam weight as previously used structural foam; and/or (3) a combination of (1) and (2).

Use Example 6—A Building Using One or More of Extruded Foam Articles 1-3

A building structure that includes in one or more locations which require structural foam, including preferably at least a portion of one or more of the wall panels, floor structure and roof structure and other structures in the building, contain at least one foam article of the present invention, including on or more of each of Foam Articles 1-3. The building achieves: (1) a lighter foam weight than previously used structural foam articles, preferably a weight that is at least about 2% less than the weight of the previously used foam; (2) an advantage in size and/or performance compared to using the same foam weight as previously used structural foam; and/or (3) a combination of (1) and (2).

Use Example 7—Packaging Using One or More of Extruded Foam Articles 1-3

Packaging, preferably in the form of boxes, inserts, separators, envelops and the like, that includes in one or more locations which require structural foam, contains at least one foam article of the present invention, including on or more of each of Foam Articles 1-3. The building achieves: (1) a lighter foam weight than previously used structural foam articles, preferably a weight that is at least about 2% less than the weight of the previously used foam; (2) an advantage in size and/or performance compared to using the same foam weight as previously used structural foam; and/or (3) a combination of (1) and (2).

Use Example 8—Sporting Goods Using One or More of Extruded Foam Articles 1-3

A sporting good, including preferably a tennis racket, a skateboard, a water or snow ski, and the like, that includes in one or more locations which require structural foam, contains at least one foam article of the present invention, including on or more of each of Foam Articles 1-3. The sporting good achieves: (1) a lighter foam weight than previously used structural foam articles, preferably a weight that is at least about 2% less than the weight of the previously used foam; (2) an advantage in size and/or performance compared to using the same foam weight as previously used structural foam; and/or (3) a combination of (1) and (2).

What is claimed is:

1. A wind turbine blade comprising:

a. a blade shell; and b. a faced foam in said blade shell, said faced foam comprising an extruded foam having a foam density of from about 125 $kg/m^3$ to about 425 $kg/m^3$ and comprising a thermoplastic foam comprising:

(1) thermoplastic polymer cells comprising cell walls forming closed cells, wherein said thermoplastic polymer comprises ethylene furanoate moieties; and (2) 1234ze (E) contained in the closed cells.

2. The wind turbine blade of claim 1 wherein said thermoplastic polymer comprises from about 0.5 mole % to about 100 mole % of ethylene furanoate moieties.

3. The wind turbine blade of claim 1 wherein said thermoplastic polymer further comprises at least about 0.5 mole % ethylene terephthalate moieties.

4. The wind turbine blade of claim 1 wherein at least about 75% of the cells are closed cells.

5. The wind turbine blade of claim 1 wherein said extruded foam has a foam density of from about 130 $kg/m^3$ to about 400 $kg/m^3$.

6. The wind turbine blade of claim 5 wherein said extruded foam has a compressive strength of from about 1 MPa to about 14 MPa.

7. The wind turbine blade of claim 1 wherein said thermoplastic polymer cells comprise cell walls comprising at least about 1% by weight of ethylene furanoate moieties.

8. The wind turbine blade of claim 1 wherein said thermoplastic polymer comprises from about 0.5 mole % to about 99.5 mole % of ethylene furanoate moieties and from 0.5 mole % to about 99.5 mole % ethylene terephthalate moieties.

9. The wind turbine blade of claim 1 wherein said thermoplastic polymer has a molecular weight of from about 25,000 to about 140,000.

10. The wind turbine blade of claim 1 wherein said thermoplastic polymer has a molecular weight of from about 80,000 to about 130,000.

* * * * *